US008416860B2

(12) United States Patent
Kawa

(10) Patent No.: US 8,416,860 B2
(45) Date of Patent: Apr. 9, 2013

(54) DEBLOCKING FILTER, IMAGE ENCODER, AND IMAGE DECODER

(75) Inventor: Takeyoshi Kawa, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1281 days.

(21) Appl. No.: 11/826,399

(22) Filed: Jul. 16, 2007

(65) Prior Publication Data

US 2008/0043853 A1 Feb. 21, 2008

(30) Foreign Application Priority Data

Aug. 17, 2006 (JP) .................................. 2006-222173

(51) Int. Cl.
*H04N 7/12* (2006.01)
(52) U.S. Cl. .......... 375/240.29; 375/240.01; 375/240.26
(58) Field of Classification Search ............. 375/240.29, 375/240.26
See application file for complete search history.

(56) References Cited

U.S. PATENT DOCUMENTS

| | | | | |
|---|---|---|---|---|
| 5,014,124 | A * | 5/1991 | Fujisawa ....................... | 358/530 |
| 5,355,178 | A * | 10/1994 | Parulski ........................ | 348/620 |
| 5,598,184 | A * | 1/1997 | Barkans ........................ | 345/597 |
| 5,777,681 | A * | 7/1998 | Kim et al. ................. | 375/240.16 |
| 5,796,637 | A * | 8/1998 | Glew et al. ..................... | 702/190 |
| 5,929,936 | A * | 7/1999 | Arai et al. .................... | 348/607 |
| 6,377,313 | B1 * | 4/2002 | Yang et al. .................... | 348/630 |
| 7,084,929 | B2 | 8/2006 | Lange et al. | |
| 7,271,840 | B2 * | 9/2007 | Segman ......................... | 348/441 |
| 2002/0031276 | A1 * | 3/2002 | Yagishita et al. ............. | 382/252 |
| 2002/0080874 | A1 * | 6/2002 | Wilson ...................... | 375/240.01 |
| 2003/0108221 | A1 * | 6/2003 | Stevenson et al. ............ | 382/104 |
| 2003/0194013 | A1 * | 10/2003 | Alvarez .................... | 375/240.24 |
| 2004/0005006 | A1 * | 1/2004 | Miura et al. .............. | 375/240.24 |
| 2004/0017515 | A1 * | 1/2004 | Lange et al. .................. | 348/607 |
| 2004/0109505 | A1 * | 6/2004 | Ohashi ...................... | 375/240.29 |
| 2004/0113042 | A1 * | 6/2004 | Patel et al. ................. | 250/201.2 |
| 2004/0201832 | A1 * | 10/2004 | Shirota .............................. | 355/67 |
| 2004/0240743 | A1 * | 12/2004 | Hamada et al. ............... | 382/233 |
| 2004/0267856 | A1 * | 12/2004 | Macy, Jr. ....................... | 708/524 |
| 2005/0226529 | A1 * | 10/2005 | Kondo .......................... | 382/276 |

(Continued)

FOREIGN PATENT DOCUMENTS

| | | |
|---|---|---|
| JP | 08-237662 | 9/1996 |
| JP | 2002-064820 | 2/2002 |
| JP | 2003-333597 | 11/2003 |

OTHER PUBLICATIONS

Espacenet search resutl, Espacenet Result List, Jul. 15, 2011.*

(Continued)

*Primary Examiner* — Mehrdad Dastouri
*Assistant Examiner* — Shan Elahi
(74) *Attorney, Agent, or Firm* — Arent Fox LLP

(57) ABSTRACT

A deblocking filter, an image encoder, and an image decoder perform edge-filtering of moving-image data which can be divided into blocks, on groups of a predetermined number of pixels arrayed across edges between the blocks, and include: a processing unit concurrently performing column-direction-edge filtering on more than one first group of pixels which are arrayed in rows across ones of the edges oriented in a column direction, the ones of the edges belonging to a macroblock to be currently processed; and an rearrangement unit rearranging pixels being included in the more than one first group of pixels and the macroblock and having been processed by the processing unit, into more than one second group of pixels in respective columns.

5 Claims, 46 Drawing Sheets

U.S. PATENT DOCUMENTS

| | | | |
|---|---|---|---|
| 2005/0248595 A1* | 11/2005 | Tomizawa et al. | 345/690 |
| 2006/0002477 A1* | 1/2006 | Bae | 375/240.24 |
| 2006/0146191 A1* | 7/2006 | Kim et al. | 348/557 |
| 2006/0182181 A1* | 8/2006 | Lee et al. | 375/240.24 |
| 2007/0206000 A1* | 9/2007 | Haukijarvi et al. | 345/418 |

OTHER PUBLICATIONS

Heng-Yao et al, Efficient Deblocking Filter Architecture, Nov. 9, 2006.*

Tung-Chien et al, Analysis and Architecture Design of an HDTV720p 30 Frames/s H.264/AVC Encoder, Jun. 6, 2006.*

H.264 Standard, Advanced Video Coding, Nov. 2007.*

Espacenet search result, Espacenet Result List, Jan. 2012.*

Hen-Yao Lin, et al., "Efficient Deblocking Filter Architecture for H.264 Video Coders", ISCAS 2006 Proceedings, U.S.A., IEEE CAS Society, May 24, 2006, pp. 2617 to 2620.

* cited by examiner

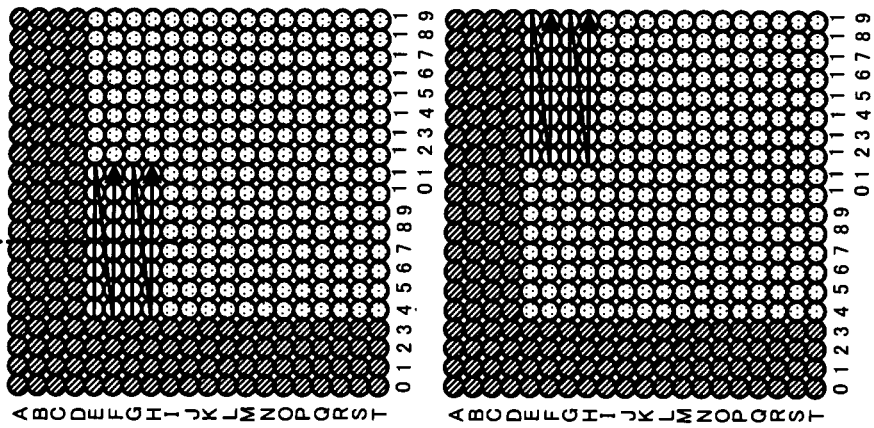
FIG. 6B
FIG. 6D
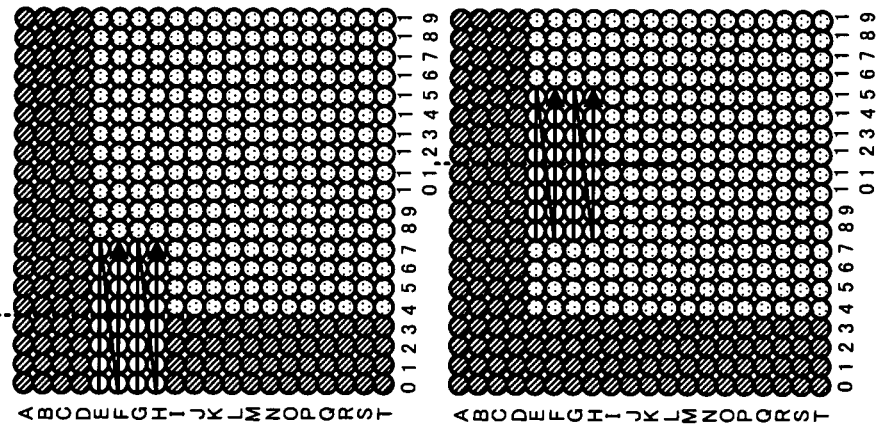
FIG. 6A
FIG. 6C

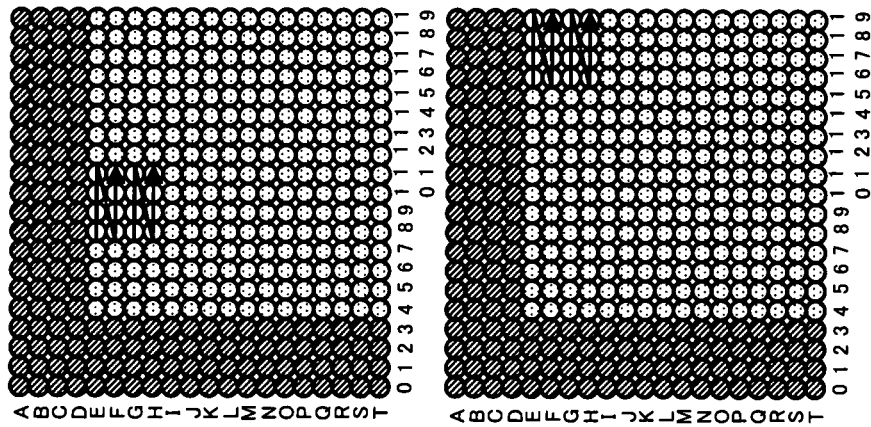
FIG. 8B
FIG. 8D
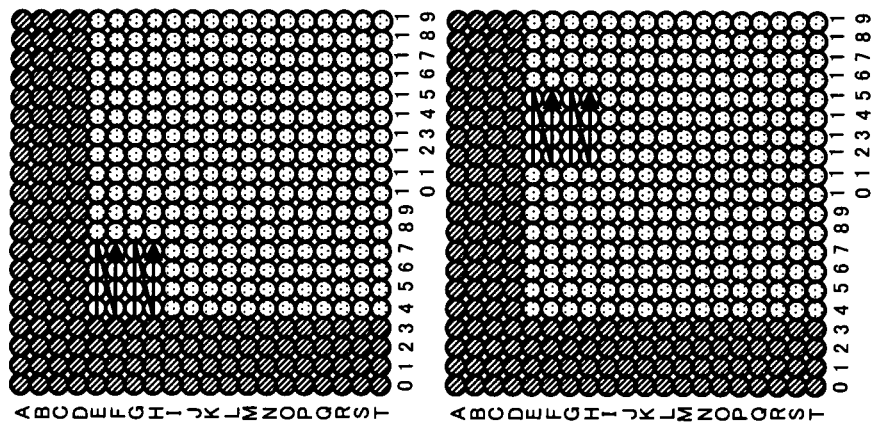
FIG. 8A
FIG. 8C

FIG. 16E  FIG. 16F (rearranged: FIG. 16F top-left, FIG. 16H top-right)

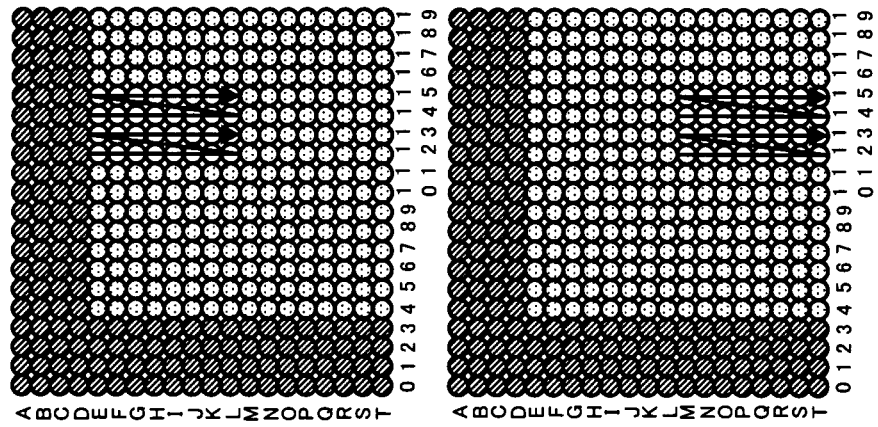
FIG. 17B
FIG. 17D
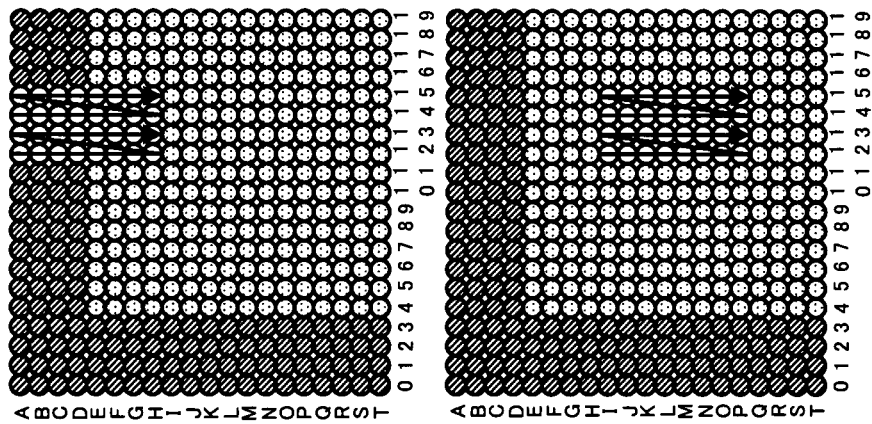
FIG. 17A
FIG. 17C

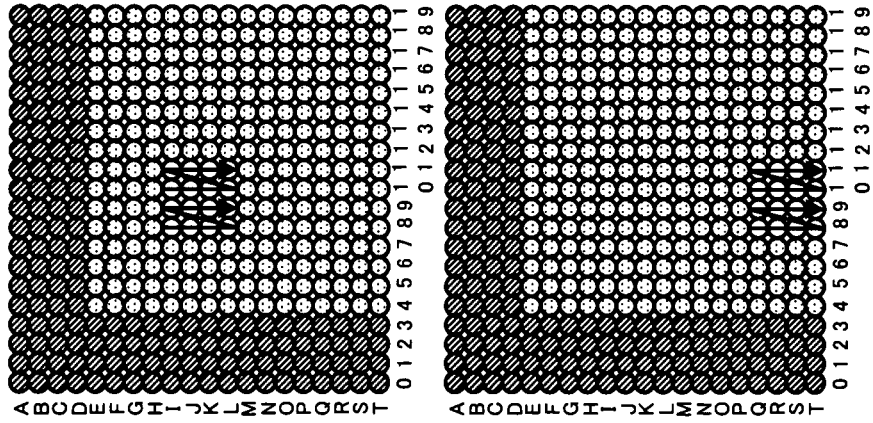
FIG. 18F
FIG. 18H
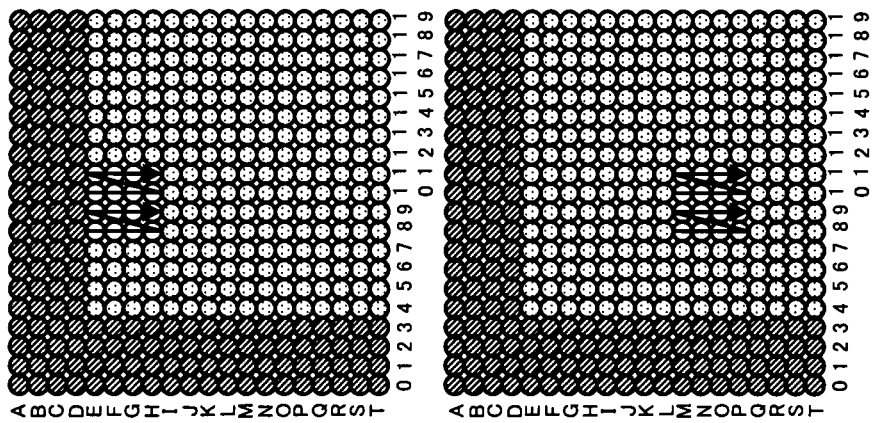
FIG. 18E
FIG. 18G

DEBLOCKING FILTER, IMAGE ENCODER, AND IMAGE DECODER

CROSS-REFERENCE TO RELATED APPLICATIONS

This application is based upon and claims the benefits of priority from the prior Japanese Patent Application No. 2006-222173, filed on Aug. 17, 2006, the entire contents of which are incorporated herein by reference.

BACKGROUND OF THE INVENTION

1) Field of the Invention

The present invention relates to a deblocking filter which reduces block distortion, and also relates to an image encoder and an image decoder which use such a deblocking filter.

2) Description of the Related Art

Currently, the MPEG (Moving Picture Expert Group) standards, the ITU-T H.264 standard, and the like are known as technical standards specifying techniques for compression encoding of a video signal. According to the MPEG or H.264 standards, the size of the basic macroblock is 16×16 pixels. In addition, according to the H.264 standard, the blocks with the size of 4×4 pixels can also be used when necessary. In particular, according to the H.264 standard, a deblocking filter is used for eliminating blocking distortion from images and improving the image quality at a low bit rate.

The general deblocking filters perform edge-filtering for changing the values of four pixels located on the current-macroblock side of the boundary (edge) and four pixels located on the adjacent-macroblock side of the boundary on the basis of the filtering strength and the pixels on the current-macroblock side and the adjacent-macroblock side. The change in the values of the pixels increases the correlation between the pixels adjacent to each other, so that the blocking distortion is apparently reduced. The edge-filtering includes vertical-edge filtering and horizontal-edge filtering. In the vertical-edge filtering, filtering is performed on an edge oriented in the vertical (column) direction. In the horizontal-edge filtering, filtering is performed on an edge oriented in the horizontal (row) direction. The vertical edge is an edge oriented in the column direction, and the horizontal edge is an edge oriented in the row direction. The deblocking filters first perform vertical-edge-filtering operations, and then horizontal-edge-filtering operations. During each edge-filtering operation, pixel values determined by a preceding edge-filtering operation are used, for example, as indicated in Japanese Unexamined Patent Publication No. 2005-535198 (corresponding to International Patent Publication WO2004/014082).

FIG. 36 is a diagram illustrating a vertical-edge-filtering operation of a conventional deblocking filter. In FIG. 36, the rows in the array of pixels are respectively labelled as A to T, and the columns in the array of pixels are respectively labelled as 0 to 19. Therefore, for example, the pixel in row 1 column 0 is referred to as the pixel A0, and the pixel in row 20 column 20 is referred to as the pixel T19. In addition, "Clock" denotes the clock signal used for operation of the deblocking filter, "Current" denotes the four pixels on the current-macroblock side, "Adjacent" denotes the four pixels on the adjacent-macroblock side, "Write" denotes the pixels stored in a memory, and reference number 91 denotes the current macroblock, which has the size of 16×16 pixels.

In the conventional vertical-edge filtering, an operation of filtering the edge between the pixels E3 and E4 is performed in a clock cycle by using the group of four pixels E0 to E3 (as four adjacent-side pixels) and the group of four pixels E4 to E7 in the macroblock 91 (as four current-side pixels), and then an operation of filtering the edge between the pixels E7 and E8 is performed in the next clock cycle by using the group of four filtered pixels E4 to E7 in the macroblock (as four adjacent-side pixels) and the group of four pixels E8 to E11 in the macroblock (as four current-side pixels). Thereafter, similar operations are performed in the subsequent clock cycles.

As described above, a first group of four pixels arranged in a row and processed as the four current-side pixels in a first edge-filtering operation are thereafter used as the four adjacent-side pixels in a second edge-filtering operation in which a second group of four pixels arranged adjacent to the first group of four pixels in the row direction are processed. Therefore, if a group of four filtered pixels are stored as they are in the memory, the stored pixels are required to be read out from the memory for the next edge-filtering operation, so that the operation is not efficient. In order to solve this problem, conventionally, a group of four filtered pixels is once held in a register or the like from which data can be relatively easily read out, and is thereafter reused in the filtering of the adjacent edge in the forward direction. Specifically, each group of pixels as the four current-side pixels is read out from a memory circuit, and are then filtered on the basis of relationships with adjacent-side pixels and the filtering strength which are prepared or set in advance, where each group of pixels is stored in the memory circuit in succession in the row direction after the group of pixels are filtered.

FIG. 37 is a diagram illustrating a horizontal-edge-filtering operation of a conventional deblocking filter. In the conventional horizontal-edge filtering, a group of four pixels to be processed in a horizontal-edge-filtering operation are prepared in every four clock cycles, and an operation of filtering an edge between another group of four pixels which are already horizontal-edge filtered and the above group of four pixels prepared to be processed, where the group of four horizontal-edge-filtered pixels are handled as four adjacent-side pixels (as indicated by the references A4 to D4 in FIG. 37), and the group of four pixels prepared to be processed are handled as four current-side pixels (as indicated by the references E4 to H4 in FIG. 37). Thereafter, similar operations are performed.

However, since the vertically-filtered data are stored in the memory circuit in the horizontal (row) direction in the conventional horizontal-edge filtering, it is impossible to perform the horizontal-edge filtering until the operation of reading out the data of necessary pixels (the current-side pixels) are completed, so that the necessary processing time increases. Therefore, shortage of the processing time occurs in particular in image processing for display in a large screen.

SUMMARY OF THE INVENTION

The present invention is made in view of the above problems, and the first object of the present invention is to provide a deblocking filter in which the processing time is reduced, and the second object of the present invention is to provide an image encoder and an image decoder which use such a deblocking filter.

In order to accomplish the first object, a deblocking filter for performing edge-filtering of moving-image data which can be divided into blocks, on groups of a predetermined number of pixels arrayed across edges between the blocks is provided. The deblocking filter comprises: a processing unit concurrently performing column-direction-edge (vertical-edge) filtering on more than one first group of pixels which are arrayed in rows across ones of the edges oriented in a column direction, the ones of the edges belonging to a macroblock to be currently processed; and an rearrangement unit rearranging pixels being included in the more than one first group of pixels and the macroblock and having been processed by the processing unit, into more than one second group of pixels in respective columns.

In order to accomplish the second object, an image encoder performing edge-filtering of moving-image data which can be divided into blocks, on groups of a predetermined number of pixels arrayed across edges between the blocks is provided. The image encoder comprises: a processing unit concurrently performing column-direction-edge filtering on more than one first group of pixels which are arrayed in rows across ones of the edges oriented in a column direction, the ones of the edges belonging to a macroblock to be currently processed; and an rearrangement unit rearranging pixels being included in the more than one first group of pixels and the macroblock and having been processed by the processing unit, into more than one second group of pixels in respective columns.

In order to accomplish the second object, an image decoder performing edge-filtering of moving-image data which can be divided into blocks, on groups of a predetermined number of pixels arrayed across edges between the blocks is also provided. The image decoder comprises: a processing unit concurrently performing column-direction-edge filtering on more than one first group of pixels which are arrayed in rows across ones of the edges oriented in a column direction, the ones of the edges belonging to a macroblock to be currently processed; and an rearrangement unit rearranging pixels being included in the more than one first group of pixels and the macroblock and having been processed by the processing unit, into more than one second group of pixels in respective columns.

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

FIGS. 6A to 6H and 7A to 7H are diagrams indicating the processing areas and groups of pixels used in respective processing cycles in vertical-edge filtering according to the first embodiment.

FIGS. 8A to 8H and 9A to 9H are diagrams indicating the pixel-readout areas of in the respective processing cycles in the vertical-edge filtering according to the first embodiment.

FIGS. 16A to 16H and 17A to 17H are diagrams indicating the processing areas and the groups of pixels used in respective processing cycles in horizontal-edge filtering according to the first embodiment.

FIGS. 18A to 18H and 19A to 19H are diagrams indicating the pixel-readout areas in the respective processing cycles in the horizontal-edge filtering according to the first embodiment.

DESCRIPTION OF THE PREFERRED EMBODIMENTS

Preferred embodiments of the present invention will be explained below with reference to the accompanying drawings, wherein like reference numbers refer to like elements throughout. First, an outline of the present invention which is realized in the embodiments is indicated, and thereafter details of the embodiments are explained.

1. Outline of the Present Invention

Figure 1:
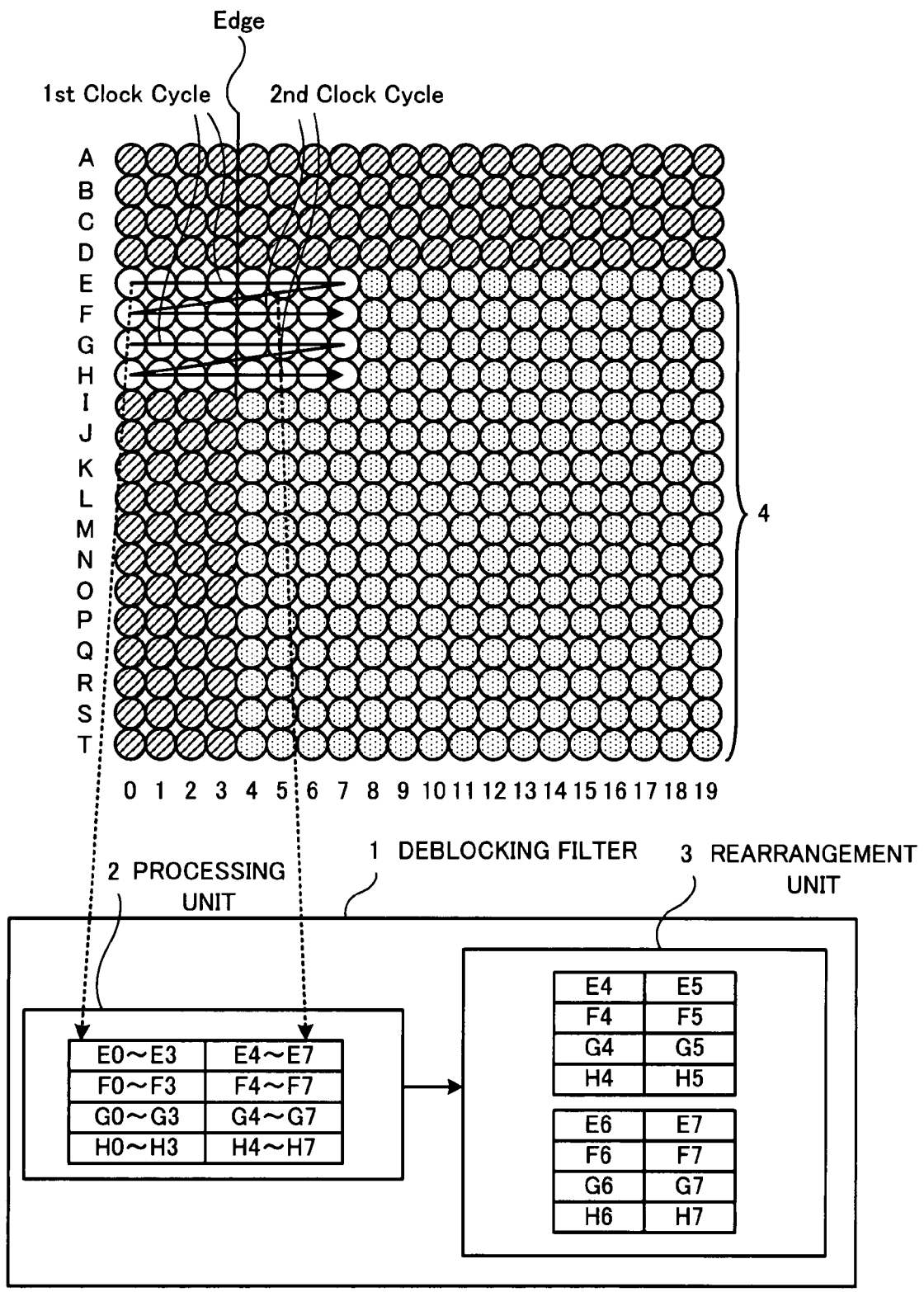
FIG. 1 is a diagram illustrating an outline of the operation of a deblocking filter according to the present invention.

FIG. 1 is a diagram illustrating an outline of an operation of a deblocking filter according to the present invention. In the following explanations referring to the drawings in which an array of pixels is illustrated, the column direction or the vertical direction is the downward direction in the drawings, and the row direction or the horizontal direction is the rightward direction in the drawings. In FIG. 1, the hatched circles indicate pixels in macroblocks which are already processed, and the dotted circles indicate pixels in a macroblock which is to be currently processed. Hereinafter, the macroblocks which are already processed are referred to as the reference macroblocks, and the macroblock which is to be currently processed is referred to as the current macroblock. The arrowed lines indicate the order in which the pixels are to be currently processed.

The deblocking filter 1 illustrated in FIG. 1 performs edge-filtering for reducing block distortion in moving-image data constituted by macroblocks and 4×4 blocks (blocks of 4×4 pixels). Specifically, the deblocking filter 1 performs edge-filtering operations on the edges between the macroblocks and between the 4×4 blocks. In the edge-filtering operations, groups of pixels arrayed across the edges in directions intersecting with the edge are used, and the number of the pixels in each of the groups is predetermined. The deblocking filter 1 comprises a processing unit 2 and a rearrangement unit 3.

The processing unit 2 concurrently performs column-direction-edge (vertical-edge) filtering, on a plurality of groups of pixels arrayed in a plurality of rows (for example, the group of the pixels E0 to E7 and the group of the pixels G0 to G7) across edges of the current macroblock 4 or edges of 4×4 blocks in the current macroblock 4 oriented in the column direction. For example, in the situation illustrated in FIG. 1, processing using the group of the pixels E4 to E7 and the group of the pixels G4 to G7 is performed in a first clock cycle, and processing using the groups of the pixels F4 to F7 and the group of the pixels H4 to H7 is performed in a second clock cycle.

The rearrangement unit 3 rearranges groups of pixels which are arrayed in rows, included in the current macroblock 4, and are processed by the processing unit 2, into other groups of pixels in respective columns. For example, the rearrangement unit 3 rearranges the group of pixels E4 to E7 in row E, the group of pixels F4 to F7 in row F, the group of pixels G4 to G7 in row G, and the group of pixels H4 to H7 in row H, into the group of pixels E4, F4, G4, and H4 in column 4, the group of pixels E5, F5, G5, and H5 in column 5, the group of pixels E6, F6, G6, and H6 in column 6, and the group of pixels E7, F7, G7, and H7 in column 7.

In the deblocking filter 1 having the above construction, the processing unit 2 concurrently performs edge-filtering on a plurality of groups of pixels which are arranged in a plurality of rows across edges of or in the current macroblock 4 oriented in the column direction, and the rearrangement unit 3 rearranges groups of pixels which are arrayed in rows, included in the current macroblock 4, and are processed by the processing unit 2, into other groups of pixels in respective columns.

In addition, the deblocking filter 1 also performs row-direction-edge (horizontal-edge) filtering. In the row-direction-edge filtering, edges of or in the current macroblock 4 oriented in the row direction are concurrently filtered by using a plurality of groups of pixels which are arranged in a plurality of columns across the edges. Therefore, when groups of pixels which are arrayed in rows and are to be used in the row-direction-edge filtering are rearranged into groups of pixels arrayed in columns, it is possible to speedily perform the row-direction-edge filtering.

2. Details of Embodiments

Hereinbelow, details of the embodiments of the present invention are explained. In the cases which are taken as examples in the following explanations, the present invention is applied to an image encoder and an image decoder which respectively encode and decode video signals in accordance with the H.264 standard. According to the H.264 standard, any of the basic macroblock of 16×16 pixels, the macroblock of 16×8 pixels, the macroblock of 8×16 pixels, and the macroblock of 8×8 pixels can be chosen for use. In the case where the macroblock of 8×8 pixels is used, the four types of subblocks having the sizes of 8×8, 8×4, 4×8, and 4×4 pixels can be designated. According to the basic algorithm, the encoding and the decoding are performed as follows. That is, in the encoding processing, each frame is divided into macroblocks (as the unit areas used in processing), and an inputted image is encoded by appropriately switching between intraframe prediction and interframe prediction on a macroblock-by-macroblock basis, where spatial redundancy within each frame is exploited in the intraframe prediction, and temporal redundancy between frames is exploited in the interframe prediction. The decoding is the inverse processing of the encoding. Although it is possible to refer to adjacent frames on both of the forward and backward sides for prediction according to the H.264 standard, in the following explanations, a case where a frame on only one of the forward and backward sides is referred to for prediction. The processing performed in the case where frames on both of the forward and backward sides are referred to for prediction is similar to the processing performed in the case where only one of the forward and backward sides is referred to for prediction, although the area necessary for storing the motion vectors (MVs) in the former case is greater than in the latter case.

2.1 Image Encoder

First, a common construction of the image encoders according to the first and second embodiments of the present invention is explained below with reference to FIG. 2, which is a block diagram illustrating the common construction of the image encoders.

The image encoder 100 comprises a macroblock (MB) separator 101, a motion-vector (MV) detector 102, a past-frame buffer 103, an interframe prediction unit 104, an intraframe prediction unit 105, a current-frame buffer 106, a prediction-mode (PM) selector 107, a subtractor 108, an orthogonal transformer/quantizer 109, an entropy encoder 110, an inverse quantizer/inverse orthogonal transformer 111, an adder 112, a deblocking filter 113, and a frame-buffer manager 114.

In the image encoder 100, an inputted image is divided into macroblocks by the MB separator 101. The size of the macroblocks is predetermined. Each macroblock is constituted by six blocks including four blocks for luminance component (the Y component) and two blocks for chrominance components (respectively for the Cb and Cr components). The MV detector 102 detects a motion vector (MV) of a current macroblock by using an image signal which is inputted on a macroblock-by-macroblock basis and a reference image stored in the past-frame buffer 103. Since normally the MV of the current macroblock is highly correlated with MVs of the surrounding macroblocks, the interframe prediction unit 104 calculates a motion-vector predictor (MVP) on the basis of the MVs of the surrounding macroblocks, and then calculates as a motion-vector difference (MVD) the difference between the calculated MVP and the MV of the current macroblock. The intraframe prediction unit 105 performs intraframe prediction on the basis of the data stored in the current-frame buffer 106. The PM selector 107 selects an encoding mode enabling the most efficient encoding of the current macroblock, (for example, by comparing prediction errors obtained by the interframe prediction unit 104 and the intraframe prediction unit 105), and generates information on the encoding mode (as encoding-mode information). The encoding-mode information is also included in information which is to be encoded, and passed to the entropy encoder 110. The encoding-mode information includes the sizes of the divided macroblocks (which are generated by dividing the macroblocks) and the sizes of the submacroblocks (which are generated by further dividing the divided macroblocks).

When the PM selector 107 selects the intraframe prediction unit 105, data of the inputted image in the current macroblock, which is outputted from the MB separator 101, is transferred as it is to the orthogonal transformer/quantizer 109, and the orthogonal transformer/quantizer 109 orthogonally transforms and quantizes the data of the inputted image so as to generate orthogonal-transformation-coefficient data, which is then passed to the entropy encoder 110. In addition, the orthogonal-transformation-coefficient data is decoded by the inverse quantizer/inverse orthogonal transformer 111, and written as a reference image into the current-frame buffer 106.

When the PM selector 107 selects the interframe prediction, i.e., when the MVD calculated by the interframe prediction unit 104 is selected by the PM selector 107, the MVD is passed to the entropy encoder 110. In addition, data of a predicted image based on the MVP is outputted through the PM selector 107 to the subtractor 108. The subtractor 108 calculates the difference between the inputted image and the predicted image on a macroblock-by-macroblock basis, and outputs the difference to the orthogonal transformer/quantizer 109. The output of the orthogonal transformer/quantizer 109 is decoded by the inverse quantizer/inverse orthogonal transformer 111, and added by the adder 112 to the predicted image, which is outputted from the PM selector 107. Thereafter, the output of the adder 112 is written as a reference image into the current-frame buffer 106.

The entropy encoder 110 performs entropy encoding of the data (information) to be encoded, and outputs the result of the entropy encoding as a compression-encoded image signal. The deblocking filter 113 performs deblocking filtering (edge filtering) of the reference image stored in the current-frame buffer 106 so as to smooth the edges of or in the macroblocks. The edge-filtered reference image is transferred through the frame-buffer manager 114, and stored in the past-frame buffer 103.

2.2 Image Decoder

Figure 3:
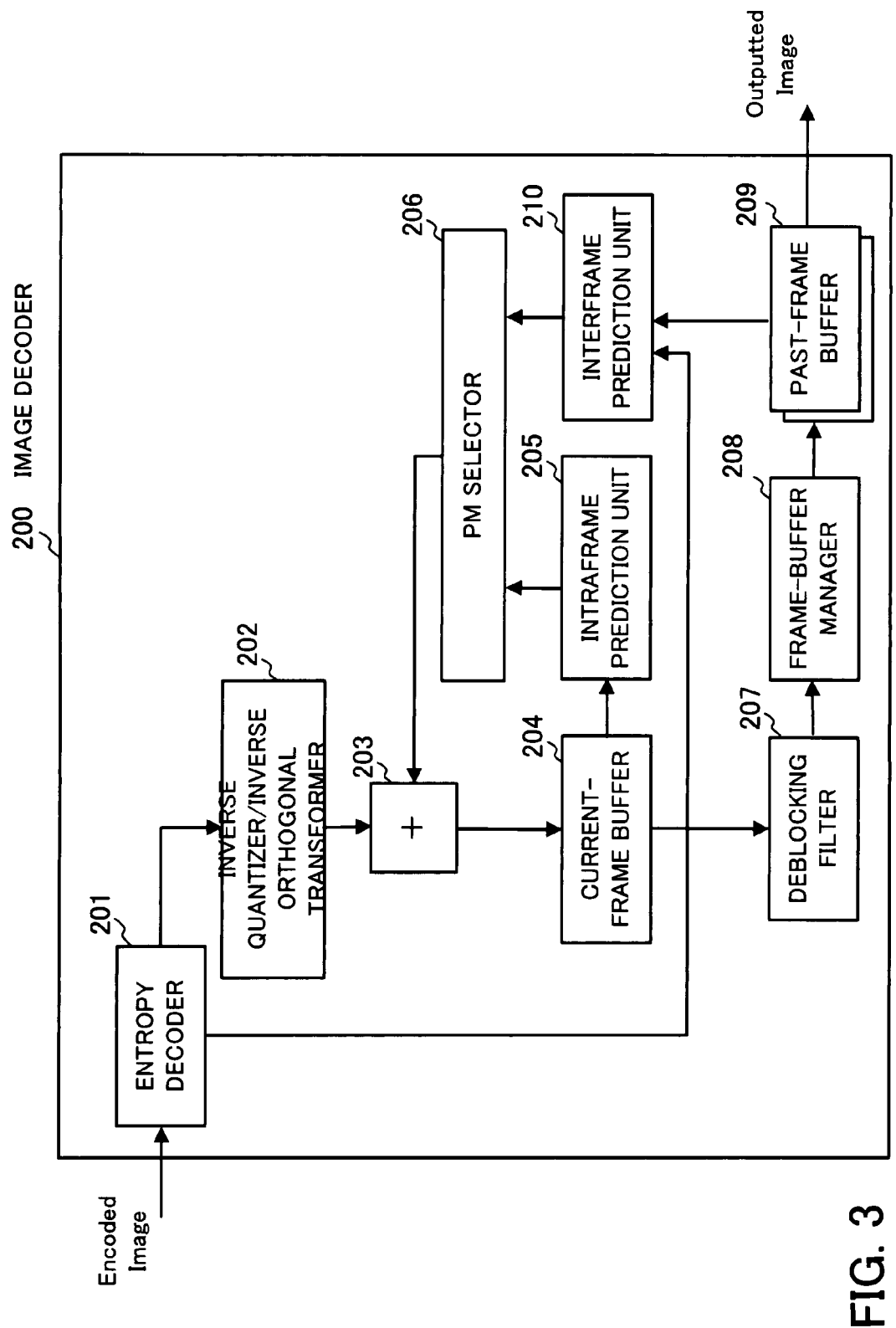
FIG. 3 is a block diagram illustrating the construction of an image decoder in the embodiments of the present invention.

Next, a common construction of the image decoders according to the first and second embodiments of the present invention is explained below with reference to FIG. 3, which is a block diagram illustrating the common construction of the image decoders.

Figure 2:
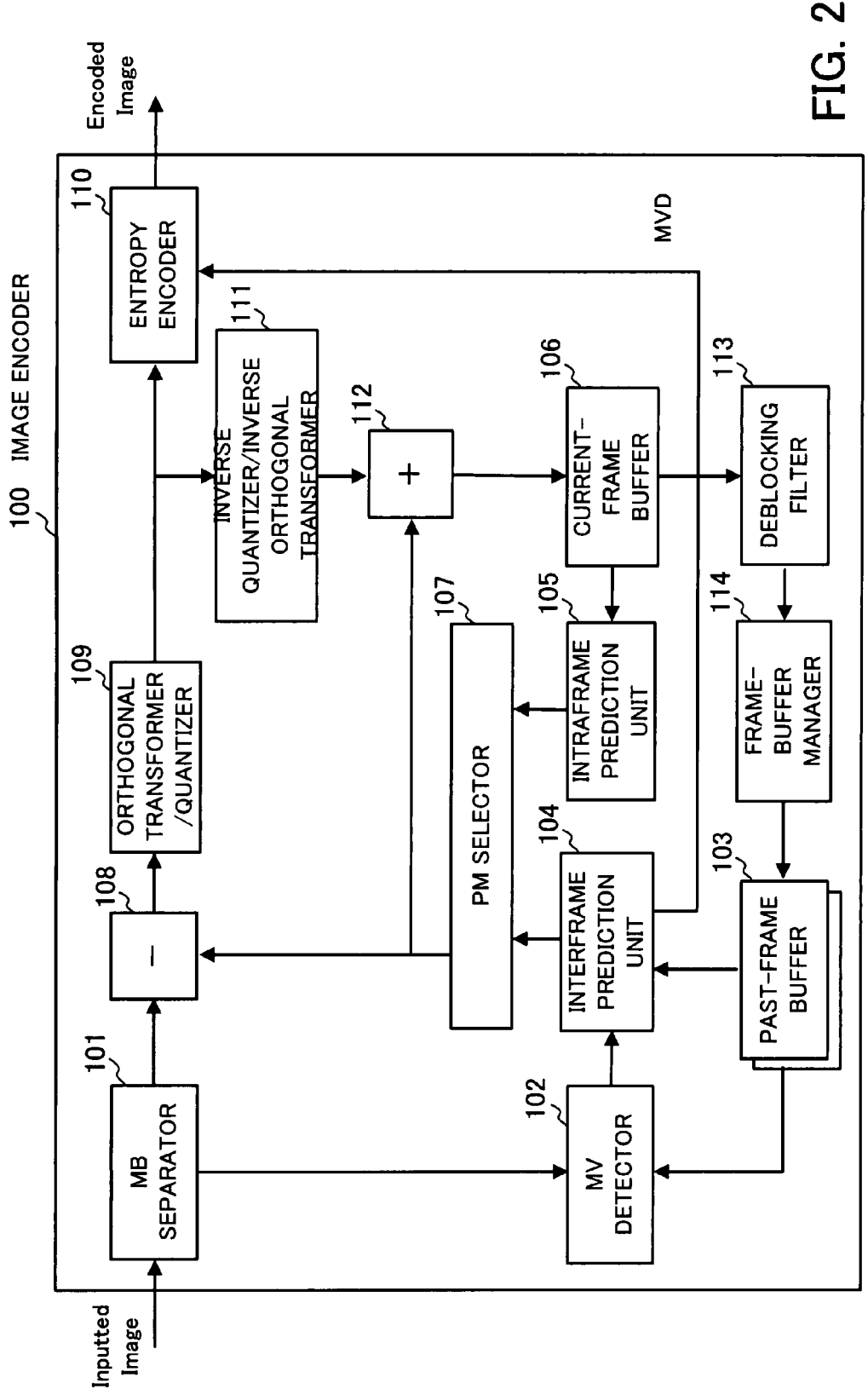
FIG. 2 is a block diagram illustrating the construction of an image encoder in embodiments of the present invention.

The image decoder 200 decodes the aforementioned compression-encoded image signal generated by the image encoder 100 illustrated in FIG. 2, and comprises an entropy decoder 201, an inverse quantizer/inverse orthogonal transformer 202, an adder 203, a current-frame buffer 204, an intraframe prediction unit 205, a prediction-mode (PM) selector 206, a deblocking filter 207, a frame-buffer manager 208, a past-frame buffer 209, and an interframe prediction unit 210.

The compression-encoded image signal inputted into the image decoder 200 is first entropy decoded by the entropy decoder 201. Thereafter, the inverse quantizer/inverse orthogonal transformer 202 performs inverse quantization and inverse orthogonal transformation of the entropy decoded, compression-encoded image signal. The prediction-mode (PM) selector 206 selects the output of one of the intraframe prediction unit 205 and the interframe prediction unit 210 according to the encoding-mode information, which is reproduced by the inverse quantizer/inverse orthogonal transformer 202.

In the case where the prediction-mode (PM) selector 206 selects the output of the intraframe prediction unit 205, the image reproduced by the inverse quantizer/inverse orthogonal transformer 202 is written into the current-frame buffer 204.

In the case where the image signal is encoded by the interframe prediction, motion-vector data, which is encoded in the form of the MVD (motion-vector difference), is decoded by the inverse quantizer/inverse orthogonal transformer 202. That is, in this case, the prediction-mode (PM) selector 206 selects the output of the interframe prediction unit 210, and the MVD for each of the divided macroblocks (i.e., for each unit area in which a motion vector is determined) is decoded into the motion-vector (MV) data for the divided macroblock (i.e., for the unit area). Then, data of a predicted image is reproduced on the basis of the above MV data, and transferred through the prediction-mode (PM) selector 206 to the adder 203. In the adder 203, the data of the predicted image is added to a prediction error (which is reproduced by decoding by the inverse quantizer/inverse orthogonal transformer 202), so that data of an original image is reproduced and stored in the current-frame buffer 204. The data of the original image is transferred through the deblocking filter 207 and the frame-buffer manager 208 to the past-frame buffer 209, and is then stored in the past-frame buffer 209.

2.3 Deblocking Filter

Hereinbelow, the circuit constructions of the deblocking filters 113 and 207 according to the first and second embodiments are explained. Since the deblocking filters 113 and 207 according to each of the first and second embodiments have an identical circuit construction, only the circuit constructions of the deblocking filter 113 according to the first and second embodiments are explained below.

2.3.1 Construction of Deblocking Filter (First Embodiment)

Figure 4:
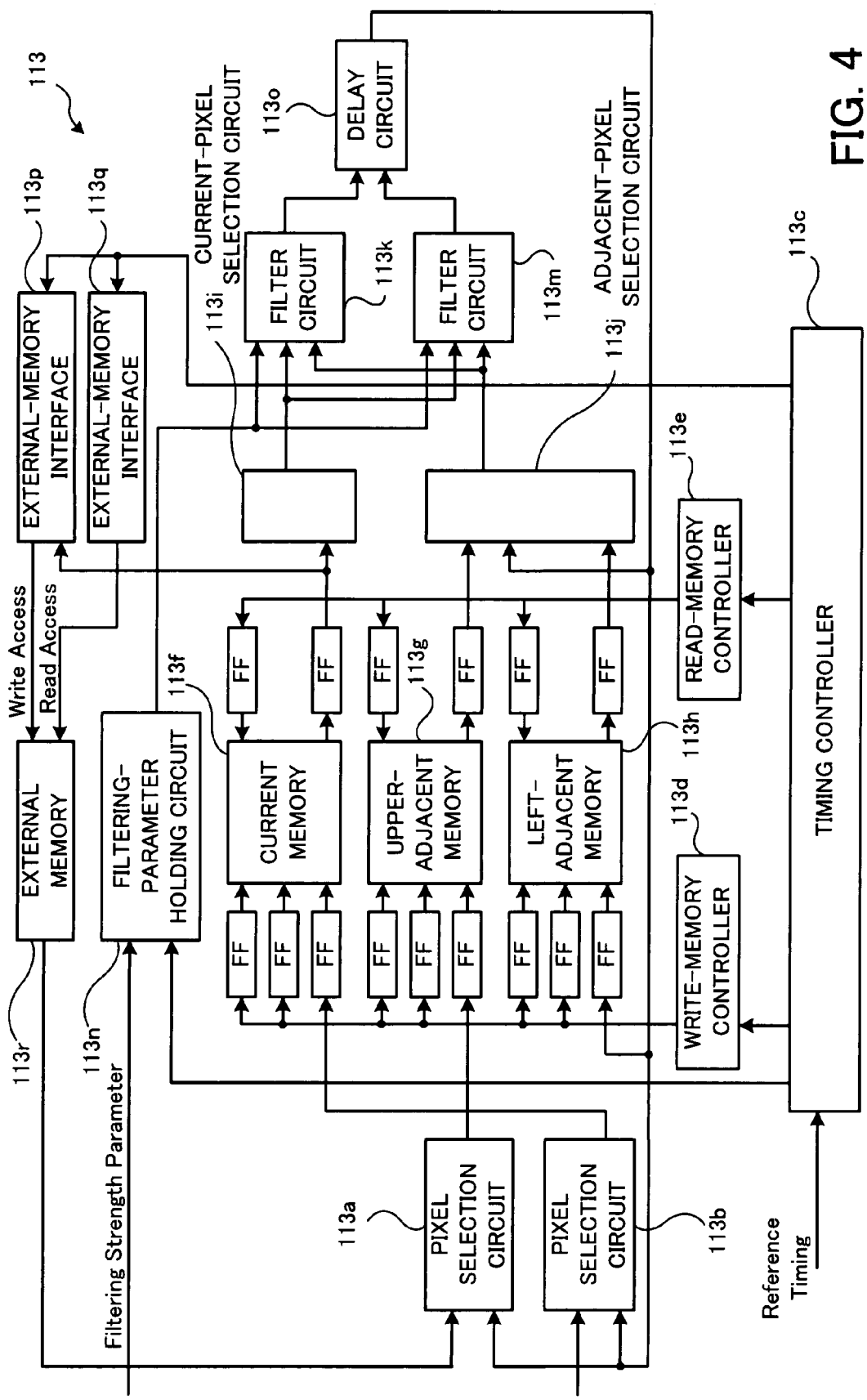
FIG. 4 is a circuit block diagram indicating a deblocking filter according to the first embodiment of the present invention.

FIG. 4 is a circuit block diagram indicating a deblocking filter according to the first embodiment of the present invention. The deblocking filter 113 of FIG. 4 comprises pixel selection circuits 113a and 113b, a timing controller 113c, a write-memory controller 113d, a read-memory controller 113e, a current-pixel-storing memory 113f, an upper-adjacent-pixel-storing memory 113g, a left-adjacent-pixel-storing memory 113h, a current-pixel selection circuit 113i, an adjacent-pixel selection circuit 113j, filter circuits 113k and 113m, a filtering-parameter holding circuit 113n, a delay circuit 113o, external-memory interfaces 113p and 113q, and an external memory 113r. Hereinafter, the current-pixel-storing memory may be referred to as the current memory, the upper-adjacent-pixel-storing memory may be referred to as the upper-adjacent memory, and the left-adjacent-pixel-storing memory may be referred to as the left-adjacent memory.

The output terminals of the delay circuit 113o and the external memory 113r are connected to the input terminals of the pixel selection circuit 113a, and the pixel selection circuit 113a selects the output (each carrying a group of pixels) of one of the delay circuit 113o and the external memory 113r which is to be supplied to the upper-adjacent memory 113g, and outputs the selected output.

The output terminals of the delay circuit 113o and an image-input unit (for inputting a frame of pixels outputted from the current-frame buffer 106) are connected to the input terminals of the pixel selection circuit 113b. The pixel selection circuit 113b selects the output (carrying a group of pixels) of one of the delay circuit 113o and the image-input unit which is to be supplied to the current memory 113f, and outputs the selected output. The pixel selection circuit 113b contains registers of 4×4 bits, rearranges (transposes) groups of vertical-edge-filtered pixels so that the rearranged groups of pixels match with an input condition for horizontal-edge filtering, and outputs the rearranged groups of pixels.

The timing controller 113c controls the timings of the input and output (e.g., read and write) of signals for operations of the respective portions of the deblocking filter 113. When the timing controller 113c receives a reference timing signal, the timing controller 113c sends a memory-interface start signal to the write-memory controller 113d, the read-memory controller 113e, the filtering-parameter holding circuit 113n, and the external-memory interfaces 113p and 113q.

When the write-memory controller 113d receives the memory-interface start signal, the write-memory controller 113d outputs a write address and a write-enable signal to one or more of the current memory 113f, the upper-adjacent memory 113g, and the left-adjacent memory 113h.

When the read-memory controller 113e receives the memory-interface start signal, the read-memory controller 113e outputs a read address and an inhibit signal to one or more of the current memory 113f, the upper-adjacent memory 113g, and the left-adjacent memory 113h.

When the current memory 113f receives the write-enable signal from the write-memory controller 113d, the current memory 113f receives a group of pixels in a macroblock from the current-frame buffer 106 through the pixel selection circuit 113b in response to the write-enable signal, and holds the received group of pixels. Thereafter, when the current memory 113f receives the inhibit signal from the read-memory controller 113e, the current memory 113f outputs a group of pixels which are to be read out as a group of current-side pixels. The above groups of pixels, the write-enable signal, and the inhibit signal are inputted into and outputted from the current memory 113f through flip-flop (FF) circuits. Further, the upper-adjacent memory 113g and the left-adjacent memory 113h also operate in response to the write-enable signal and the inhibit signal in similar manners to the current memory 113f.

Figure 5:
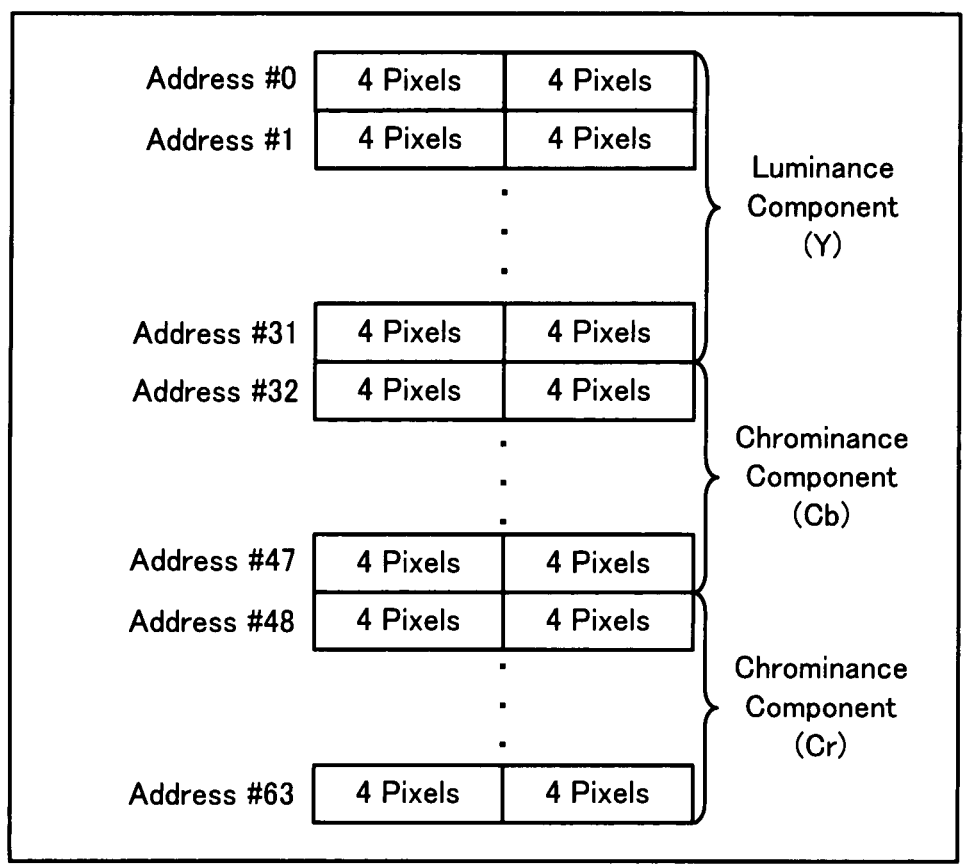
FIG. 5 is the structure of a current memory.

FIG. 5 is the structure of the circuit construction of the current-pixel-storing memory (current memory) 113f. The current memory 113f can hold two groups of pixels arrayed in two lines each having four pixels (e.g., the group of the pixels E4 to E7 and the group of the pixels G4 to G7). In addition, the current memory 113f has areas for holding the luminance component (in the addresses #0 to #31) and areas for holding the chrominance components (in the addresses #32 to #47 and #48 to #63).

Referring back to FIG. 4, the upper-adjacent-pixel-storing memory (upper-adjacent memory) 113g receives and holds as a group of upper-adjacent pixels a group of pixels outputted from the pixel selection circuit 113a, in response to the write-enable signal outputted from the write-memory controller 113d. In addition, the upper-adjacent memory 113g outputs the group of upper-adjacent pixels in response to the inhibit signal outputted from the read-memory controller 113e.

The left-adjacent memory 113h receives and holds as a group of left-adjacent pixels a group of pixels outputted from the delay circuit 113o, in response to the write-enable signal outputted from the write-memory controller 113d. In addition, the left-adjacent memory 113h outputs the group of left-adjacent pixels in response to the inhibit signal outputted from the read-memory controller 113e.

The output terminal of the current memory 113f is connected to the input terminal of the current-pixel selection circuit 113i. The current-pixel selection circuit 113i selects one of the filter circuits 113k and 113m as a destination of each group of pixels outputted from the current memory 113f, and outputs the group of pixels to the selected one of the filter circuits 113k and 113m. The groups of pixels inputted into the current-pixel selection circuit 113i are groups of current-side pixels.

The output terminals of the delay circuit 113o, the upper-adjacent memory 113g, and the left-adjacent memory 113h are connected to the input terminals of the adjacent-pixel selection circuit 113j. The adjacent-pixel selection circuit 113j selects one of the filter circuits 113k and 113m as a destination of each group of pixels outputted from the delay circuit 113o, the upper-adjacent memory 113g, and the left-adjacent memory 113h, and outputs the group of pixels to the selected one of the filter circuits 113k and 113m. The groups of pixels inputted into the adjacent-pixel selection circuit 113j are groups of upper-adjacent pixels or groups of left-adjacent pixels. Hereinafter, the groups of upper-adjacent pixels and the groups of left-adjacent pixels are collectively referred to as the adjacent-side pixels.

Each of the filter circuits 113k and 113m performs edge-filtering by using the groups of current-side pixels outputted from the current-pixel selection circuit 113i and the groups of adjacent-side pixels outputted from the adjacent-pixel selection circuit 113j. At this time, a filtering parameter, which indicates the filtering strength and is supplied from the filtering-parameter holding circuit 113n, is used. That is, the deblocking filter 113 according to the embodiments of the present invention comprises two filter circuits 113k and 113m (realizing two processing lines), so that the processing can be performed in parallel in the two filter circuits 113k and 113m.

The delay circuit 113o outputs the data outputted from the filter circuits 113k and 113m two clock cycles after the output of the data from the filter circuits 113k and 113m. The delay of two clock cycles corresponds to one processing cycle, which is explained later.

The external-memory interfaces 113p and 113q respectively output a write-access signal and a read-access signal to the external memory 113r in response to timing signals outputted from the timing controller 113c.

The external memory 113r is constituted by an SRAM (Synchronous Dynamic Random Access Memory) or the like. When the external memory 113r receives the write-access signal, the external memory 113r reads in a group of pixels outputted from the current memory 113f. When the external memory 113r receives the read-access signal, the external memory 113r outputs a designated group of pixels to the pixel selection circuit 113a.

2.3.2 Processing in Deblocking Filter (First Embodiment)

Hereinbelow, the processing performed in the deblocking filter 113 according to the first embodiment is explained. The edge-filtering according to the first embodiment is performed in the case where the current and adjacent macroblocks are non-interlaced. The processing performed in the deblocking filter (i.e., edge-filtering) includes vertical-edge filtering and horizontal-edge filtering.

2.3.2.1 Vertical-edge Filtering (First Embodiment)

First, vertical-edge filtering according to the first embodiment is explained below. FIGS. 6A to 6H and 7A to 7H are diagrams indicating the processing areas and the groups of pixels used in respective processing cycles in the vertical-edge filtering according to the first embodiment. In the vertical-edge filtering, processing for filtering vertical edges (edges oriented in the vertical direction) is performed while scanning a macroblock from left to right and from top to bottom by successively using the processing areas as illustrated in FIGS. 6A to 6H and 7A to 7H (each having a vertical width of four pixels and a horizontal width of eight pixels), although, for simple illustration, the edges are indicated in only FIGS. 6A, 6B, and 6C. The processing areas are areas containing pixels used in the respective processing cycles. During the vertical-edge filtering, groups of pixels located across each pair of edges oriented in the vertical direction (perpendicular to the scanning (horizontal) direction) are successively used in processing. Each processing cycle is constituted by two clock cycles, and corresponds to the unit processing time. Every time processing using pixels in a first processing area is completed in a processing cycle, the processing in the next processing cycle is performed by using pixels in a second processing area located at the right of the processing area (shifted rightward by four pixels from the first processing area) in a similar manner.

In the first processing cycle, the processing area is the area extending over the rows E to H and the columns 0 to 7 as illustrated in FIG. 6A. In the first clock cycle in the first processing cycle, the edge between the pixels E3 and E4 and the edge between the pixels G3 and G4, which are located along the vertical direction, are concurrently processed by using the group of pixels E0 to E7 and the group of pixels G0 to G7. At this time, the processing using the group of pixels E0 to E7 is performed by the filter circuit 113k, and the processing using the group of pixels G0 to G7 is performed by the filter circuit 113m. Then, in the second clock cycle in the first processing cycle, the edge between the pixels F3 and F4 and the edge between the pixels H3 and H4, which are located along the vertical direction, are concurrently processed by using the group of pixels F0 to F7 and the group of pixels H0 to H7. At this time, the processing using the group of pixels F0 to F7 is performed by the filter circuit 113k, and the processing using the group of pixels H0 to H7 is performed by the filter circuit 113m.

Figures 6E, 6G:
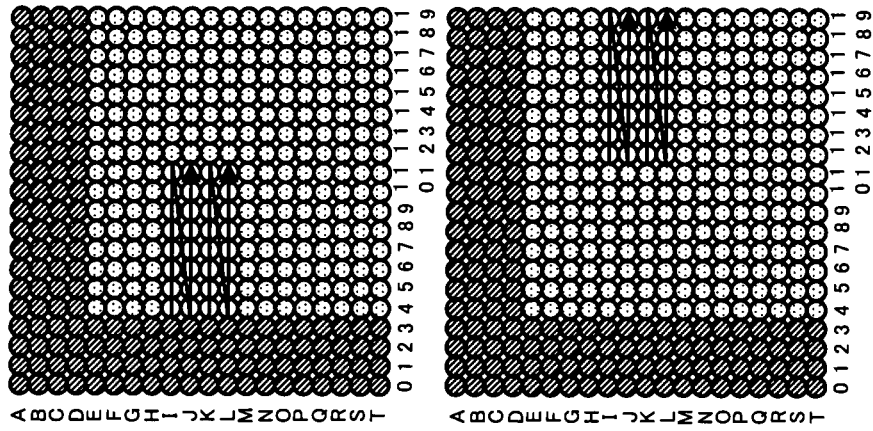
Figures 6F, 6H:
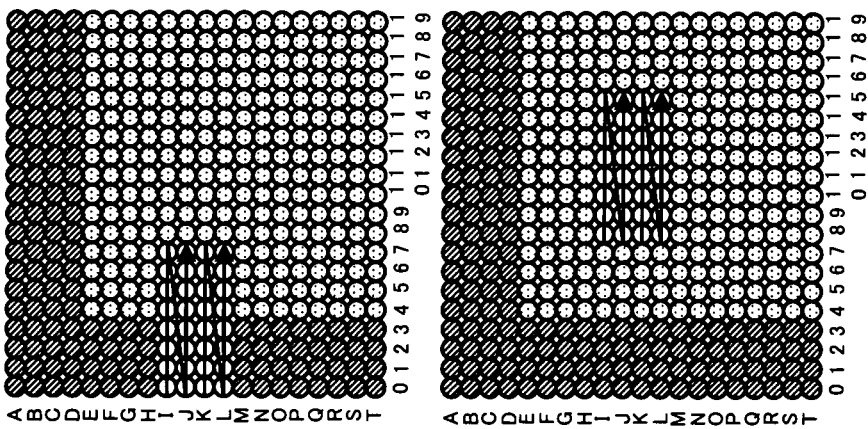
Figures 7A, 7B, 7C, 7D:
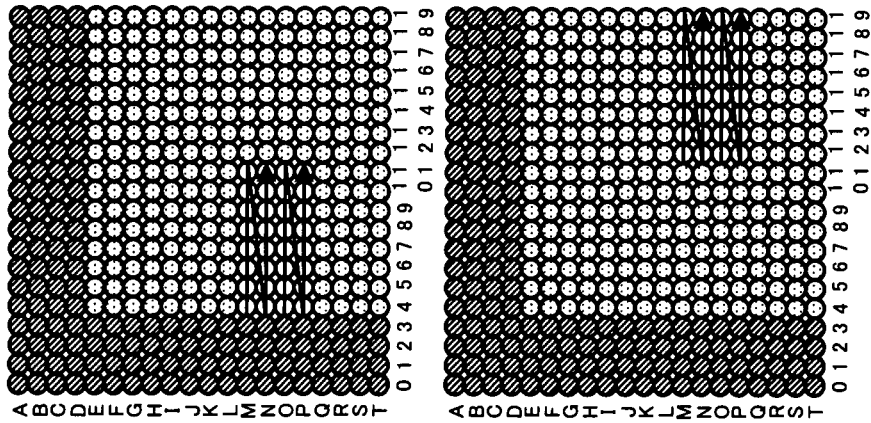
Figures 7E, 7G:
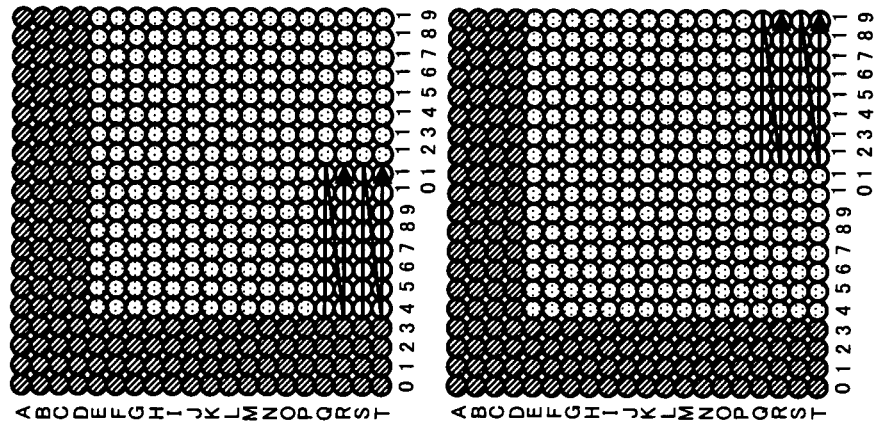
Figures 7F, 7H:
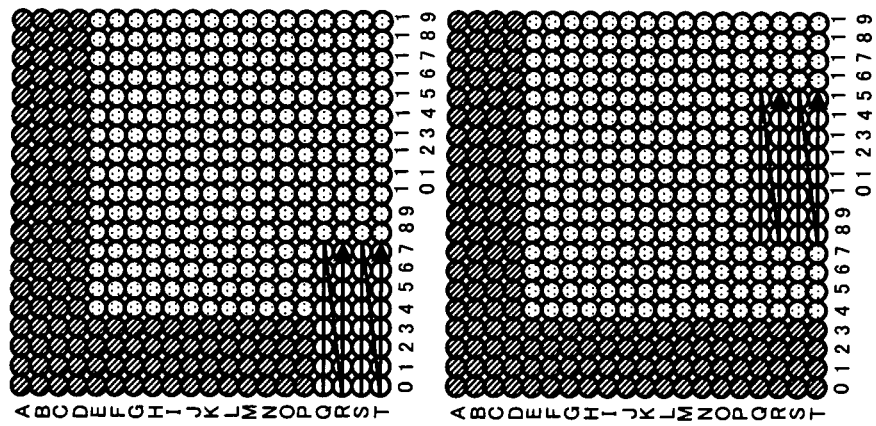

In the second and third processing cycles, the processing areas are located as illustrated in FIGS. 6B and 6C, respectively. When processing using pixels in the processing area located in the rightmost position in the current macroblock (for example, as illustrated in FIG. 6D) is completed, the processing in the next processing cycle is performed by using pixels in the processing area located at a position across the left end of the current macroblock (for example, as illustrated in FIG. 6E). When processing using pixels in the processing area located at the bottom right end of the current macroblock as illustrated in FIG. 7H is completed, the vertical-edge filtering of the current macroblock is completed.

As described above, the deblocking filter 113 reads out all the pixels in the current macroblock, and performs the vertical-edge filtering. In addition, as understood from the above explanations, FIGS. 6A to 6H and 7A to 7H show the order of the processing, and not the order of readout of the pixels from the current memory 113f. Hereinbelow, operations of reading out the pixels from the current memory 113f to the filter circuits 113k and 113m during the vertical-edge filtering according to the first embodiment are explained below.

FIGS. 8A to 8H and 9A to 9H are diagrams indicating the areas of pixels (4×4 blocks) which are read out (i.e., pixel-readout areas) in respective processing cycles in the vertical-edge filtering according to the first embodiment, where the pixel-readout areas indicated in FIGS. 8A to 8H and 9A to 9H respectively correspond to the processing areas indicated in FIGS. 6A to 6H and 7A to 7H. That is, the 4×4 pixels in the pixel-readout areas indicated in FIGS. 8A to 8H and 9A to 9H are successively read out in the respective processing cycles in the vertical-edge filtering according to the first embodiment so as to scan the current macroblock from left to right and from top to bottom.

In the first and second clock cycles in the first processing cycle, the read-memory controller 113e reads out the 4×4 pixels in the first pixel-readout area located at the top left of the current macroblock as illustrated in FIG. 8A. Specifically, in the first clock cycle in the first processing cycle, the read-memory controller 113e reads out two groups of four consecutive pixels (E4 to E7 and G4 to G7) in the first and third horizontal lines (rows) in the first pixel-readout area. Then, in the second clock cycle in the first processing cycle, the read-memory controller 113e reads out two groups of four consecutive pixels (F4 to F7 and H4 to H7) in the second and fourth horizontal lines (rows) in the first pixel-readout area. That is, the pixels read out in the second clock cycle are respectively located one row below the corresponding pixels read out in the first clock cycle.

In the first and second clock cycles in the second processing cycle, the read-memory controller 113e reads out the 4×4 pixels in the second pixel-readout area illustrated in FIG. 8B, which is located at the right of the first pixel-readout area illustrated in FIG. 8A. Specifically, in the first clock cycle in the second processing cycle, the read-memory controller 113e reads out two groups of four consecutive pixels (E8 to E11 and G8 to G11) in the first and third horizontal lines (rows) in the second pixel-readout area. Then, in the second clock cycle in the second processing cycle, the read-memory controller 113e reads out two groups of four consecutive pixels (F8 to F11 and H8 to H11) in the second and fourth horizontal lines (rows) in the second pixel-readout area. That is, the pixels read out in the second clock cycle are respectively located one row below the corresponding pixels read out in the first clock cycle.

Figures 8F, 8H:
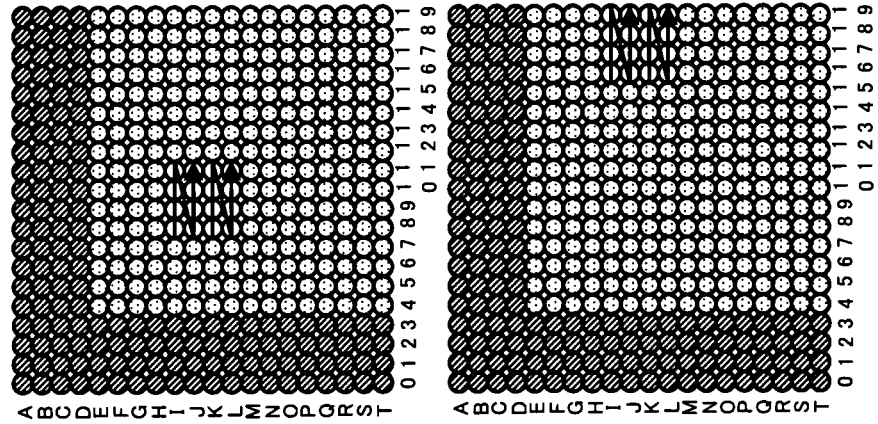
Figures 8E, 8G:
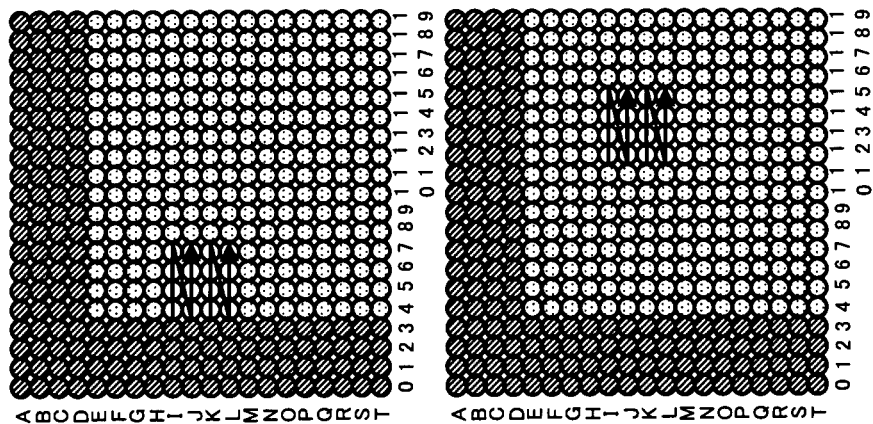
Figure 9B:
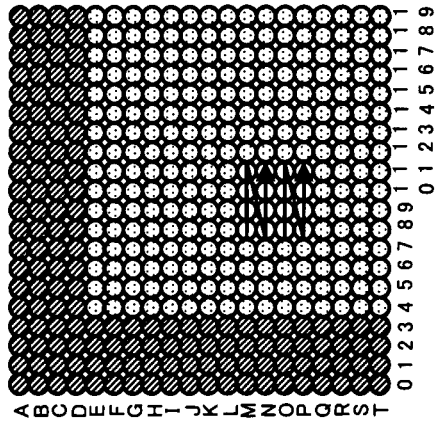
Figure 9D:
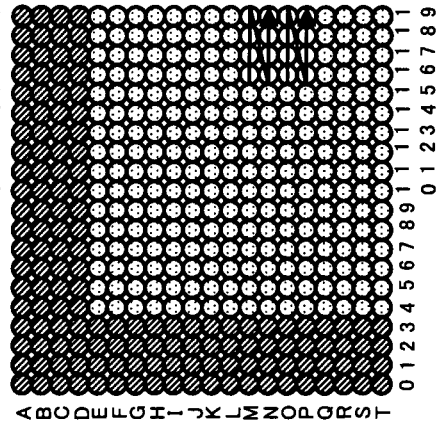
Figure 9A:
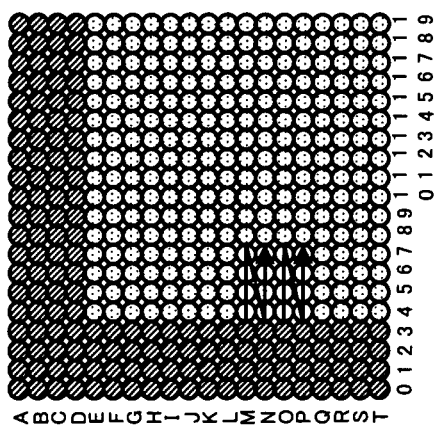
Figure 9C:
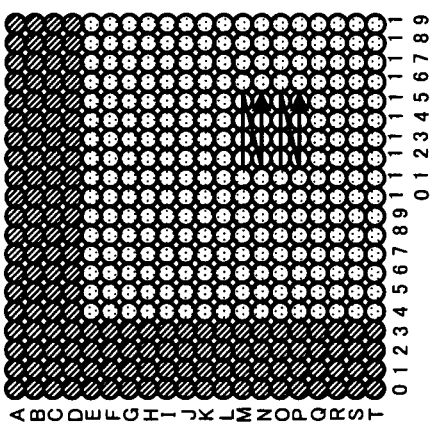
Figures 9F, 9H:
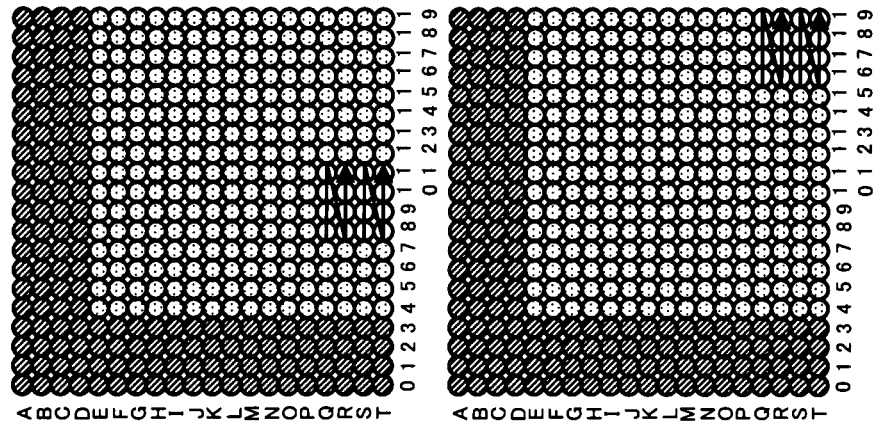
Figures 9E, 9G:
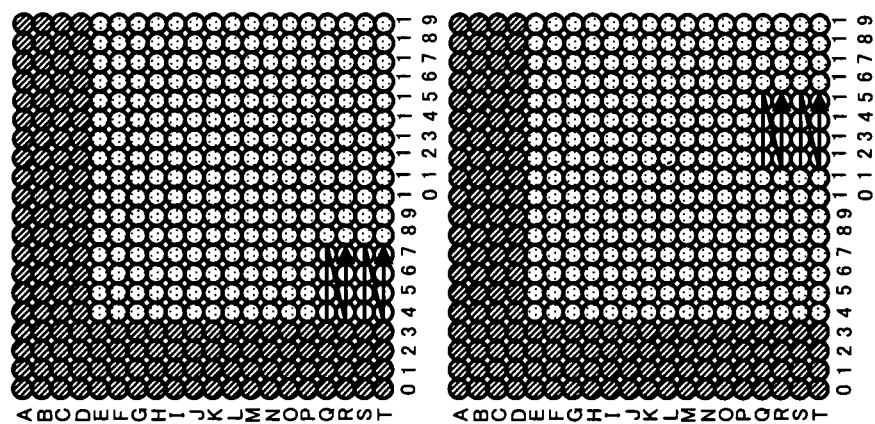

Similarly, the read-memory controller 113e reads out the 4×4 pixels in the third and fourth pixel-readout areas as illustrated in FIGS. 8C and 8D in the third and fourth processing cycles, respectively. After the pixels in the fourth processing area illustrated in FIG. 8D located in the rightmost position in the current macroblock are read out in the fourth processing cycle, the pixels in the fifth processing area illustrated in FIG. 8E, which are located in the leftmost position in the next four rows in the current macroblock, are read out in the next (fifth) processing cycle. Specifically, in the first clock cycle in the fifth processing cycle, the read-memory controller 113e reads out two groups of four consecutive pixels (I4 to I7 and K4 to K7) in the first and third horizontal lines (rows) in the fifth pixel-readout area. Then, in the second clock cycle in the fifth processing cycle, the read-memory controller 113e reads out two groups of four consecutive pixels (J4 to J7 and L4 to L7) in the second and fourth horizontal lines (rows) in the fifth pixel-readout area. That is, the pixels read out in the second clock cycle are respectively located one row below the corresponding pixels read out in the first clock cycle. Thereafter, the read-memory controller 113e performs similar operations for reading out 4×4 pixels in the remaining pixel-readout areas illustrated in FIGS. 8F to 8H and 9A to 9H in succession in the subsequent processing cycles, so that all the pixels in the current macroblock are read out.

The two groups of four consecutive pixels in the two lines read out in each clock cycle are respectively inputted into the filter circuits 113k and 113m, so that the filtering using the pixels in the two lines is performed in parallel. Thereafter, the filtered pixels are delayed by one cycle by the delay circuit 113o, and then enter the pixel selection circuit 113a. Since the unit processing time in the vertical-edge filtering in the deblocking filter according to the first embodiment is one processing cycle, the delay time in the delay circuit 113o is one processing cycle. If the unit processing time is two cycles, the delay in the delay circuit 113o is two cycles.

Hereinbelow, the operations of the operations of the deblocking filter during the vertical-edge filtering in respective stages are explained. FIGS. 10 to 13 are diagrams indicating operations of the deblocking filter during the vertical-edge filtering according to the first embodiment in the respective stages.

Figure 10:
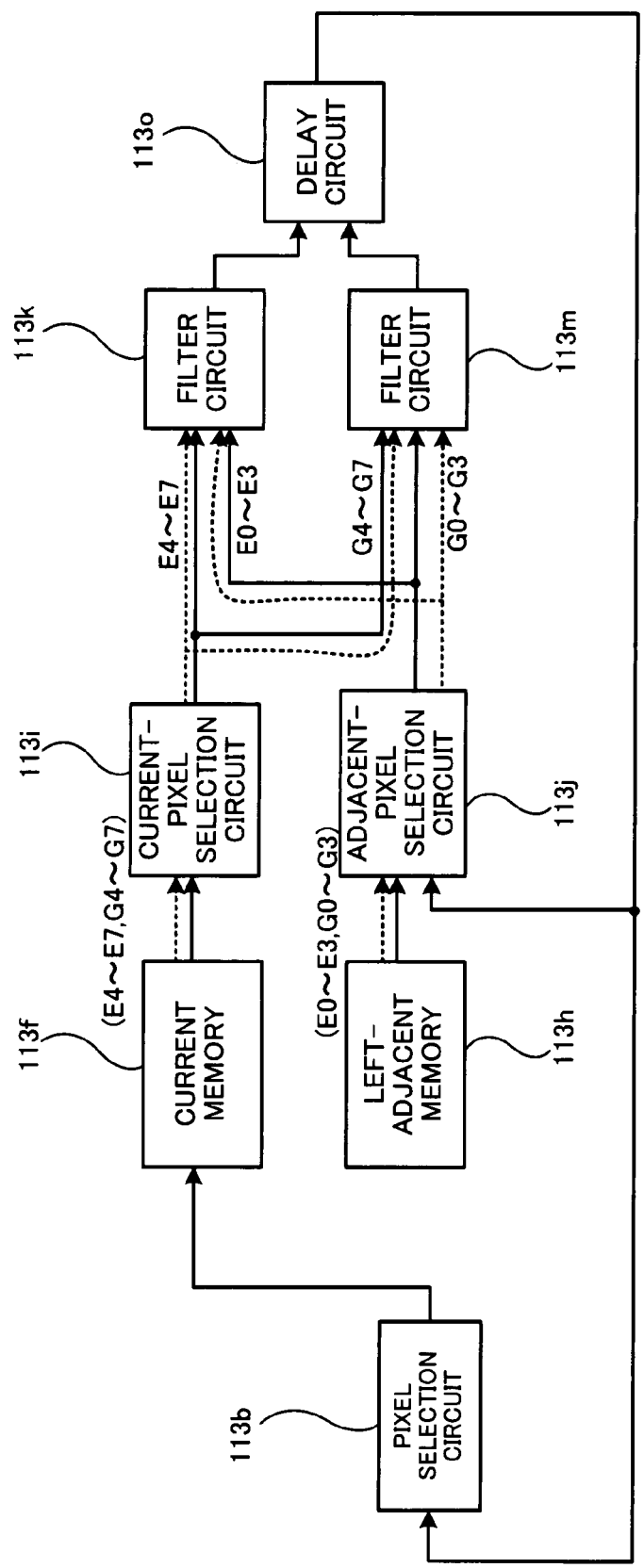
FIGS. 10 to 13 are diagrams indicating operations of the deblocking filter during the vertical-edge filtering according to the first embodiment in respective stages.

FIG. 10 shows the operations performed in the first stage in the vertical-edge filtering according to the first embodiment.

First, the groups of pixels E4 to E7 and G4 to G7 are outputted from the current memory 113*f* to the current-pixel selection circuit 113*i*. Then, the current-pixel selection circuit 113*i* supplies the group of pixels E4 to E7 to the filter circuit 113*k*, and the group of pixels G4 to G7 to the filter circuit 113*m*. In addition, the left-adjacent memory 113*h* outputs to the adjacent-pixel selection circuit 113*j* the groups of pixels E0 to E3 and G0 to G3, which are stored in the left-adjacent memory 113*h* in the preceding processing cycle. The adjacent-pixel selection circuit 113*j* supplies the group of pixels E0 to E3 to the filter circuit 113*k*, and the group of pixels G0 to G3 to the filter circuit 113*m*.

Then, the filter circuit 113*k* performs vertical-edge filtering by using the group of pixels E4 to E7 (which are outputted from the current memory 113*f* and selected by the current-pixel selection circuit 113*i*) and the group of pixels E0 to E3 (which are outputted from the left-adjacent memory 113*h* and selected by the adjacent-pixel selection circuit 113*j*), and outputs the result of the vertical-edge filtering to the delay circuit 113*o*. In parallel with the above operation by the filter circuit 113*k*, the filter circuit 113*m* performs vertical-edge filtering by using the group of pixels G4 to G7 (which are outputted from the current memory 113*f* and selected by the current-pixel selection circuit 113*i*) and the group of pixels G0 to G3 (which are outputted from the left-adjacent memory 113*h* and selected by the adjacent-pixel selection circuit 113*j*), and outputs the result of the vertical-edge filtering to the delay circuit 113*o*.

Figure 11:
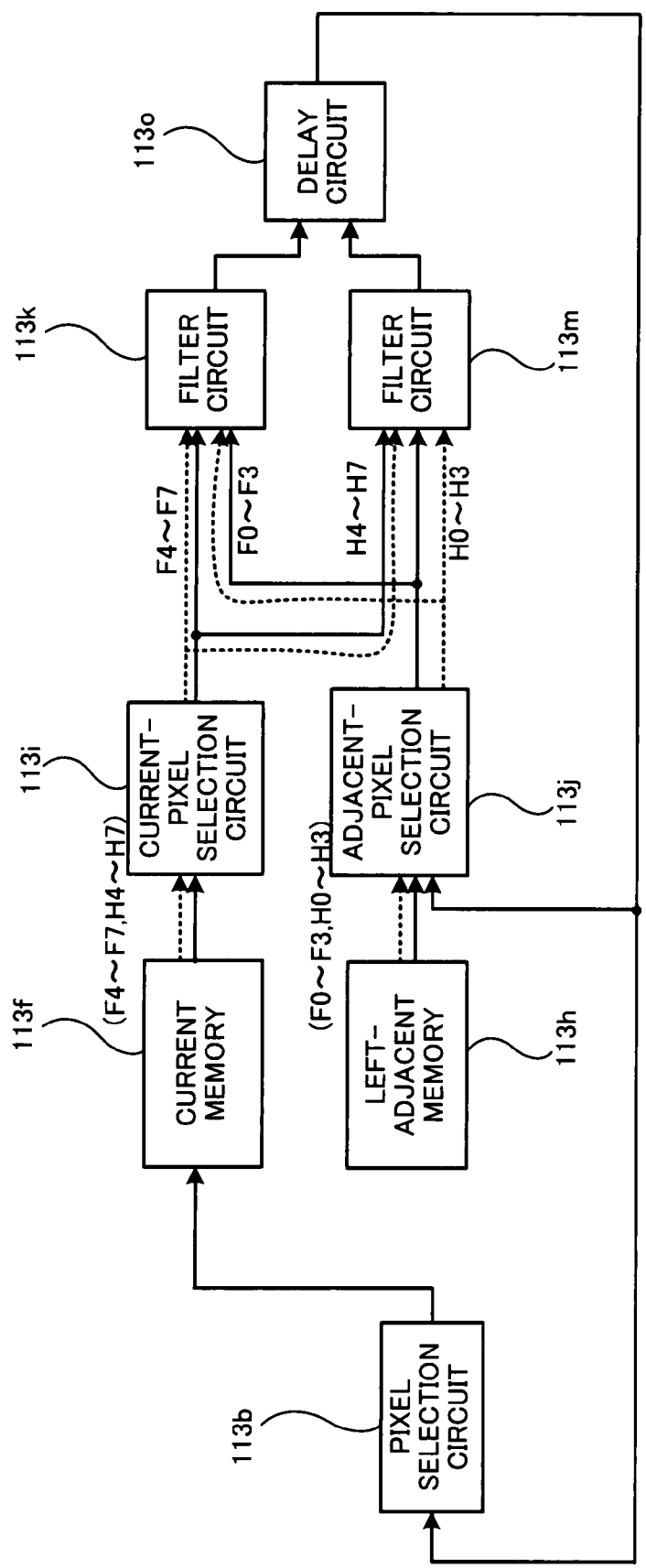

FIG. 11 shows the operations performed in the second stage in the vertical-edge filtering according to the first embodiment.

First, the groups of pixels F4 to F7 and H4 to H7 are outputted from the current memory 113*f* to the current-pixel selection circuit 113*i*. Then, the current-pixel selection circuit 113*i* supplies the group of pixels F4 to F7 to the filter circuit 113*k*, and the group of pixels H4 to H7 to the filter circuit 113*m*. In addition, the left-adjacent memory 113*h* outputs to the adjacent-pixel selection circuit 113*j* the groups of pixels F0 to F3 and H0 to H3, which are stored in the left-adjacent memory 113*h* in the preceding processing sequence. The adjacent-pixel selection circuit 113*j* supplies the group of pixels F0 to F3 to the filter circuit 113*k*, and the group of pixels H0 to H3 to the filter circuit 113*m*.

Then, the filter circuit 113*k* performs vertical-edge filtering by using the group of pixels F4 to F7 (which are outputted from the current memory 113*f* and selected by the current-pixel selection circuit 113*i*) and the group of pixels F0 to F3 (which are outputted from the left-adjacent memory 113*h* and selected by the adjacent-pixel selection circuit 113*j*), and outputs the result of the vertical-edge filtering to the delay circuit 113*o*. In parallel with the above operation by the filter circuit 113*k*, the filter circuit 113*m* performs vertical-edge filtering by using the group of pixels H4 to H7 (which are outputted from the current memory 113*f* and selected by the current-pixel selection circuit 113*i*) and the group of pixels H0 to H3 (which are outputted from the left-adjacent memory 113*h* and selected by the adjacent-pixel selection circuit 113*j*), and outputs the result of the vertical-edge filtering to the delay circuit 113*o*.

Figure 12:
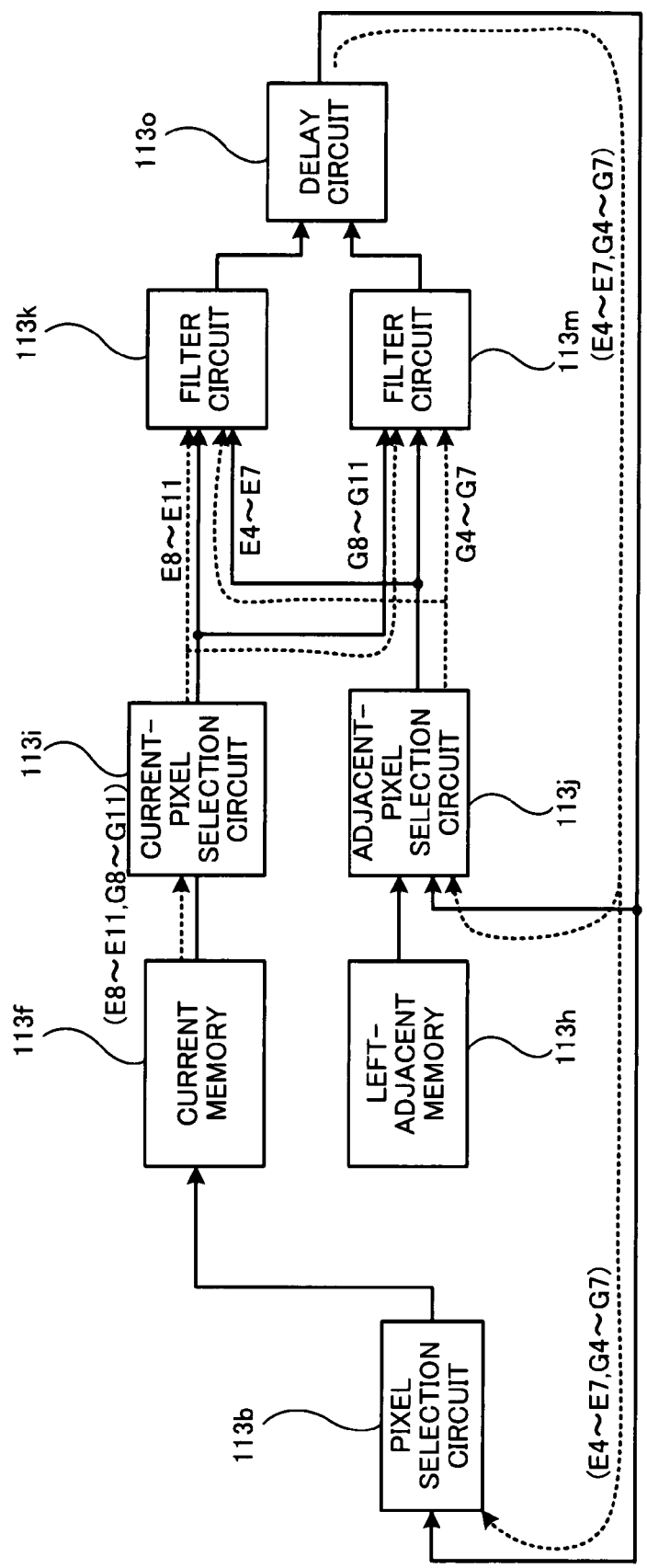

FIG. 12 shows the operations performed in the third stage in the vertical-edge filtering according to the first embodiment.

First, the delay circuit 113*o* outputs the groups of pixels E4 to E7 and G4 to G7 (one processing cycle after the groups of pixels E4 to E7 and G4 to G7 are inputted into the delay circuit 113*o*). Then, the adjacent-pixel selection circuit 113*j* supplies the group of pixels E4 to E7 (as a group of adjacent-side pixels) to the filter circuit 113*k*, and the group of pixels G4 to G7 (as a group of adjacent-side pixels) to the filter circuit 113*m*. In addition, the groups of pixels E8 to E11 and G8 to G11 are outputted from the current memory 113*f* to the current-pixel selection circuit 113*i*, and the current-pixel selection circuit 113*i* supplies the group of pixels E8 to E11 to the filter circuit 113*k*, and the group of pixels G8 to G11 to the filter circuit 113*m*.

Then, the filter circuit 113*k* performs vertical-edge filtering by using the group of pixels E8 to E11 (which are outputted from the current memory 113*f* and selected by the current-pixel selection circuit 113*i*) and the group of pixels E4 to E7 (which are outputted from the delay circuit 113*o* and selected by the adjacent-pixel selection circuit 113*j*), and outputs the result of the vertical-edge filtering to the delay circuit 113*o*. In parallel with the above operation by the filter circuit 113*k*, the filter circuit 113*m* performs vertical-edge filtering by using the group of pixels G8 to G11 (which are outputted from the current memory 113*f* and selected by the current-pixel selection circuit 113*i*) and the group of pixels G4 to G7 (which are outputted from the delay circuit 113*o* and selected by the adjacent-pixel selection circuit 113*j*), and outputs the result of the vertical-edge filtering to the delay circuit 113*o*.

Further, the pixel selection circuit 113*b* reads in the groups of pixels E4 to E7 and G4 to G7 outputted from the delay circuit 113*o*, and supplies the selected groups of pixels to the current memory 113*f*.

Figure 13:
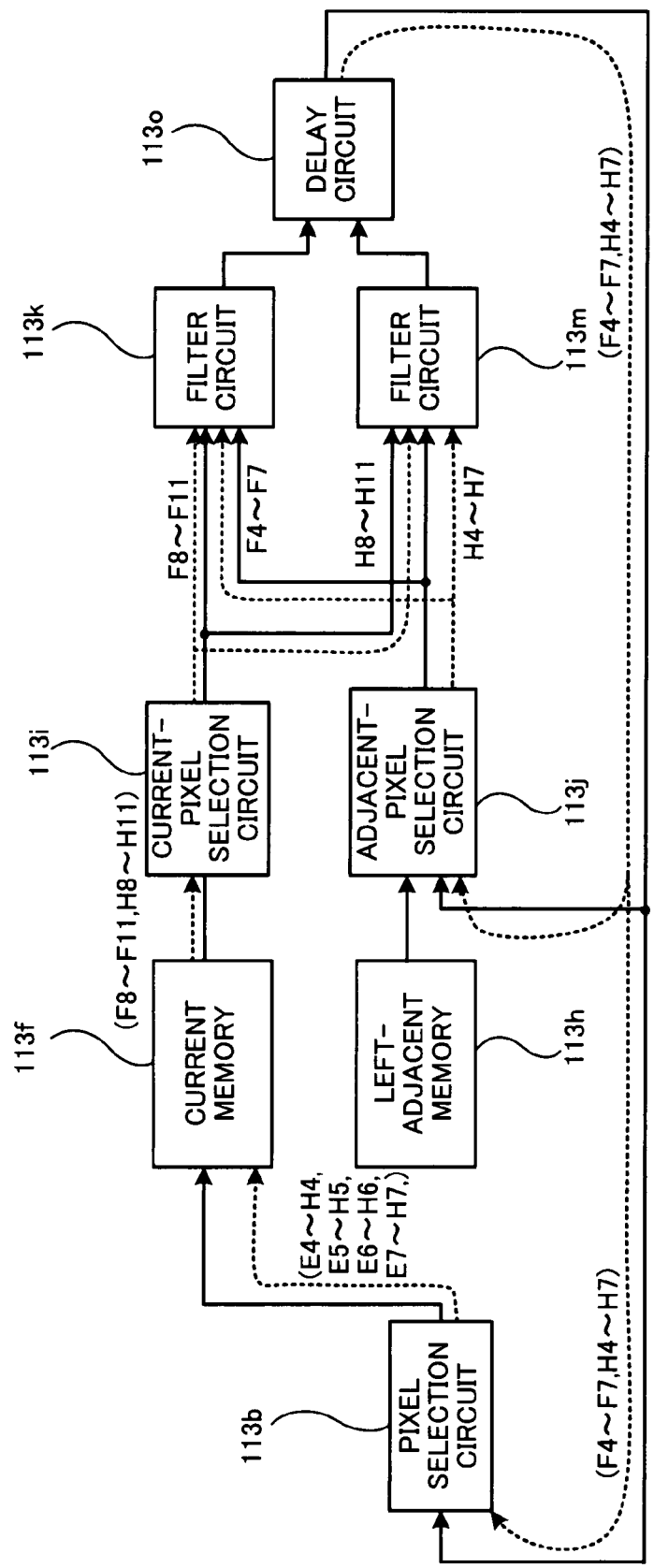

FIG. 13 shows the operations performed in the fourth stage in the vertical-edge filtering according to the first embodiment.

First, the delay circuit 113*o* outputs the groups of pixels F4 to F7 and H4 to H7. Then, the adjacent-pixel selection circuit 113*j* supplies the group of pixels F4 to F7 (as a group of adjacent-side pixels) to the filter circuit 113*k*, and the group of pixels H4 to H7 (as a group of adjacent-side pixels) to the filter circuit 113*m*. In addition, the groups of pixels F8 to F11 and H8 to H11 are outputted from the current memory 113*f* to the current-pixel selection circuit 113*i*, and the current-pixel selection circuit 113*i* supplies the group of pixels F8 to F11 to the filter circuit 113*k*, and the group of pixels H8 to H11 to the filter circuit 113*m*.

Then, the filter circuit 113*k* performs vertical-edge filtering by using the group of pixels F8 to F11 (which are outputted from the current memory 113*f* and selected by the current-pixel selection circuit 113*i*) and the group of pixels F4 to F7 (which are outputted from the delay circuit 113*o* and selected by the adjacent-pixel selection circuit 113*j*), and outputs the result of the vertical-edge filtering to the delay circuit 113*o*. In parallel with the above operation by the filter circuit 113*k*, the filter circuit 113*m* performs vertical-edge filtering by using the group of pixels H8 to H11 (which are outputted from the current memory 113*f* and selected by the current-pixel selection circuit 113*i*) and the group of pixels H4 to H7 (which are outputted from the delay circuit 113*o* and selected by the adjacent-pixel selection circuit 113*j*), and outputs the result of the vertical-edge filtering to the delay circuit 113*o*.

Further, the pixel selection circuit 113*b* reads in the groups of pixels F4 to F7 and H4 to H7 outputted from the delay circuit 113*o*, transposes in each column the pixels E4 to E7 and G4 to G7 (which are acquired in the first clock cycle in the second processing cycle) and the pixels F4 to F7 and H4 to H7 (which are acquired in the second (current) clock cycle in the second processing cycle), and outputs the group of transposed pixels E4, F4, G4, and H4, the group of transposed pixels E5, F5, G5, and H5, the group of transposed pixels E6, F6, G6, and H6, and the group of transposed pixels E7, F7, G7, and H7 to the current memory 113*f*. The write-memory controller 113*d* controls the current memory 113*f* so as to store in the current memory 113*f* the group of transposed pixels E4, F4, G4, and H4 and the group of transposed pixels E6, F6, G6, and H6 in the address #0, and the group of transposed pixels E5, F5, G5, and H5 and the group of transposed pixels E7, F7, G7, and H7 in the address #1.

Thereafter, in the subsequent processing cycles, operations similar to the above operations performed in the first processing cycle (i.e., in the first and second stages) are performed when the left-adjacent pixels belong to a reference macroblock, and operations similar to the above operations performed in the second processing cycle (i.e., in the third and fourth stages) are performed when the left-adjacent pixels belong to the current macroblock.

Further, the pixels E16 to E19, F16 to F19, G16 to G19, and H16 to H19, . . . , Q16 to Q19, R16 to R19, S16 to S19, and T16 to T19 edge-filtered by using pixels in the processing areas located in the rightmost position in the current macroblock as illustrated in FIG. 6D, 6H, 7D, or 7H are stored in the left-adjacent memory 113*h* as left-adjacent pixels for use in the subsequent vertical-edge filtering operations.

Figure 14:
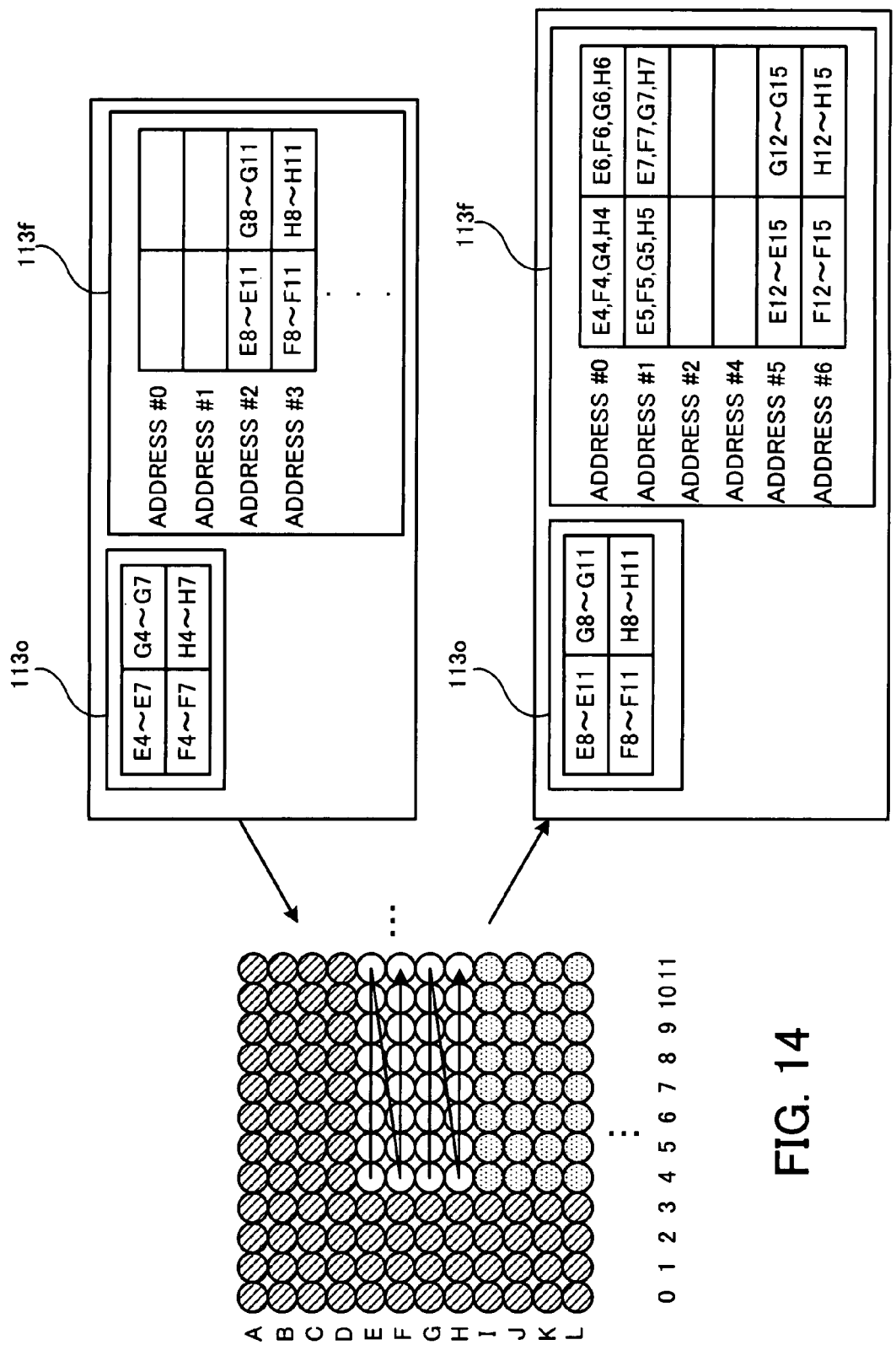
FIG. 14 is a diagram indicating examples of data which are stored in a current memory and a delay circuit before and after vertical-edge filtering according to the first embodiment.

FIG. 14 is a diagram indicating examples of data which are stored in the current memory 113*f* and the delay circuit 113*o* before and after vertical-edge filtering according to the first embodiment.

As illustrated in FIG. 14, in the stage preceding the first clock cycle in the second processing cycle, the group of pixels E4 to E7, F4 to F7, G4 to G7, and H4 to H7 are held in the delay circuit 113*o*, and the area of the address #0 in the current memory 113*f* is vacant since the groups of pixels E4 to E7 and G4 to G7 have already been read out from the address #0 in the first clock cycle in the first processing cycle. In addition, the area of the address #1 in the current memory 113*f* is also vacant since the groups of pixels F4 to F7 and H4 to H7 have already been read out from the address #1 in the second clock cycle in the first processing cycle.

After the operations in the second processing cycle are completed, the groups of pixels E8 to E11, F8 to F11, GB to G11, and H8 to H11 are held in the delay circuit 113*o*. In addition, the group of the pixels E4, F4, G4, and H4 and the group of the pixels E6, F6, G6, and H6 which are rearranged (transposed) by the pixel selection circuit 113*b* in the second processing cycle in the current vertical-edge filtering are stored in the address #0 in the second clock cycle in the second processing cycle, and the group of the pixels E5, F5, G5, and H5 and the group of the pixels E7, F7, G7, and H7 which are rearranged (transposed) by the pixel selection circuit 113*b* in the second processing cycle in the current vertical-edge filtering are stored in the address #1 in the second clock cycle in the second processing cycle.

Figure 15:
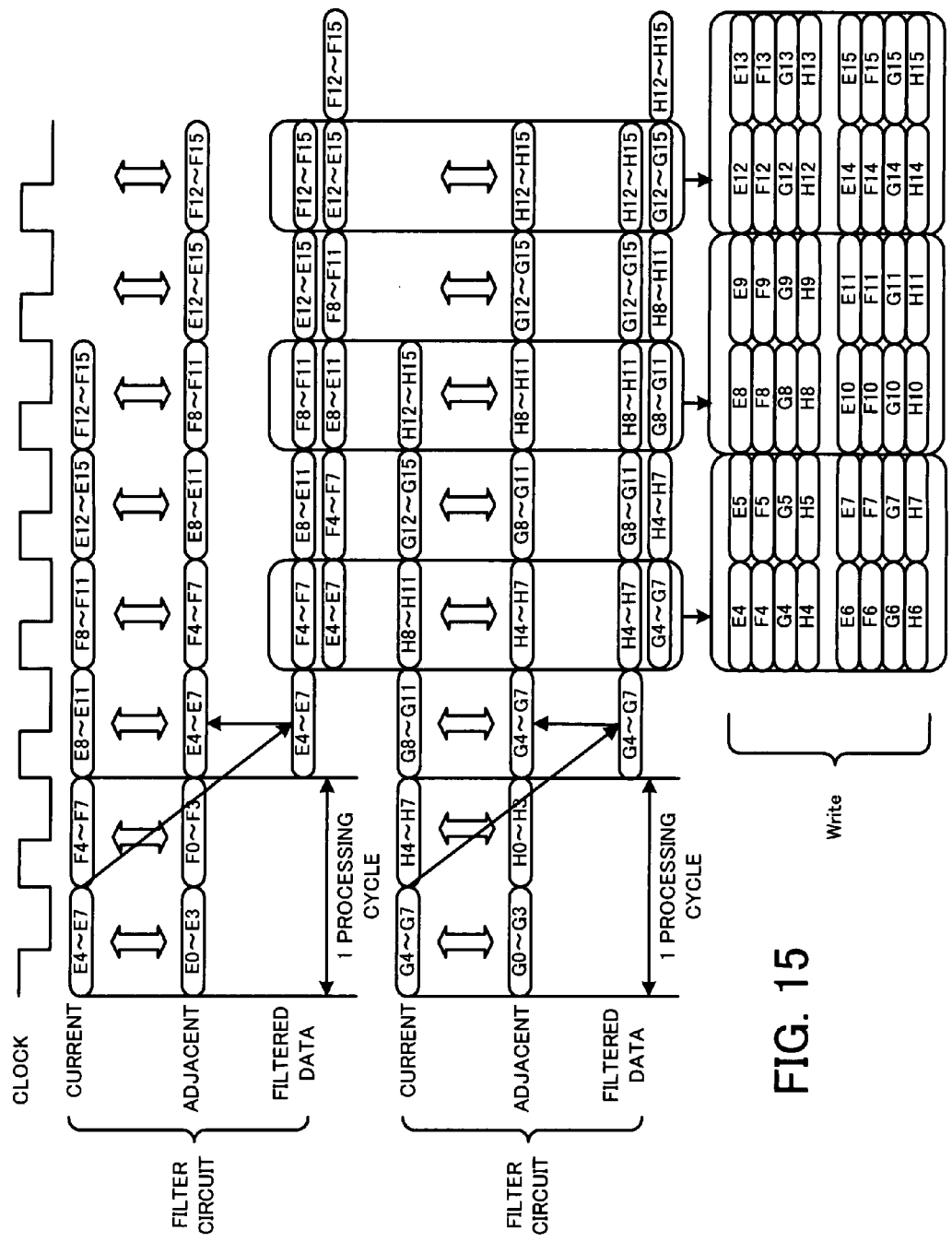
FIG. 15 is a sequence diagram indicating a sequence of operations performed in the deblocking filter according to the first embodiment.

FIG. 15 is a sequence diagram indicating a sequence of operations performed by the deblocking filter according to the first embodiment. In FIG. 15, "Current" indicates groups of pixels read out from the current memory 113*f*, "Adjacent" indicates groups of pixels read out from the left-adjacent memory 113*h*, "Filtered Data" indicates pixels outputted from the delay circuit 113*o*, "Write" indicates groups of pixels written back in the current memory 113*f* through the pixel selection circuit 113*b*, and each broad arrow symbol indicates a combination between groups of pixels.

As explained before, the operations in the first stage and the second stage are performed in the first one processing cycle (two clocks). Then the operations in the third stage and fourth stage are performed in the second one processing cycle. Then, before the operations in the third processing cycle, the groups of pixels in rows E to H columns 4 to 7, which are rearranged for horizontal-edge filtering, are written back in the current memory 113*f* through the pixel selection circuit 113*b*. Subsequently, after the operations in the third processing cycles (before the operations in the fourth processing cycle are performed), the groups of pixels in rows E to H columns 8 to 11, which are rearranged for horizontal-edge filtering, are written back in the current memory 113*f* through the pixel selection circuit 113*b*. After the operations in the fourth processing cycles (before the operations in the fifth processing cycle are performed), the groups of pixels in rows E to H columns 12 to 15, which are rearranged for horizontal-edge filtering, are written back in the current memory 113*f* through the pixel selection circuit 113*b*.

As described above, groups of pixels are rearranged for the horizontal-edge filtering. When the vertical-edge filtering is completed, the rearrangement of the groups of pixels for the horizontal-edge filtering is also completed, so that it is possible to speedily perform the horizontal-edge filtering.

2.3.2.2 Horizontal-edge Filtering (First Embodiment)

Next, horizontal-edge filtering according to the first embodiment is explained below. FIGS. 16A to 16H and 17A to 17H are diagrams indicating the processing areas and the groups of pixels used in respective processing cycles in the horizontal-edge filtering according to the first embodiment. In the horizontal-edge filtering, processing for filtering horizontal edges (edges oriented in the horizontal direction) is performed while scanning the current macroblock from top to bottom and from left to right by successively using the processing areas (each having a vertical width of eight pixels and a horizontal width of four pixels) as illustrated in FIGS. 16A to 16H and 17A to 17H, although, for simple illustration, the edges are indicated in only FIG. 16A. The processing areas are areas containing pixels used in the horizontal-edge filtering in the respective processing cycles. During the horizontal-edge filtering, groups of pixels located across edges oriented in the horizontal direction are processed in succession. In the horizontal-edge filtering, each processing cycle is also constituted by two clock cycles, and corresponds to the unit processing time. Every time processing for horizontal-edge filtering in a processing cycle using pixels in a first processing area is completed, processing for horizontal-edge filtering in the next processing cycle is performed by using pixels in a second processing area, which is located immediately below the first processing area.

Figure 16A:
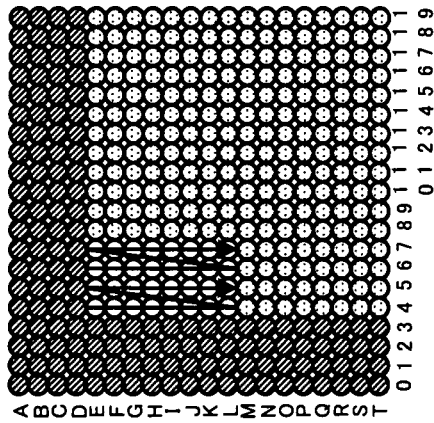

In the first processing cycle in the horizontal-edge filtering, the processing area is the area extending over the rows A to H and the columns 4 to 7 as illustrated in FIG. 16A. In the first clock cycle in the first processing cycle, the edge between the pixels D4 and E4 and the edge between the pixels D6 and E6, which are located along the horizontal direction, are concurrently processed by using the group of pixels A4, B4, C4, D4, E4, F4, G4, and H4 and the group of pixels A6, B6, C6, D6, E6, F6, G6, and H6. At this time, the processing using the group of pixels A4, B4, C4, D4, E4, F4, G4, and H4 is performed by the filter circuit 113*k*, and the processing using the group of pixels A6, B6, C6, D6, E6, F6, G6, and H6 is performed by the filter circuit 113*m*. Then, in the second clock cycle in the first processing cycle, the edge between the pixels D5 and E5 and the edge between the pixels D7 and E7, which are located along the horizontal direction, are concurrently processed by using the group of pixels A5, B5, C5, D5, E5, F5, G5, and H5 and the group of pixels A7, B7, C7, D7, E7, F7, G7, and H7. At this time, the processing using the group of pixels A5, B5, C5, D5, E5, F5, G5, and H5 is performed by the filter circuit 113*k*, and the processing using the group of pixels A7, B7, C7, D7, E7, F7, G7, and H7 is performed by the filter circuit 113*m*.

Figure 16B:
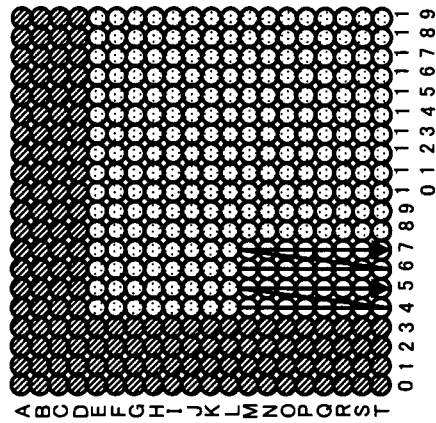
Figure 16C:
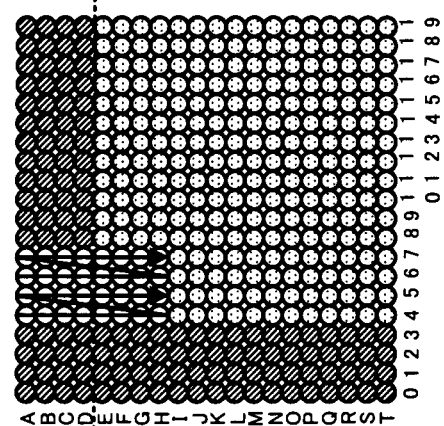
Figure 16D:
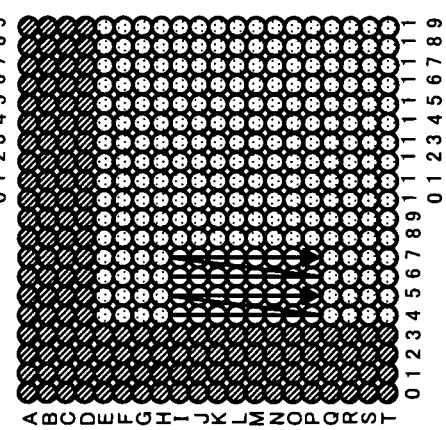
Figure 16E:
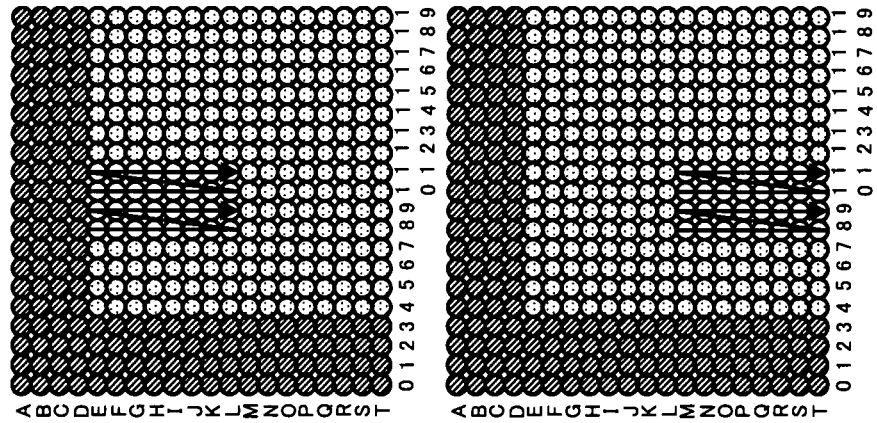
Figure 16G:
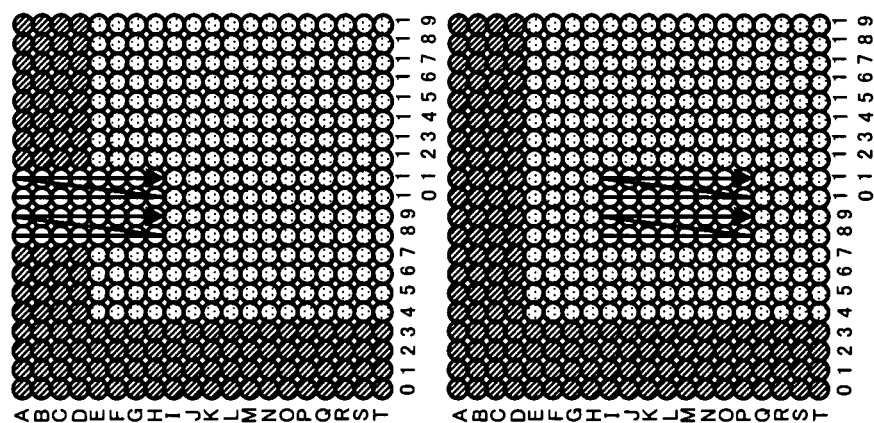
Figures 17E, 17F, 17G, 17H:
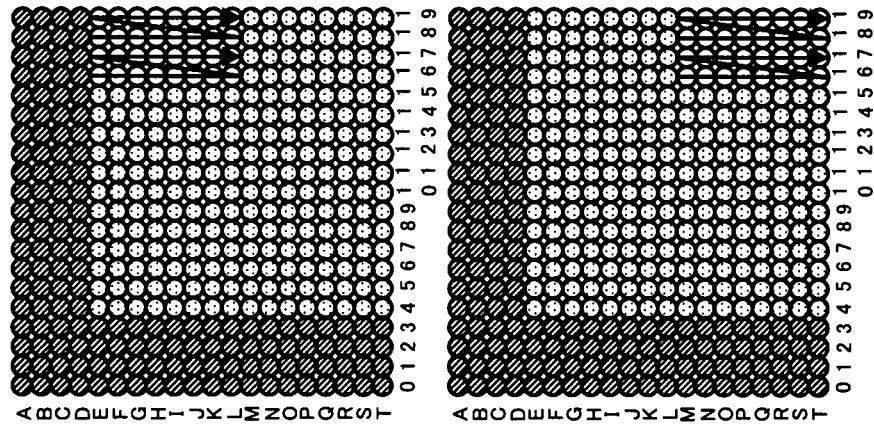

In the second processing cycle, the processing area illustrated in FIG. 16B is used, and similar processing to the first processing cycle is performed in the first and second clock cycles. When processing using pixels in a processing area located at the bottom of the current macroblock (for example, as illustrated in FIG. 16D) is completed, processing in the next processing cycle is performed by using pixels in the processing area located at the position across the top end of the current macroblock in the next four columns (for example, as illustrated in FIG. 16E). When processing using pixels in a processing area located at the right bottom of the current macroblock (for example, as illustrated in FIG. 17E) is completed, processing for the horizontal-edge filtering is completed.

The group of pixels A4, B4, C4, and D4, the group of pixels A5, B5, C5, and D5, . . . , the group of pixels A18, B18, C18, and D18, and the group of pixels A19, B19, C19, and D19 in the reference macroblock which are used in the horizontal-edge filtering are stored in advance in the external memory 113*r* in a preceding processing sequence in such a manner that the pixels in each group are arrayed in a column. When the horizontal-edge filtering of the current macroblock is performed, the data of the above pixels in the reference macroblock are inputted from the external memory 113*r* through the pixel selection circuit 113*a* into the upper-adjacent memory 113*g*. Specifically, when the processing areas located at the positions illustrated in FIGS. 16A, 16E, 17A, and 17E are used, the data of the pixels inputted into the upper-adjacent memory 113*g* as above are read out.

In addition, in the horizontal-edge filtering of the current macroblock, data of pixels as upper-adjacent pixels for horizontal-edge filtering of the next macroblock are stored in the external memory 113*r*. Specifically, the group of pixels Q4, R4, S4, and T4, the group of pixels Q5, R5, S5, and T5, . . . , the group of pixels Q18, R18, S18, and T18, and the group of pixels Q19, R19, S19, and T19 which are obtained by the horizontal-edge filtering performed by using the pixels in the processing areas illustrated in FIGS. 16D, 16H, 17D, and 17H are stored in the external memory 113*r* as the upper-adjacent pixels.

Next, operations of reading out the pixels from the current memory 113*f* to the filter circuits 113*k* and 113*m* during the vertical-edge filtering according to the first embodiment are explained below.

FIGS. 18A to 18H and 19A to 19H are diagrams indicating the areas of pixels which are read out (i.e., pixel-readout areas) in the respective processing cycles in the horizontal-edge filtering according to the first embodiment, where the pixel-readout areas indicated in FIGS. 18A to 18H and 19A to 19H respectively correspond to the processing areas indicated in FIGS. 16A to 16H and 17A to 17H. That is, the 4×4 pixels in the pixel-readout areas indicated in FIGS. 18A to 18H and 19A to 19H are successively read out in the respective processing cycles in the horizontal-edge filtering according to the first embodiment so as to scan the current macroblock from top to bottom and from left to right.

Figures 18B, 18D:
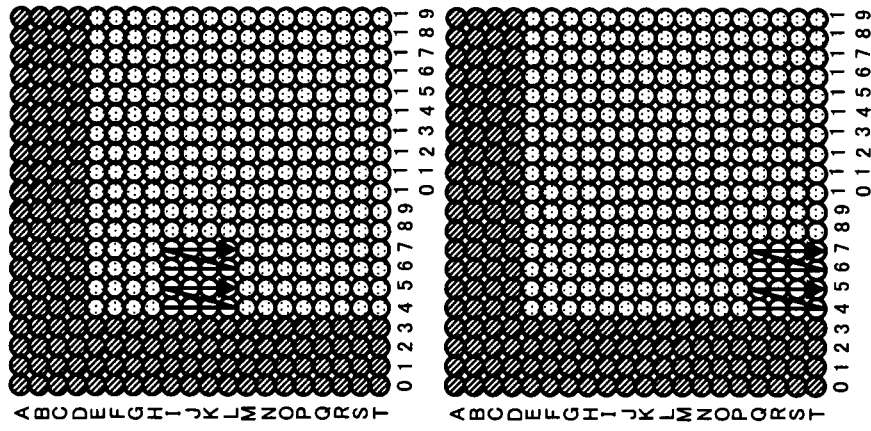
Figures 18A, 18C:
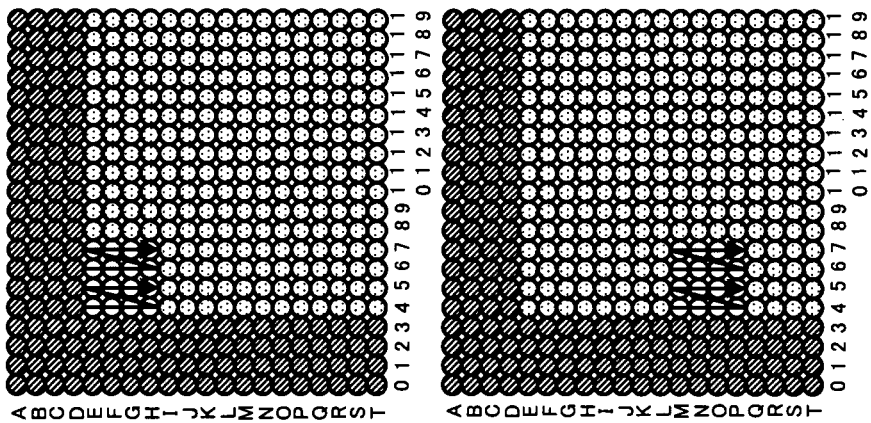
Figure 19A:
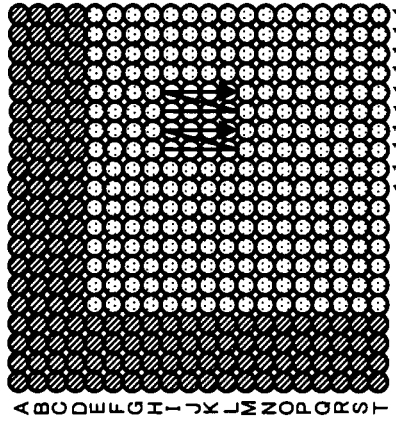
Figure 19B:
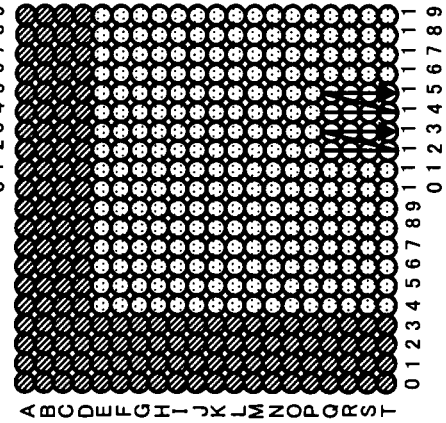
Figure 19C:
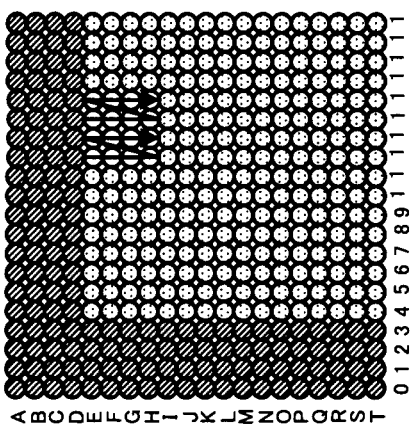
Figure 19D:
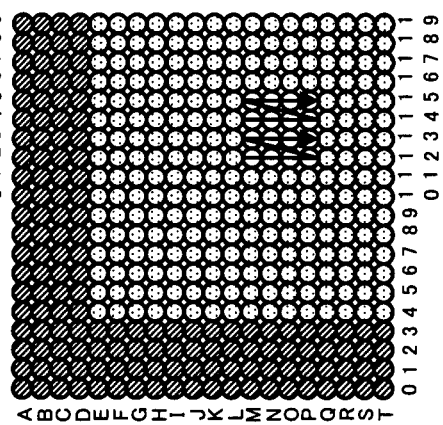
Figures 19E, 19F:
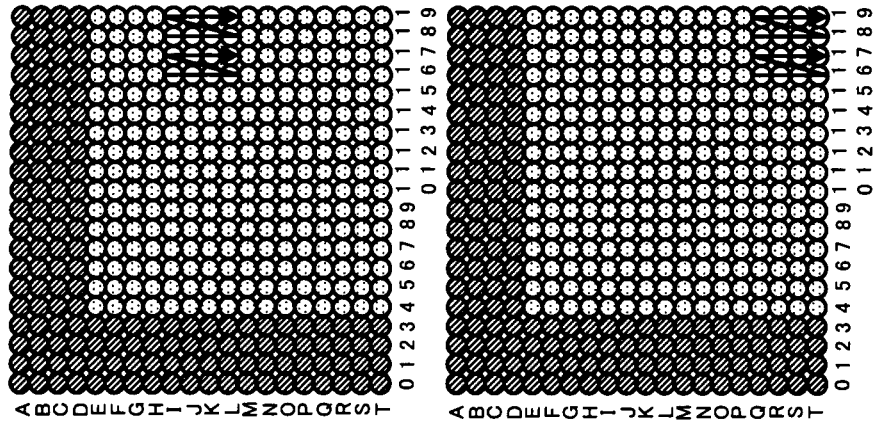
Figures 19G, 19H:
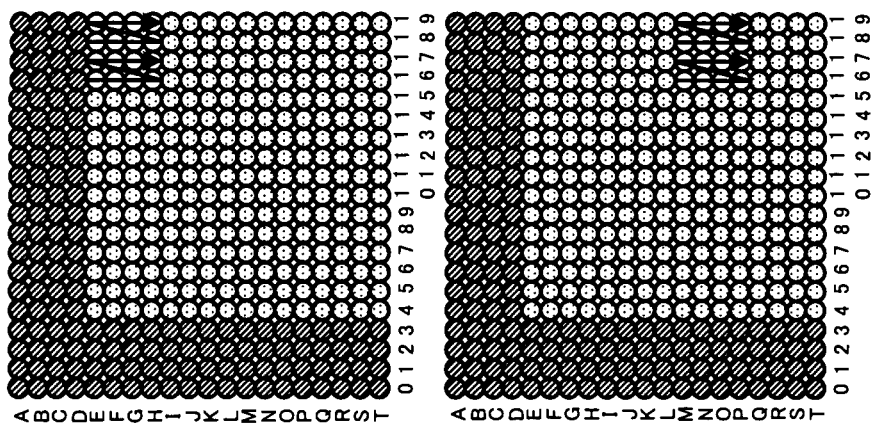

In the first and second clock cycles in the first processing cycle, the read-memory controller 113*e* reads out the 4×4 pixels in the first pixel-readout area located at the top left of the current macroblock as illustrated in FIG. 18A. Specifically, in the first clock cycle, the read-memory controller 113*e* reads out the group of four consecutive pixels E4, F4, G4, and H4 and the group of four consecutive pixels E6, F6, G6, and H6 in the first and third vertical lines (columns) in the first pixel-readout area. Then, in the second clock cycle, the read-memory controller 113*e* reads out the group of four consecutive pixels E5, F5, G5, and H5 and the group of four consecutive pixels E7, F7, G7, and H7 in the second and fourth vertical lines (columns) in the first pixel-readout area. That is, the pixels read out in the second clock cycle are respectively located in the columns next to the corresponding pixels read out in the first clock cycle.

In the first and second clock cycles in the second processing cycle, the read-memory controller 113*e* reads out the 4×4 pixels in the first pixel-readout area illustrated in FIG. 18B, which are located immediately below the first pixel-readout area. Specifically, in the first clock cycle, the read-memory controller 113*e* reads out the group of four consecutive pixels I4, J4, K4, and L4 and the group of four consecutive pixels I6, J6, K6, and L6 in the first and third vertical lines (columns) in the second pixel-readout area. Then, in the second clock cycle, the read-memory controller 113*e* reads out the group of four consecutive pixels I5, J5, K5, and L5 and the group of four consecutive pixels I7, J7, K7, and L7 in the second and fourth vertical lines (columns) in the second pixel-readout area. That is, the pixels read out in the second clock cycle are respectively located in the columns next to the corresponding pixels read out in the first clock cycle.

After the 4×4 pixels in the pixel-readout area located at the bottom of the current macroblock as illustrated in FIG. 18D are read out in the fourth processing cycle, the 4×4 pixels in the pixel-readout area located at the bottom of the current macroblock as illustrated in FIG. 18E, which is located at the uppermost position in the next four columns in the current macroblock, are read out in the next (fifth) processing cycle. Specifically, in the first clock cycle in the fifth processing cycle, the read-memory controller 113*e* reads out the group of four consecutive pixels E8, F8, G8, and H8 and the group of four consecutive pixels E10, F10, G10, and H10 in the first and third vertical lines (columns) in the fifth pixel-readout area. Then, in the second clock cycle in the fifth processing cycle, the read-memory controller 113*e* reads out the group of four consecutive pixels E9, F9, G9, and H9 and the group of four consecutive pixels E11, F11, G11, and H11 in the second and fourth vertical lines (columns) in the fifth pixel-readout area. That is, the pixels read out in the second clock cycle are respectively located in the columns next to the corresponding pixels read out in the first clock cycle.

Thereafter, the read-memory controller 113*e* performs similar operations for reading out 4×4 pixels in the remaining pixel-readout areas illustrated in FIGS. 18F to 18H and 19A to 19H in succession in the subsequent processing cycles, so that all the pixels in the current macroblock are read out.

2.3.3 Advantages of Deblocking Filter (First Embodiment)

As described before, according to the first embodiment of the present invention, a plurality of groups of pixels arrayed in a plurality of rows are concurrently processed for vertical-edge filtering by the filter circuits 113*k* and 113*m*, so that it is possible to speedily acquire pixels for horizontal-edge filtering. In addition, since the pixel selection circuit 113*b* rearranges the vertical-edge-filtered pixels into groups of pixels arrayed in columns and writes back the rearranged groups of pixels in the current memory 113*f*, the read-memory controller 113e can continuously read out groups of pixels from the current memory 113f in the horizontal-edge filtering.

Further, according to the first embodiment, two groups of four consecutive pixels arrayed in two lines (columns) are concurrently read out in the horizontal-edge filtering, it is sufficient that the current memory 113f have a storage capacity of eight pixels for each address, while the storage capacity of sixteen pixels is necessary for each address in the conventional horizontal-edge filtering. Therefore, according to the first embodiment, it is possible to efficiently use the memory compared with the conventional deblocking filter.

Furthermore, since the filter circuits 113k and 113m are arranged in parallel, it is possible to speedily prepare pixels for use in the horizontal-edge filtering, after the vertical-edge filtering.

For example, in the case where each frame has the size of 1920×1088 pixels, the time necessary for vertical-edge filtering of each macroblock in the conventional deblocking filter is estimated at 96 clock cycles as the sum of the number of clock cycles necessary for processing of the luminance component in each macroblock (64) and the number of clock cycles necessary for processing of the chrominance components in each macroblock (32), where the number of clock cycles necessary for processing of the luminance component in each macroblock (64) is estimated as the product of the number of clock cycles necessary for processing of the luminance component in each line (4) and the number of lines in the luminance block (16), and the number of clock cycles necessary for processing of the chrominance components in each macroblock (32) is estimated as the product of the number of clock cycles necessary for processing of each chrominance components (2) and the number of lines in the chrominance blocks (16).

In the above case, the time necessary for the horizontal-edge filtering of each macroblock is estimated at 448 clock cycles as the sum of the number of clock cycles necessary for processing of the luminance component in each macroblock (320) and the number of clock cycles necessary for processing of the chrominance components in each macroblock (128), where the number of clock cycles necessary for processing of the luminance component in each macroblock (320) is estimated as the product of the number of clock cycles necessary for processing of the luminance component in each line (20) and the number of the lines in luminance block (16), and the number of clock cycles necessary for processing of the chrominance components (128) is estimated as the product of the number of clock cycles necessary for processing of the chrominance components in each line (8) and the number of the lines in the chrominance blocks (16). The number of clock cycles necessary for processing of the luminance component in each line (20) is estimated by obtaining the product of the number of clock cycles necessary for processing of each edge (4) and the number of edges in each line (4), and adding four (clock cycles) to the product. The number of clock cycles necessary for processing of the chrominance components in each line (8) is estimated as the sum of the number of clock cycles necessary for readout and filtering (6) and the number of clock cycles necessary for writing (2).

Thus, the total number of clock cycles necessary for the edge filtering of each macroblock is estimated at 544 as the sum of the number of clock cycles necessary for the vertical-edge filtering of each macroblock (96) and the number of clock cycles necessary for the horizontal-edge filtering of each macroblock (448). In the case where the operational frequency of the deblocking filter is 100 MHz, the processing time per frame is estimated at 40.839 milliseconds as the product of the total number of clock cycles necessary for the edge filtering of each macroblock (544), the number of macroblocks arrayed in the row direction (120), the number of macroblocks arrayed in the column direction (68), and the clock period (9.2 nanoseconds). For example, the time necessary for processing 30 frames per second is estimated at 1.225 seconds as the product of the above processing time per frame (40.839 milliseconds) and the number of frames (30). Therefore, in the case where processing of 30 frames per second is required, the processing of 30 frames cannot be completed in a second.

On the other hand, the time necessary for vertical-edge filtering of each macroblock in the deblocking filter according to the first embodiment is estimated at 48 clock cycles as the sum of the number of clock cycles necessary for processing of the luminance component in each macroblock (32) and the number of clock cycles necessary for processing of the chrominance components in each macroblock (16), where the number of clock cycles necessary for processing of the luminance component in each macroblock (32) is estimated as the product of the number of clock cycles necessary for processing of each 4×4 block in the luminance block in each macroblock (2) and the number of 4×4 blocks in the luminance block in each macroblock (16), and the number of clock cycles necessary for processing of the chrominance components in each macroblock (8) is estimated as the product of the number of clock cycles necessary for processing of each 4×4 block in each of the two chrominance blocks in each macroblock (2) and the number of 4×4 blocks in the two chrominance blocks (4).

In addition, the time necessary for the horizontal-edge filtering of each macroblock in the deblocking filter according to the first embodiment is estimated at 204 clock cycles as the sum of the number of clock cycles necessary for processing of the luminance component in each macroblock (130) and the number of clock cycles necessary for processing of the chrominance components in each macroblock (74). The number of clock cycles necessary for processing of the luminance component (130) is estimated as the sum of the number of clock cycles necessary for processing of the luminance block in each macroblock (64), the number of clock cycles necessary for the writing operations at the bottom of the luminance block (16), and the number of delay clock cycles in the buffer circuits (50) during the horizontal-edge filtering of the luminance component in each macroblock. The number of clock cycles necessary for the horizontal-edge filtering of the luminance block (64) is estimated as the product of the number of clock cycles necessary for the horizontal-edge filtering of each of the 4×4 blocks in the luminance block (4) and the number of the 4×4 blocks in the luminance block (16). The number of clock cycles necessary for the writing operations at the bottom of the luminance block (16) is estimated as the product of the number of clock cycles necessary for the writing operation for each of the 4×4 blocks located at the bottom of the luminance block (4) and the number of the 4×4 blocks located at the bottom of the luminance block (4). The number of delay clock cycles in the buffer circuits (50) is estimated as 25 clock cycles multiplied by two. The number of clock cycles necessary for processing of the chrominance components in each macroblock (74) is estimated as the sum of the number of clock cycles necessary for processing of the two chrominance blocks in each macroblock (32), the number of clock cycles necessary for the writing operations at the bottom of the two chrominance blocks (8), and the number of delay clock cycles in the buffer circuits (34) during the horizontal-edge filtering of the chrominance components in each macroblock. The number of clock cycles necessary for processing of the two chrominance blocks in each macroblock (32) is estimated as the product of the number of clock cycles necessary for processing of each of the 4×4 blocks in the two chrominance blocks (4) and the number of 4×4 blocks in the two chrominance blocks in each macroblock (8). The number of clock cycles necessary for the writing operations at the bottom of the chrominance blocks (8) is estimated as the product of the number of clock cycles necessary for the writing operation at each of the 4×4 blocks located at the bottom of the luminance block (4) and the number of the 4×4 blocks located at the bottom of the luminance block (2). The delay in the buffer circuits during the horizontal-edge filtering of the chrominance components (34 clock cycles) in each macroblock is estimated as 17 clock cycles multiplied by two.

Thus, the total number of clock cycles necessary for the edge filtering of each macroblock is estimated at 252 clock cycles as the sum of 48 clock cycles necessary for the vertical-edge filtering of each macroblock and 204 clock cycles necessary for the horizontal-edge filtering of each macroblock. In the case where the operational frequency of the deblocking filter is 100 MHz, the processing time per frame is estimated at 18.918 milliseconds as the product of the total number of clock cycles necessary for the edge filtering of each macroblock (252), the number of macroblocks arrayed in the row direction (120), the number of macroblocks arrayed in the column direction (68), and the clock period (9.2 nanoseconds). For example, the time necessary for processing 30 frames per second is estimated at 0.568 seconds as the product of the above total time for the edge filtering of each macroblock (18.918 milliseconds) and the number of frames (30). That is, the time necessary for edge-filtering of a macroblock in the deblocking filter 113 according to the first embodiment of the present invention is less than half of the time necessary in the conventional deblocking filter. Therefore, even in the case where processing of 30 frames per second is required, the processing can be completed in a second.

2.3.4 Construction of Deblocking Filter (Second Embodiment)

Figure 20:
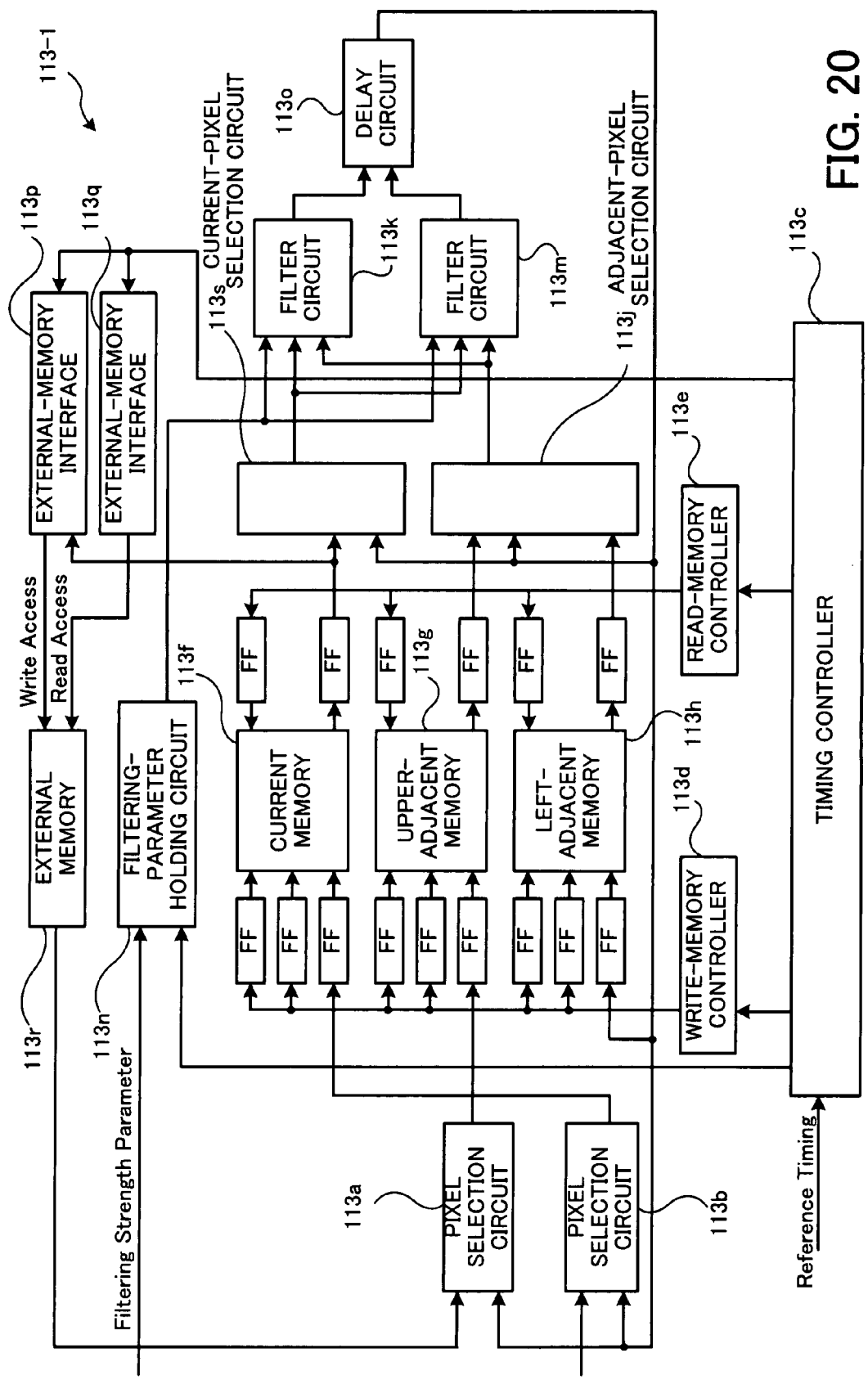
FIG. 20 is a circuit block diagram indicating a deblocking filter according to a second embodiment of the present invention.

Hereinbelow, a deblocking filter according to the second embodiment of the present invention is explained below. In the following explanations of the second embodiment, basically only the differences from the first embodiment are described, and similar features and operations to the first embodiment are not explained below. FIG. 20 is a circuit block diagram indicating a deblocking filter according to the second embodiment of the present invention.

The deblocking filter 113-1 of FIG. 20 according to the second embodiment is different from the first embodiment only in that the arrangement and the functions of the current-pixel selection circuit 113s in the deblocking filter 113-1 of FIG. 20 are different from the arrangement and the functions of the current-pixel selection circuit 113i in the deblocking filter 113 of FIG. 4.

The output terminals of the delay circuit 113o and the current memory 113f are connected to the input terminals of the current-pixel selection circuit 113s. The current-pixel selection circuit 113s selects one of the filter circuits 113k and 113m as a destination of each group of pixels outputted from the delay circuit 113o or the current memory 113f, and outputs the group of pixels to the selected one of the filter circuits 113k and 113m.

In addition, each of the adjacent-pixel selection circuit 113j and the current-pixel selection circuit 113s has four buffer circuits each of which can hold 2×2 pixels.

2.3.5 Processing in Deblocking Filter (Second Embodiment)

Hereinbelow, the processing performed by the deblocking filter 113-1 according to the second embodiment is explained. The edge-filtering according to the second embodiment is performed in the case where the current macroblock is non-interlaced and the reference macroblocks are interlaced, i.e., interlaced and non-interlaced macroblocks are mixed in an image signal.

2.3.5.1 Vertical-edge Filtering (Second Embodiment)

First, vertical-edge filtering according to the second embodiment is explained below. FIGS. 21A to 21H are diagrams indicating the groups of pixels used in respective processing cycles in vertical-edge filtering according to the second embodiment. In the case where the current macroblock is non-interlaced and the reference macroblock is interlaced, vertical-edge filtering of the current macroblock constituted by the groups of pixels E4 to E19, F4 to F19, . . . , K4 to K19, and L4 to L19 (indicated in FIGS. 21A to 21E) is performed while preparing for horizontal-edge filtering. Specifically, as illustrated in FIGS. 21A to 21H, first, groups of pixels arrayed in the odd-numbered rows from the row A in 4×4 blocks located adjacent in the column direction are concurrently processed in each processing cycle, and subsequently, groups of pixels arrayed in the even-numbered rows from the row A in the 4×4 blocks are concurrently processed in each processing cycle.

Figure 21A:
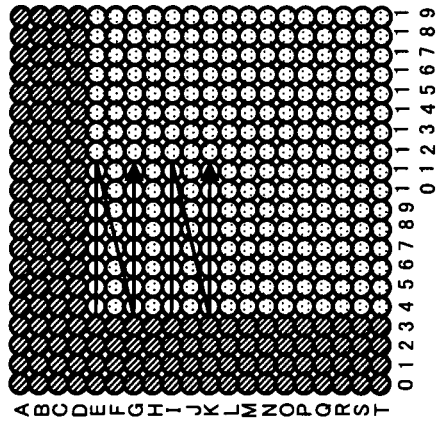
FIGS. 21A to 21H are diagrams indicating the groups of pixels used in respective processing cycles in vertical-edge filtering according to the second embodiment.

To be more specific, in the first clock cycle in the first processing cycle, the edge between the pixels E3 and E4 and the edge between the pixels I3 and I4, which are located along the vertical direction, are concurrently processed by using the group of pixels E0 to E7 and the group of pixels I0 to I7 as illustrated in FIG. 21A. At this time, the processing using the group of pixels E0 to E7 is performed by the filter circuit 113k, and the processing using the group of pixels I0 to I7 is performed by the filter circuit 113m. Subsequently, in the second clock cycle in the first processing cycle, the edge between the pixels G3 and G4 and the edge between the pixels K3 and K4, which are located along the vertical direction, are concurrently processed by using the group of pixels G0 to G7 and the group of pixels K0 to K7 as illustrated in FIG. 21A. At this time, the processing using the group of pixels G0 to G7 is performed by the filter circuit 113k, and the processing using the group of pixels K0 to K7 is performed by the filter circuit 113m.

Figure 21B:
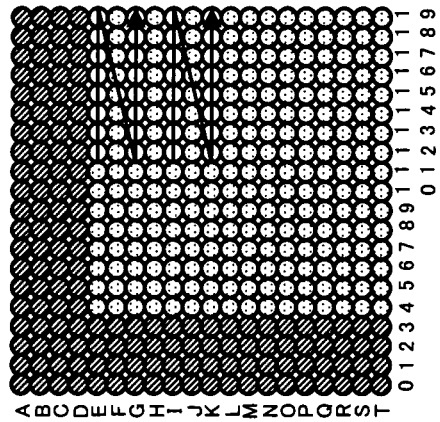
Figure 21C:
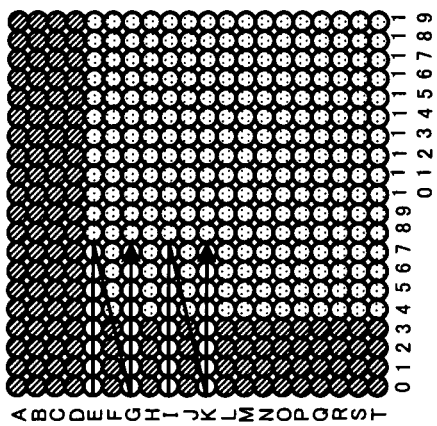
Figure 21D:
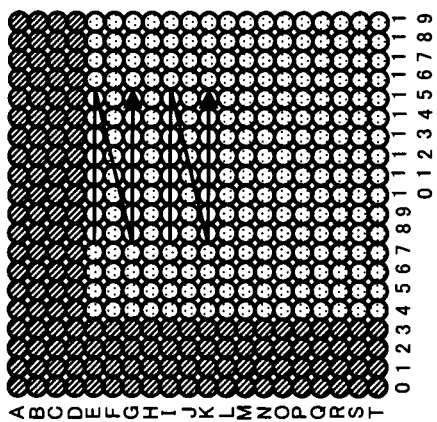
Figures 21F, 21H:
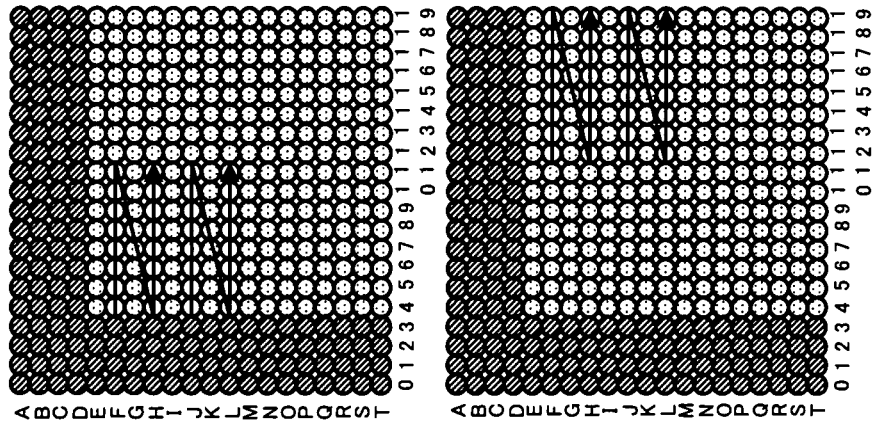
Figures 21E, 21G:
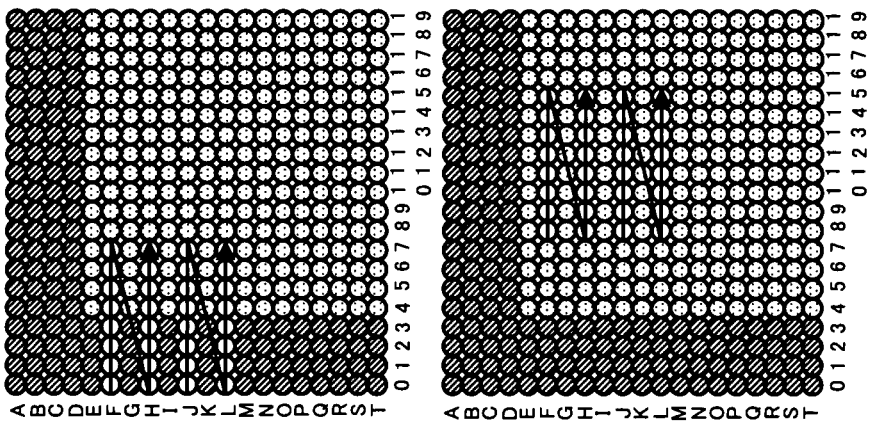

Thereafter, every time vertical-edge filtering of first edges is completed in a processing cycle by using first groups of pixels containing the first edges, vertical-edge filtering of second edges is performed in the next processing cycle by using second groups of pixels containing the second edges and being respectively shifted rightward by four pixels from the first groups of pixels. For example, the groups of pixels as illustrated in FIGS. 21B and 21C are used in the second and third processing cycles, respectively. When processing using the groups of pixels located at the right end of the current macroblock as illustrated in FIG. 21D is completed in the fourth processing cycle, processing in the next (fifth) processing cycle is performed by using the groups of pixels located across the left end of the current macroblock in the rows respectively one row below the groups of pixels used in the first processing cycle as illustrated in FIG. 21E. Specifically, the edge between the pixels F3 and F4 and the edge between the pixels J3 and J4 are concurrently processed by using the group of pixels F0 to F7 and the group of pixels J0 to J7 in the first clock cycle in the fifth processing cycle. At this time, the processing using the group of pixels F0 to F7 is performed by the filter circuit 113k, and the processing using the group of pixels J0 to J7 is performed by the filter circuit 113m. Subsequently, the edge between the pixels H3 and H4 and the edge between the pixels L3 and L4 are concurrently processed by using the group of pixels H0 to H7 and the group of pixels L0 to L7 in the second clock cycle in the fifth processing cycle. At this time, the processing using the group of pixels H0 to H7 is performed by the filter circuit 113k, and the processing using the group of pixels L0 to L7 is performed by the filter circuit 113m.

After the above operations, in each of the subsequent processing cycles, processing using the groups of pixels which are respectively shifted rightward by four pixels from the groups of pixels used in the preceding processing cycle are performed in succession until the groups of pixels reach the right end of the current macroblock. For example, the groups of pixels as illustrated in FIGS. 21F to 21H are used in the sixth and eighth processing cycles, respectively. When the groups of pixels reach the right end of the current macroblock in a first processing cycle, processing in the next (second) processing cycle is performed by using groups of pixels located across the left end of the current macroblock in the rows respectively one row below the groups of pixels used in the first processing cycle. When the groups of pixels reach the right bottom of the current macroblock, the vertical-edge filtering according to the second embodiment is completed.

As described above, the deblocking filter 113-1 reads out all the pixels in the current macroblock, and performs the vertical-edge filtering.

2.3.5.2 Horizontal-edge Filtering (Second Embodiment)

Next, horizontal-edge filtering according to the second embodiment is explained below. FIGS. 22A to 22E, 23A to 23E, 24A to 24E, and 25A to 25E are diagrams indicating the processing areas and the groups of pixels used in respective processing cycles (in respective stages) in the horizontal-edge filtering according to the second embodiment. In the horizontal-edge filtering, processing for filtering horizontal edges (edges oriented in the horizontal direction) is performed while scanning the current macroblock from top to bottom and from left to right by successively using the processing areas as illustrated in FIGS. 22A to 22E, 23A to 23E, 24A to 24E, and 25A to 25E. The processing areas are areas containing pixels used in the horizontal-edge filtering in the respective processing cycles. In the case where the current macroblock is non-interlaced and the reference macroblock is interlaced, the processing of the horizontal edges between the current macroblock and the reference macroblock is performed on alternate lines (rows).

Figure 22A:
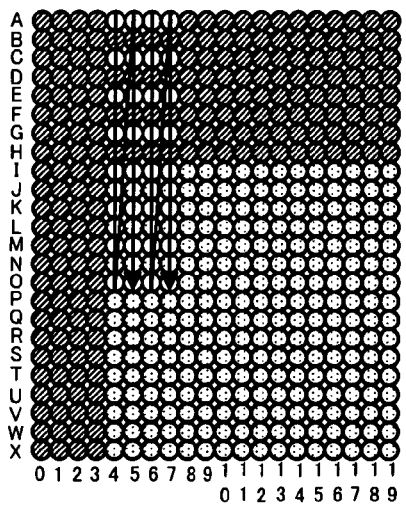
FIGS. 22A to 22E, 23A to 23E, 24A to 24E, and 25A to 25E are diagrams indicating the processing areas and the groups of pixels used in respective processing cycles in the horizontal-edge filtering according to the second embodiment.

In the first stage (in the first processing cycle), the processing corresponding to the top field is performed. That is, in the first clock cycle in the first processing cycle, groups of pixels arrayed in a predetermined number of odd-numbered rows from the row A in the columns 4 and 6 in the processing area indicated in FIG. 22A are concurrently processed. Specifically, in the first clock cycle in the first processing cycle, the group of pixels A4, C4, E4, G4, I4, K4, M4, and O4 are processed by the filter circuit 113k, and the group of pixels A6, C6, E6, G6, I6, K6, M6, and O6 are processed by the filter circuit 113m. Subsequently, in the second clock cycle in the first processing cycle, groups of pixels arrayed in the predetermined number of odd-numbered rows from the row A in the columns 5 and 7 in the processing area indicated in FIG. 22A are concurrently processed. Specifically, the group of pixels A5, C5, E5, G5, I5, K5, M5, and O5 are processed by the filter circuit 113k, and the group of pixels A7, C7, E7, G7, I7, K7, M7, and O7 are processed by the filter circuit 113m.

Figure 22B:
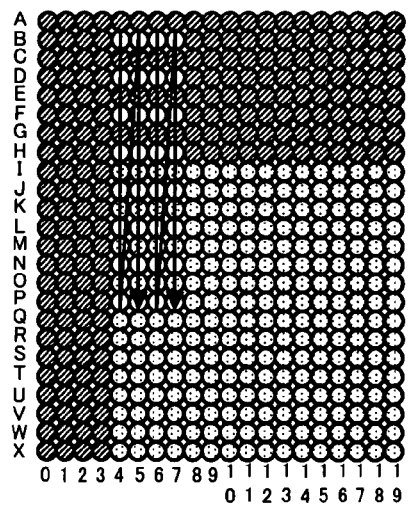

Next, after an interval of one processing cycle, in the third stage (in the third processing cycle), the processing corresponding to the bottom field is performed. That is, in the first clock cycle in the third processing cycle, groups of pixels arrayed in the predetermined number of even-numbered rows from the row A in the columns 4 and 6 in the processing area indicated in FIG. 22B are concurrently processed. Specifically, in the first clock cycle in the third processing cycle, the group of pixels B4, D4, F4, H4, J4, L4, N4, and P4 are processed by the filter circuit 113k, and the group of pixels B6, D6, F6, H6, J6, L6, N6, and P6 are processed by the filter circuit 113m. Subsequently, in the second clock cycle in the third processing cycle, groups of pixels arrayed in the predetermined number of even-numbered rows from the row A in the columns 5 and 7 in the processing area indicated in FIG. 22B are concurrently processed. Specifically, in the second clock cycle in the third processing cycle, the group of pixels B5, D5, F5, H5, J5, L5, N5, and P5 are processed by the filter circuit 113k, and the group of pixels B7, D7, F7, H7, J7, L7, N7, and P7 are processed by the filter circuit 113m. Thus, in the first and third processing cycles, the horizontal edges between the current macroblock and the upper adjacent macroblock in the columns 4 to 7 are filtered.

Figure 22C:
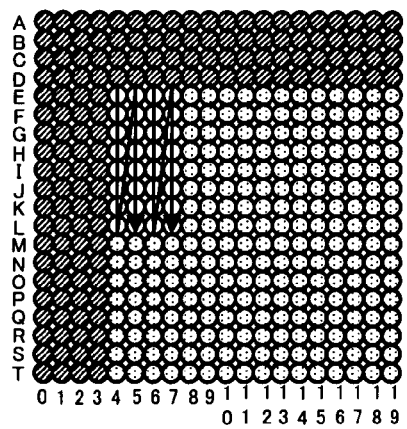
Figure 22D:
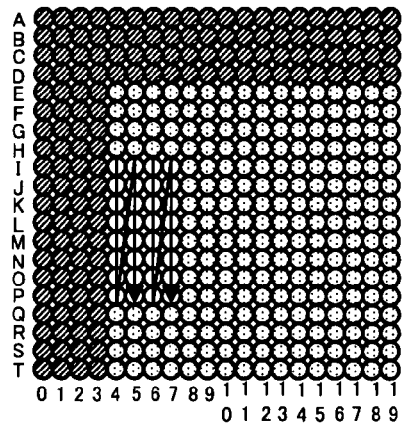
Figure 22E:
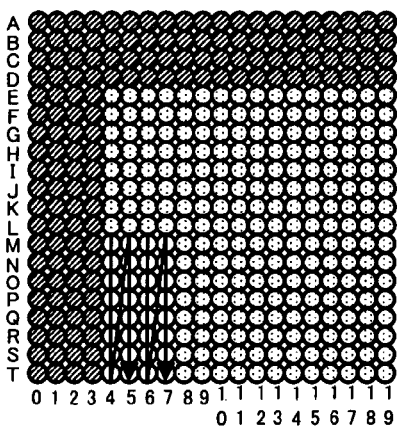

Thereafter, horizontal-edge filtering of pixels in the non-interlaced region is performed by successively using the pixels in the processing areas illustrated in FIGS. 22C to 22E in the fourth to sixth processing cycles in similar manners to the first embodiment. After the processing using the pixels in the processing area located at the bottom of the current macroblock as illustrated in FIG. 22E is completed in the sixth cycle, processing similar to the processing in the first stage using the pixels in the processing area illustrated in FIG. 22A is performed in the seventh processing cycle by using groups of pixels arrayed in a predetermined number of odd-numbered rows from the row A in the processing area indicated in FIG. 23A, which is located at the right of the processing area illustrated in FIG. 22A. Next, after an interval of one processing cycle, processing similar to the processing in the third stage using the pixels in the processing area illustrated in FIG. 22B is performed in the ninth processing cycle by using groups of pixels arrayed in a predetermined number of odd-numbered rows from the row A in the processing area indicated in FIG. 23B.

Figure 23A:
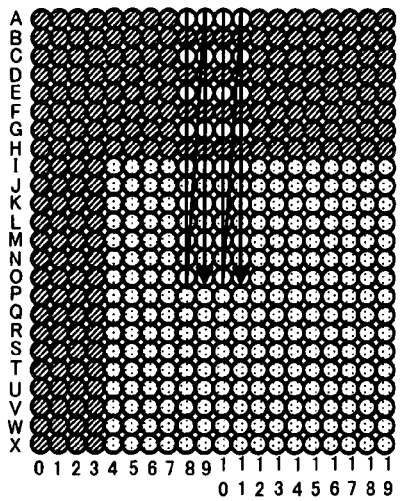
Figure 23B:
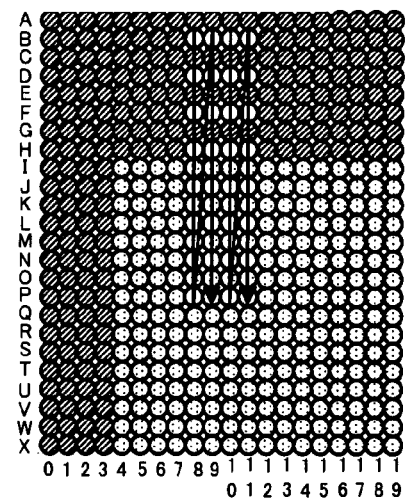
Figure 23C:
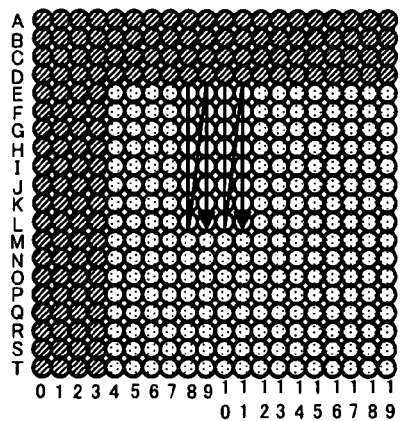
Figure 23D:
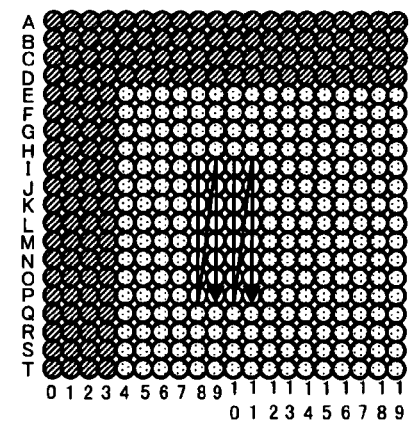
Figure 23E:
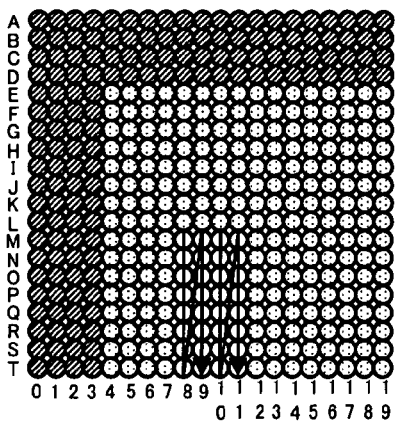
Figure 24A:
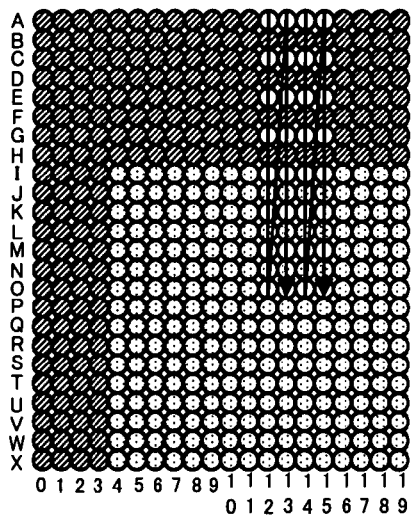
Figure 24B:
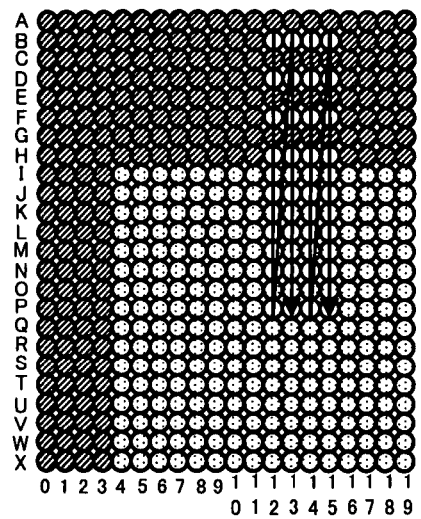
Figure 24C:
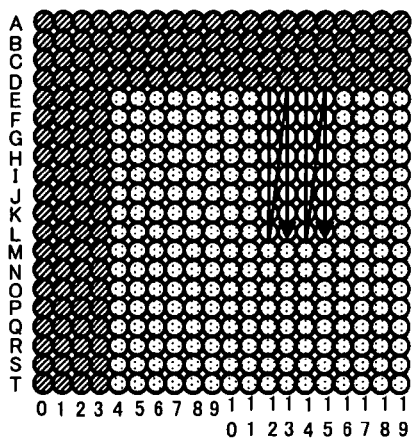
Figure 24D:
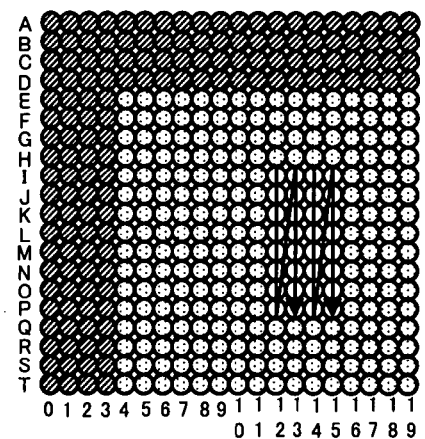
Figure 24E:
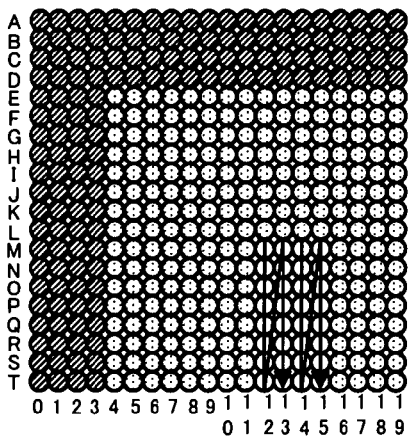
Figure 25A:
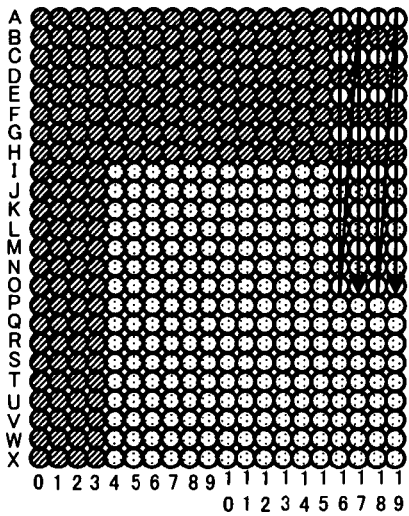
Figure 25B:
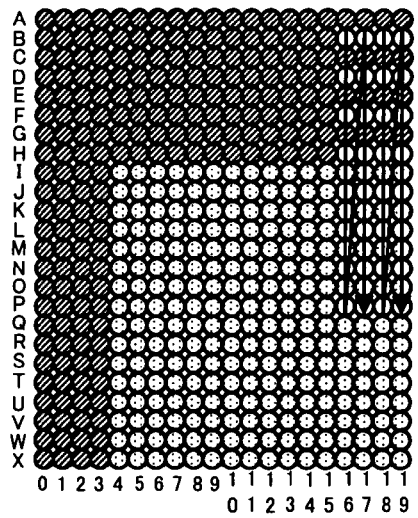
Figure 25C:
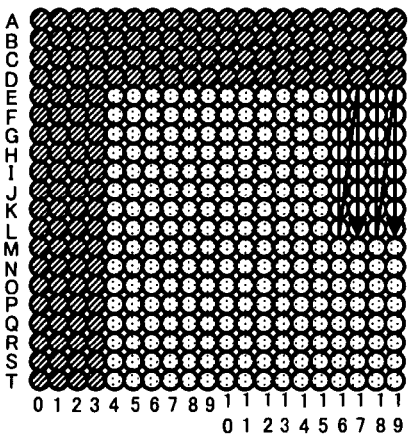
Figure 25D:
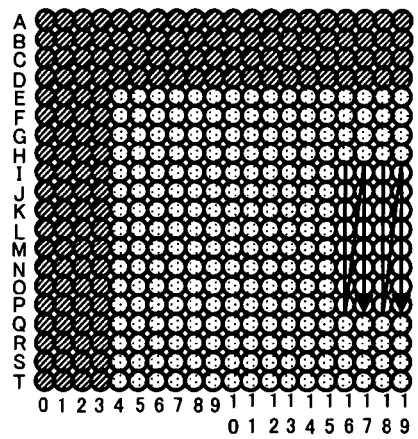
Figure 25E:
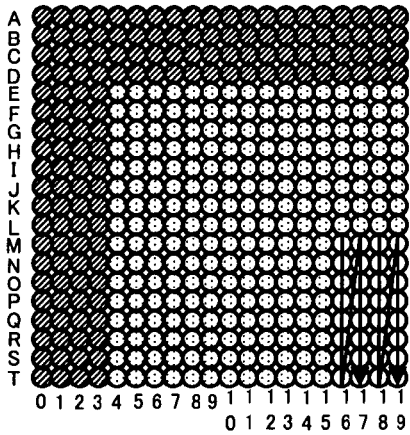

Subsequently, horizontal-edge filtering of pixels in the non-interlaced region is performed in the tenth to twelfth processing cycles by successively using the pixels in the processing areas illustrated in FIGS. 23C to 23E in similar manners to the processing in the fourth to sixth processing cycles. After the above operations, processing similar to the processing using the pixels in the processing areas illustrated in FIGS. 22A to 22E (or FIGS. 23A to 23E) is performed by using the pixels in the processing areas illustrated in FIGS. 24A to 24E, and is thereafter performed by using the pixels in the processing areas illustrated in FIGS. 25A to 25E. When the processing using the pixels in the processing area illustrated in FIG. 25E is completed, the horizontal-edge filtering according to the second embodiment is completed.

FIGS. 26 to 32 are diagrams indicating operations of the deblocking filter during the horizontal-edge filtering according to the second embodiment in respective stages.

Figure 26:
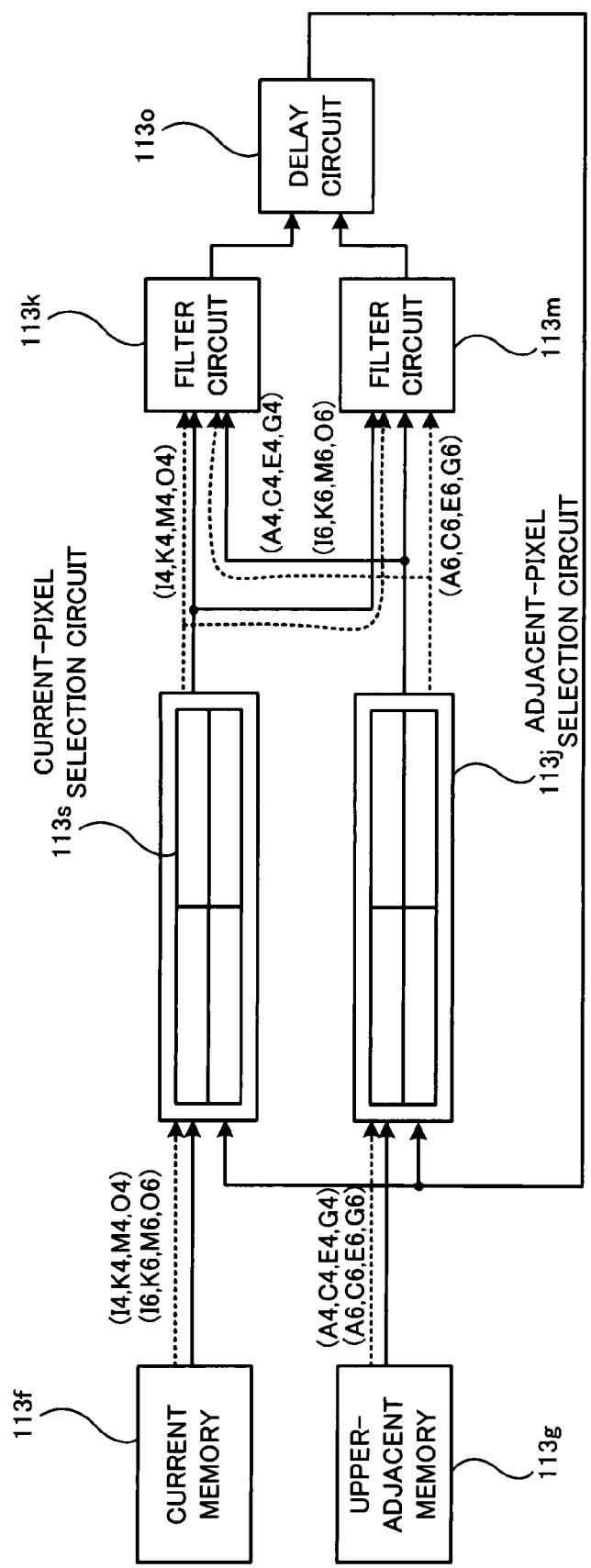
FIGS. 26 to 32 are diagrams indicating operations of the deblocking filter during the horizontal-edge filtering according to the second embodiment in respective stages.
Figure 27:
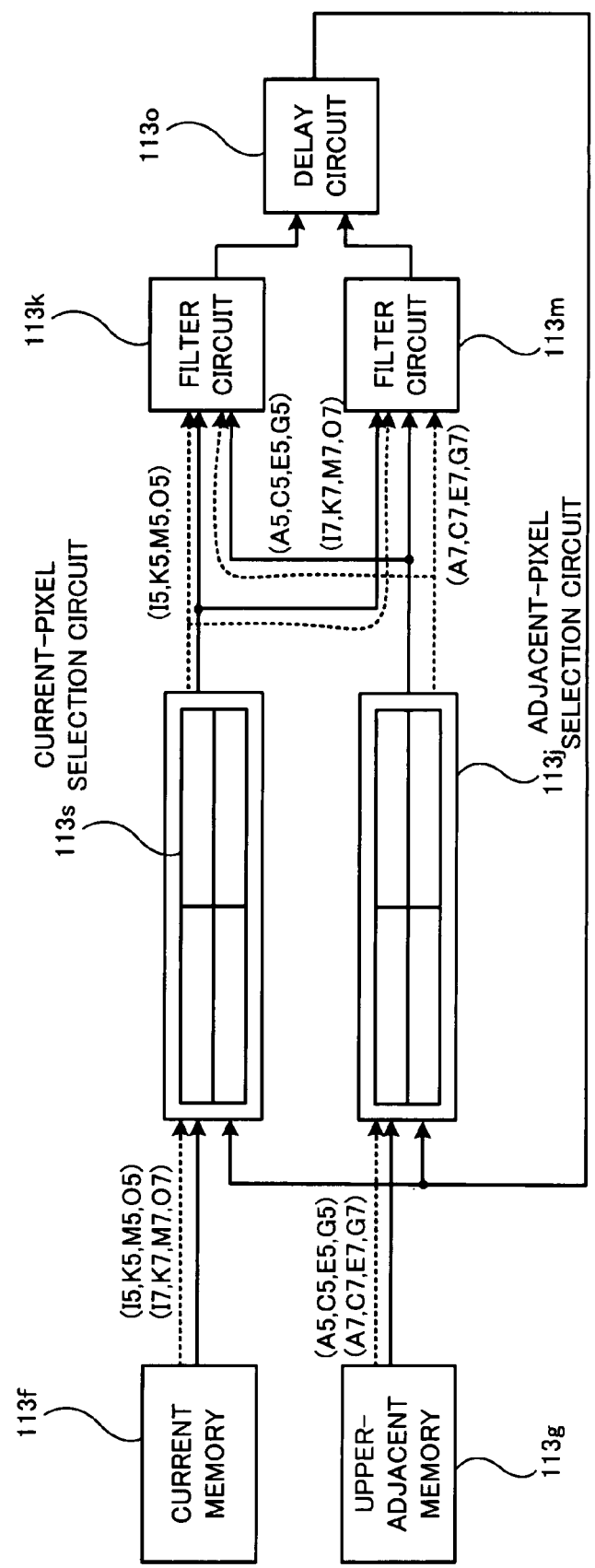

FIGS. 26 and 27 respectively show the operations performed in the first and second clock cycles in the first stage (in the first processing cycle) in the horizontal-edge filtering according to the second embodiment.

The edge-filtering is performed by using the group of pixels A4 to A7, C4 to C7, E4 to E7, and G4 to G7 and the group of pixels I4 to I7, K4 to K7, M4 to M7, and O4 to O7.

Specifically, in the first clock cycle in the first processing cycle, as illustrated in FIG. 26, the group of pixels A4, C4, E4, and G4 and the group of pixels A6, C6, E6, and G6 are read out from the upper-adjacent memory 113g, and the group of pixels I4, K4, M4, and O4 and the group of pixels I6, K6, M6, and O6 are read out from the current memory 113f. Then, the current-pixel selection circuit 113s supplies the group of pixels I4, K4, M4, and O4 to the filter circuit 113k, and the group of pixels I6, K6, M6, and O6 to the filter circuit 113m, and the adjacent-pixel selection circuit 113j supplies the group of pixels A4, C4, E4, and G4 to the filter circuit 113k, and the group of pixels A6, C6, E6, and G6 to the filter circuit 113m. The filter circuits 113k and 113m perform horizontal-edge filtering by using the above groups of pixels supplied to the filter circuits 113k and 113m, respectively.

The groups of pixels read out from the upper-adjacent memory 113g in the first stage are a portion of data which are stored in the external memory 113r by the preceding edge-filtering operation and are then stored in the upper-adjacent memory 113g by the pixel selection circuit 113a.

Next, in the second clock cycle in the first processing cycle, as illustrated in FIG. 27, the group of pixels A5, C5, E5, and G5 and the group of pixels A7, C7, E7, and G7 are read out from the upper-adjacent memory 113g, and the group of pixels I5, K5, M5, and O5 and the group of pixels I7, K7, M7, and O7 are read out from the current memory 113f. Then, the current-pixel selection circuit 113s supplies the group of pixels I5, K5, M5, and O5 to the filter circuit 113k, and the group of pixels I7, K7, M7, and O7 to the filter circuit 113m, and the adjacent-pixel selection circuit 113j supplies the group of pixels A5, C5, E5, and G5 to the filter circuit 113k, and the group of pixels A7, C7, E7, and G7 to the filter circuit 113m. The filter circuits 113k and 113m perform horizontal-edge filtering by using the above groups of pixels supplied to the filter circuits 113k and 113m, respectively.

Figure 28:
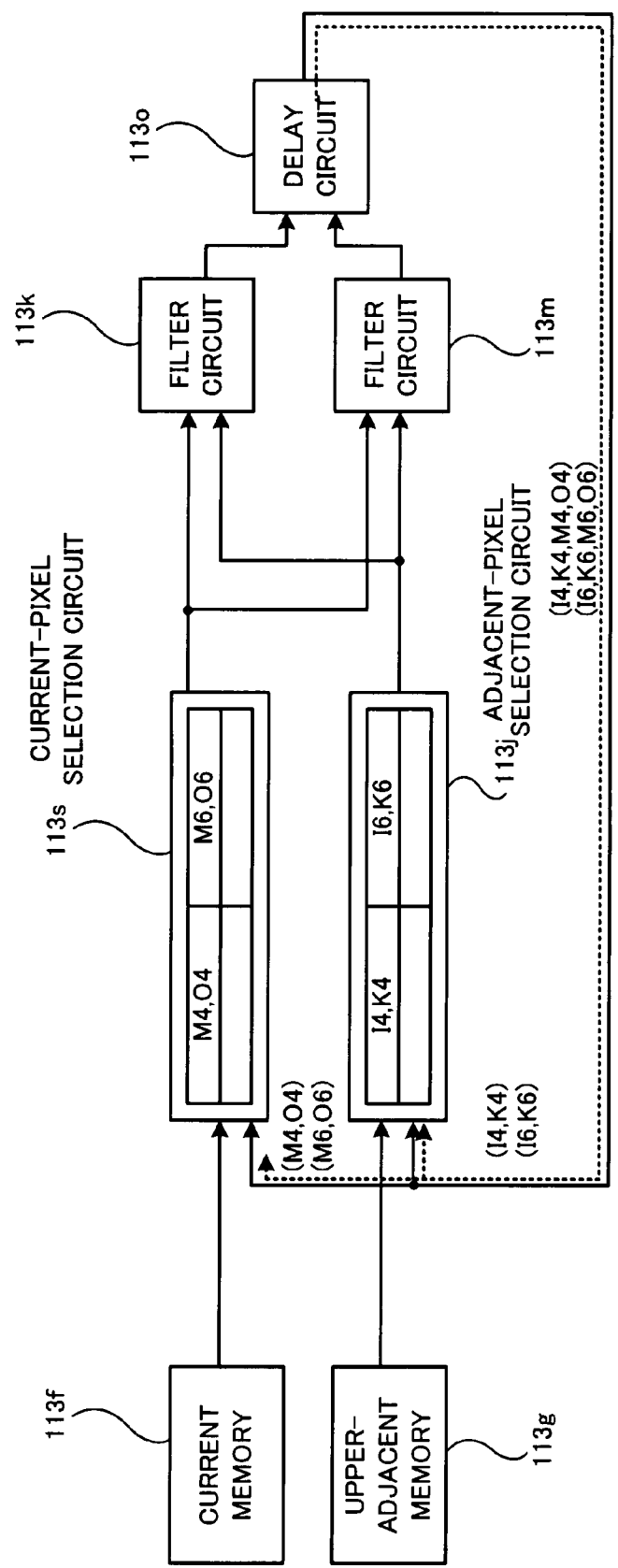
Figure 29:
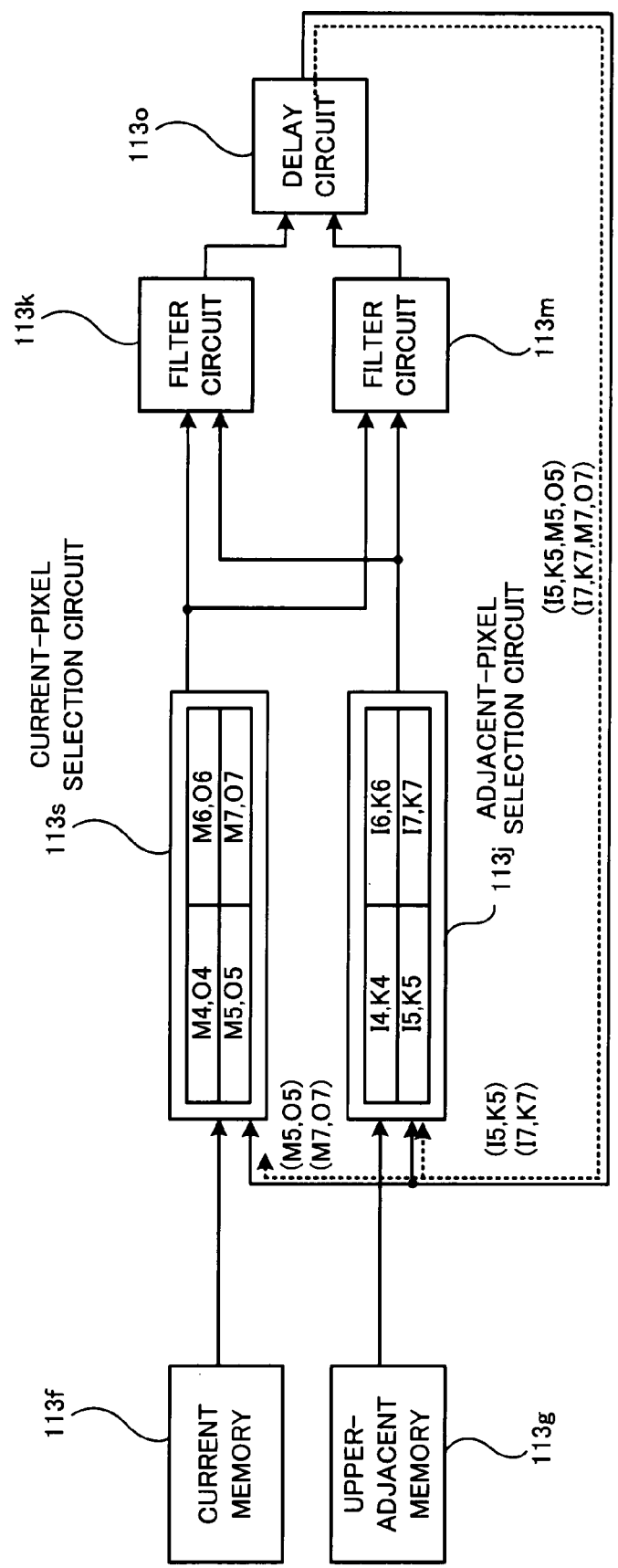

FIGS. 28 and 29 respectively show the operations performed in the first and second clock cycles in the second stage (in the second processing cycle) in the horizontal-edge filtering according to the second embodiment.

First, in the first clock cycle in the second processing cycle, as illustrated in FIG. 28, the group of pixels I4, K4, M4, and O4 and the group of pixels I6, K6, M6, and O6 are outputted from the delay circuit 113o. Then, the group of pixels M4, O4, M6, and O6 are held in the current-pixel selection circuit 113s, and the group of pixels I4, K4, I6, and K6 are held in the adjacent-pixel selection circuit 113j.

Next, in the second clock cycle in the second processing cycle, as illustrated in FIG. 29, the group of pixels I5, K5, M5, and O5 and the group of pixels I7, K7, M7, and O7 are outputted from the delay circuit 113o. Then, the group of pixels M5, O5, M7, and O7 are held in the current-pixel selection circuit 113s, and the group of pixels I5, K5, I7, and K7 are held in the adjacent-pixel selection circuit 113j.

Figure 30:
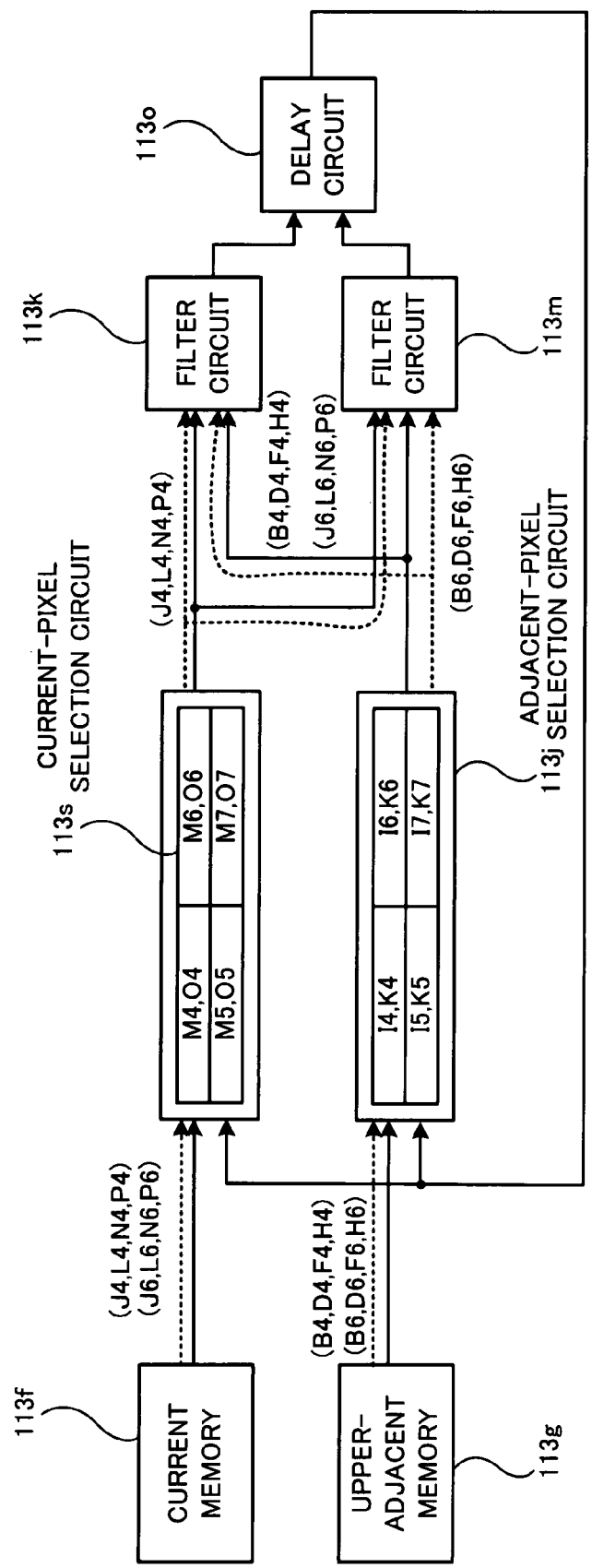
Figure 31:
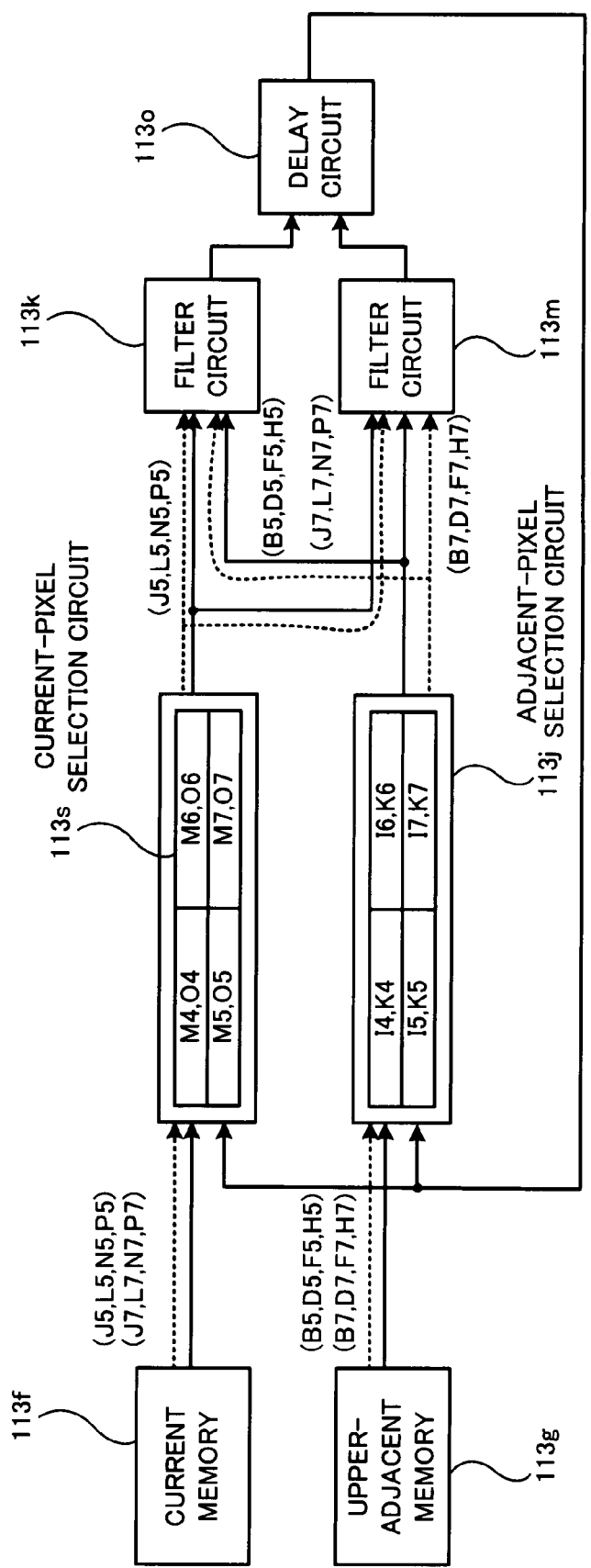

FIGS. 30 and 31 respectively show the operations performed in the first and second clock cycles in the third stage (in the third processing cycle) in the horizontal-edge filtering according to the second embodiment.

First, in the first clock cycle in the third processing cycle, as illustrated in FIG. 30, the group of pixels B4, D4, F4, and H4 and the group of pixels B6, D6, F6, and H6 are read out from the upper-adjacent memory 113g, and the group of pixels J4, L4, N4, and P4 and the group of pixels J6, L6, N6, and P6 are read out from the current memory 113f. Then, the current-pixel selection circuit 113s supplies the group of pixels J4, L4, N4, and P4 to the filter circuit 113k, and the group of pixels J6, L6, N6, and P6 to the filter circuit 113m, and the adjacent-pixel selection circuit 113j supplies the group of pixels B4, D4, F4, and H4 to the filter circuit 113k, and the group of pixels B6, D6, F6, and H6 to the filter circuit 113m. The filter circuits 113k and 113m perform horizontal-edge filtering by using the above groups of pixels supplied to the filter circuits 113k and 113m, respectively.

Next, in the second clock cycle in the third processing cycle, as illustrated in FIG. 31, the group of pixels B5, D5, F5, and H5 and the group of pixels B7, D7, F7, and H7 are read out from the upper-adjacent memory 113g, and the group of pixels J5, L5, N5, and P5 and the group of pixels J7, L7, N7, and P7 are read out from the current memory 113f. Then, the current-pixel selection circuit 113s supplies the group of pixels J5, L5, N5, and P5 to the filter circuit 113k, and the group of pixels J7, L7, N7, and P7 to the filter circuit 113m, and the adjacent-pixel selection circuit 113j supplies the group of pixels B5, D5, F5, and H5 to the filter circuit 113k, and the group of pixels B7, D7, F7, and H7 to the filter circuit 113m. The filter circuits 113k and 113m perform horizontal-edge filtering by using the above groups of pixels supplied to the filter circuits 113k and 113m, respectively.

Figure 32:
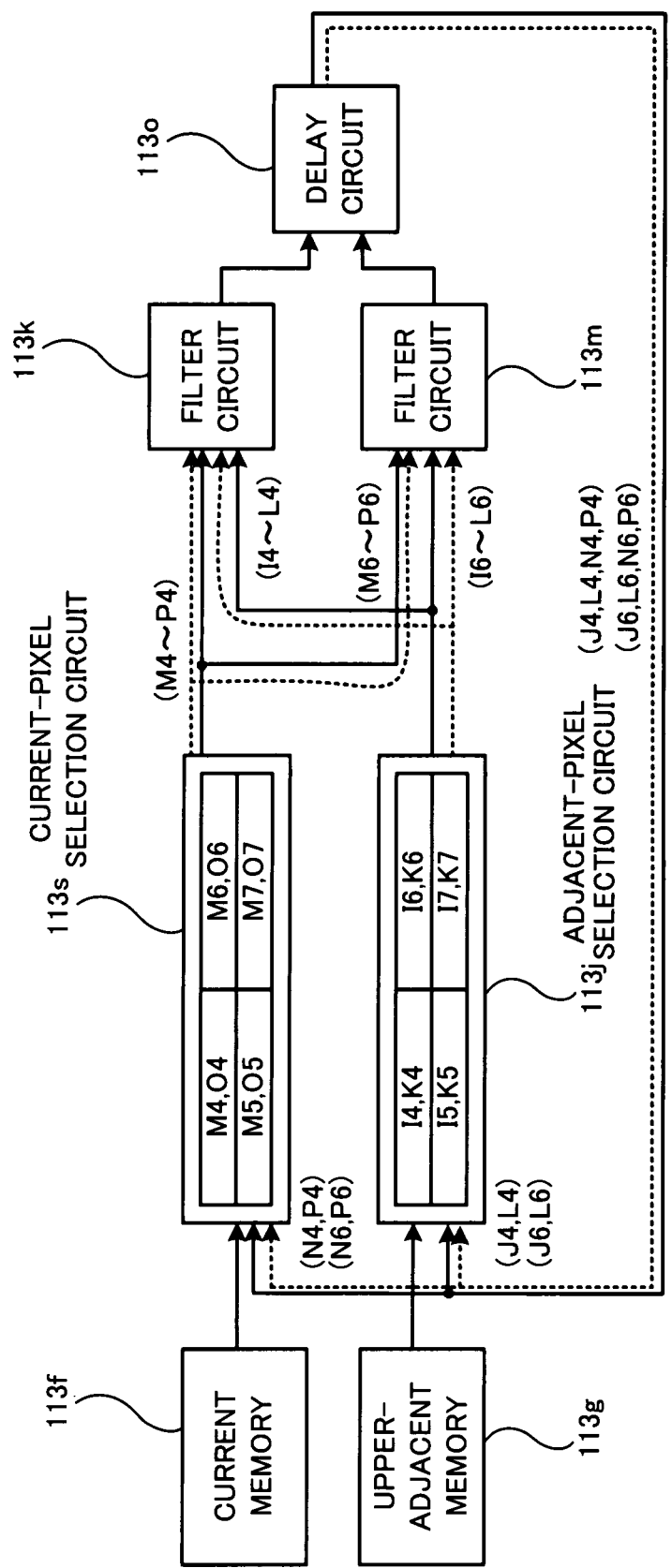

FIG. 32 shows the operations performed in the fourth stage (in the fourth processing cycle) in the horizontal-edge filtering according to the second embodiment.

In the first clock cycle in the fourth processing cycle, as illustrated in FIG. 32, the group of pixels J4, L4, N4, and P4 and the group of pixels J6, L6, N6, and P6 are outputted from the delay circuit 113o. Then, the group of pixels J4, L4, J6, and L6 are inputted into the adjacent-pixel selection circuit 113j, and the group of pixels N4, P4, N6, and P6 are inputted into the current-pixel selection circuit 113s.

Subsequently, the adjacent-pixel selection circuit 113j outputs a group of upper-adjacent pixels I4, K4, J4, and L4 to the filter circuit 113k, where the group of upper-adjacent pixels I4, K4, J4, and L4 is formed by combining the pixels I4 and K4 which are held in the adjacent-pixel selection circuit 113j in the second stage and the pixels J4 and L4 which are inputted into the adjacent-pixel selection circuit 113j in the fourth processing cycle. In addition, the adjacent-pixel selection circuit 113j outputs a group of upper-adjacent pixels I6, K6, J6, and L6 to the filter circuit 113m, where the group of upper-adjacent pixels I6, K6, J6, and L6 is formed by combining the pixels I6 and K6 which are held in the adjacent-pixel selection circuit 113j in the second processing cycle and the pixels J6 and L6 which are inputted into the adjacent-pixel selection circuit 113j in the fourth processing cycle. Further, the current-pixel selection circuit 113s outputs a group of current-side pixels M4, O4, N4, and P4 to the filter circuit 113k, where the group of current-side pixels M4, O4, N4, and P4 is formed by combining the pixels M4 and O4 which are held in the current-pixel selection circuit 113s in the second processing cycle and the pixels N4 and P4 which are inputted into the current-pixel selection circuit 113s in the fourth processing cycle. In addition, the current-pixel selection circuit 113s outputs a group of current-side pixels M6, O6, N6, and P6 to the filter circuit 113m, where the group of current-side pixels M6, O6, N6, and P6 is formed by combining the pixels M6 and O6 which are held in the current-pixel selection circuit 113s in the second processing cycle and the pixels N6 and P6 which are inputted into the current-pixel selection circuit 113s in the fourth processing cycle. The filter circuits 113k and 113m perform horizontal-edge filtering by using the above pixels inputted to the filter circuits 113k and 113m.

Figure 33:
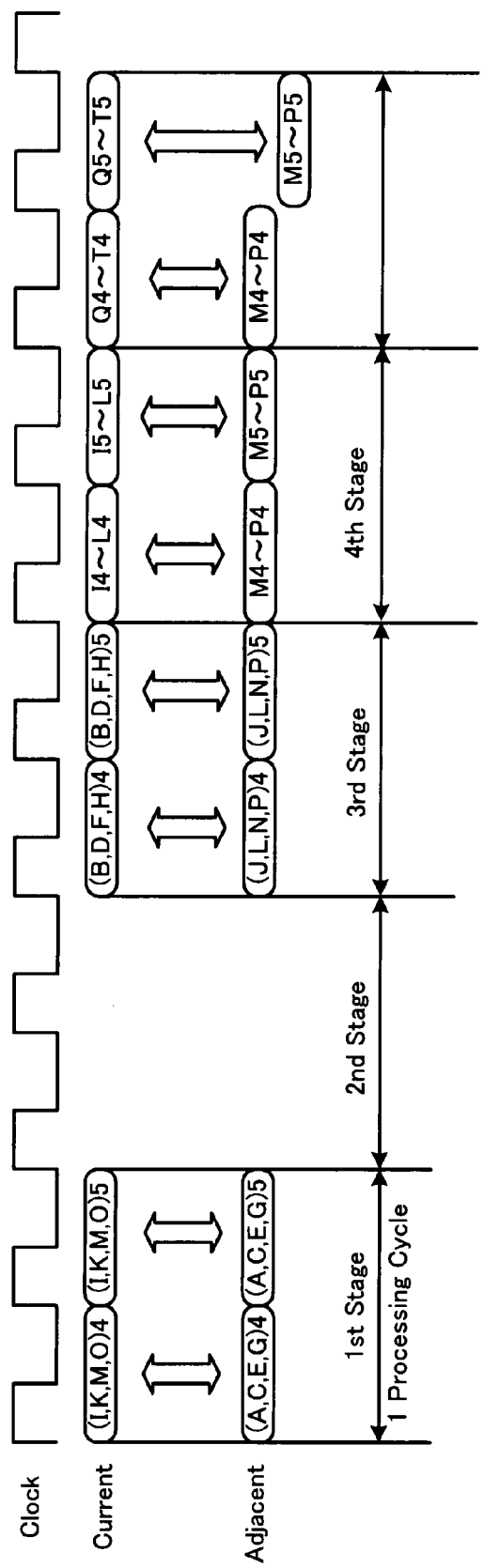
FIG. 33 is a sequence diagram indicating a sequence of operations performed in the deblocking filter according to the second embodiment for horizontal-edge filtering.

FIG. 33 is a sequence diagram indicating the sequence of operations performed in the deblocking filter 113-1 according to the second embodiment for the horizontal-edge filtering.

The processing sequence for performing horizontal-edge filtering according to the second embodiment in the case where the current macroblock is non-interlaced and the reference macroblock is interlaced includes additional processing steps (cycle) to the processing steps (cycles) corresponding to the processing steps according to the first embodiment. For example, the processing performed by using the pixels in the processing areas indicated in FIGS. 22C to 22E according to the second embodiment correspond to the processing performed by using the pixels in the processing areas indicated in FIGS. 16B to 16D according to the first embodiment. However, the processing performed by using the pixels in the processing areas indicated in FIGS. 22A and 22B according to the second embodiment needs two processing cycles, while the processing performed by using the pixels in the processing areas indicated in FIG. 16A according to the first embodiment needs one processing cycle. Therefore, the total processing time varies.

In the edge-filtering according to the second embodiment, delay in the processing is prevented by inserting between filtering cycles idle cycles (such as the aforementioned second and fourth processing cycles in the horizontal-edge filtering) for handling the pixels outputted from the delay circuit 113o, without performing readout from the current memory 113f and the adjacent memory 113g between the filtering cycles. Therefore, the processing time is fixed, and the operation becomes stable. In addition, since the verification time can be correctly detected, it is possible to easily conduct circuit verification.

In addition, since the current-pixel selection circuit 113s is arranged so that filtered data can be chosen as data of a group of current-side pixels, it is possible to cope with a situation in which edges increase.

2.3.6 Sharing of Hardware Resource

The filter circuits 113k and 113m perform edge-filtering on the groups of pixels inputted into the filter circuits 113k and 113m in accordance with different arithmetic and logical formulas. However, the formulas used in the filter circuits 113k and 113m have one or more common arithmetic and/or logical terms (or expressions). Therefore, the filter circuits 113k and 113m can share a hardware resource for performing processing corresponding to the one or more common arithmetic and/or logical terms.

Figure 34:
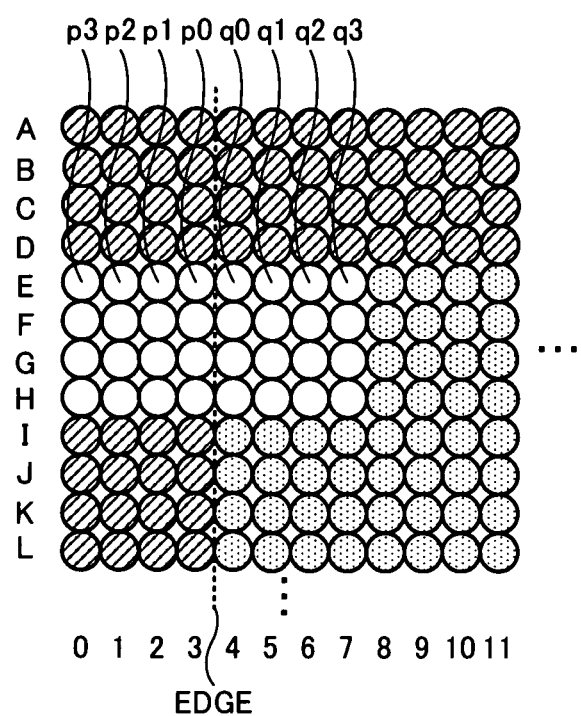
FIG. 34 is a diagram indicating the positions of pixels the values of which are inputted into filter circuits.

FIG. 34 is a diagram indicating the positions of pixels the values of which are inputted into the filter circuits 113k and 113m. In FIG. 34, the references q0, q1, q2, and q3 each denote a current-side pixel, and p0, p1, p2, and p3 each denote an adjacent-side pixel, where an edge exists between the pixels q0 and p0, and the numbers following each of the characters "q" or "p" indicate the distances from the edge. Specifically, the pixel p1 is located at the left of the pixel p0, the pixel q1 is located at the right of the pixel q0, the pixel p2 is located at the left of the pixel p1, the pixel q2 is located at the right of the pixel q1, the pixel p3 is located at the left of the pixel p2, and the pixel q3 is located at the right of the pixel q2.

Figure 35:
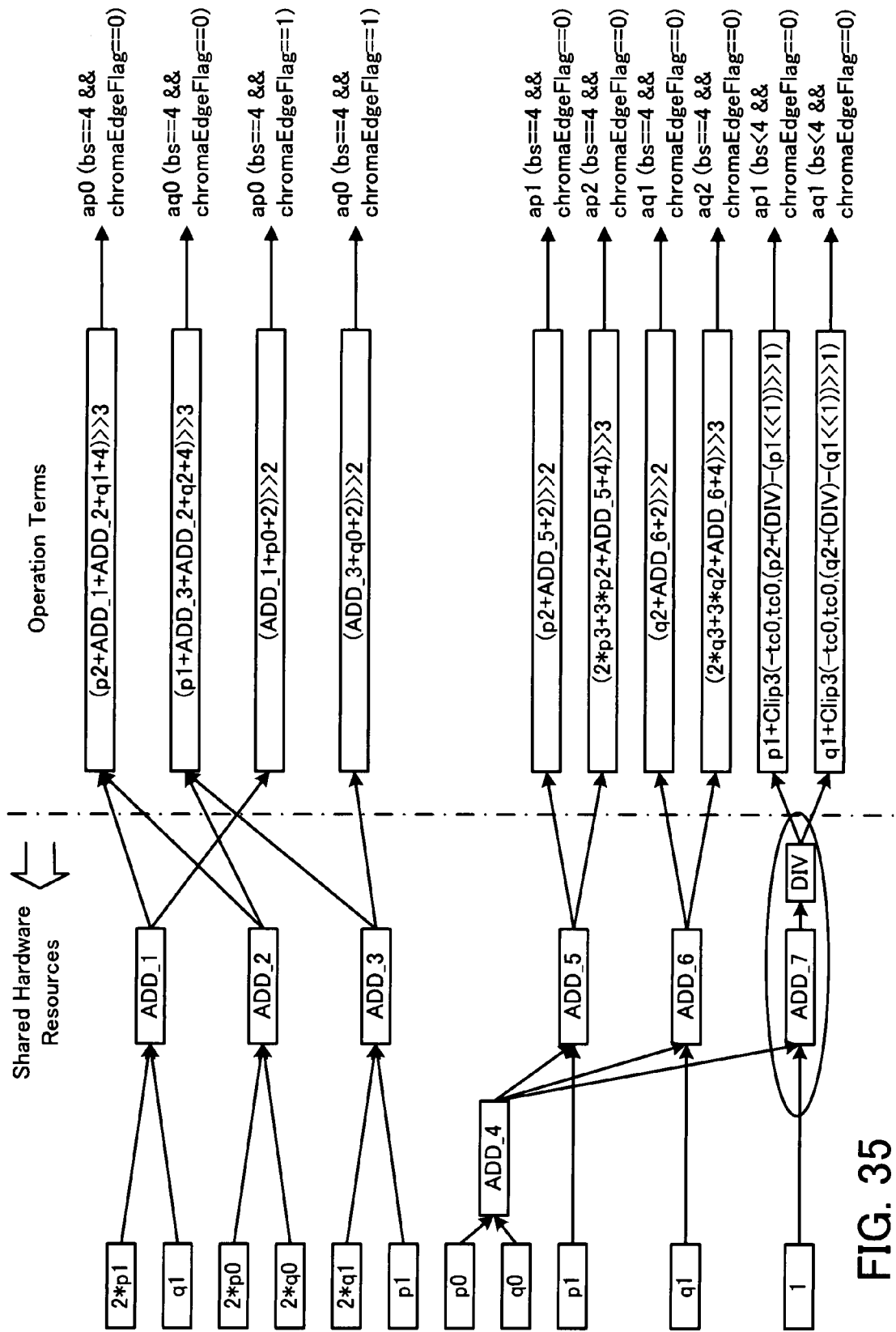
FIG. 35 is a diagram indicating sharing of hardware resources.
Figure 36:
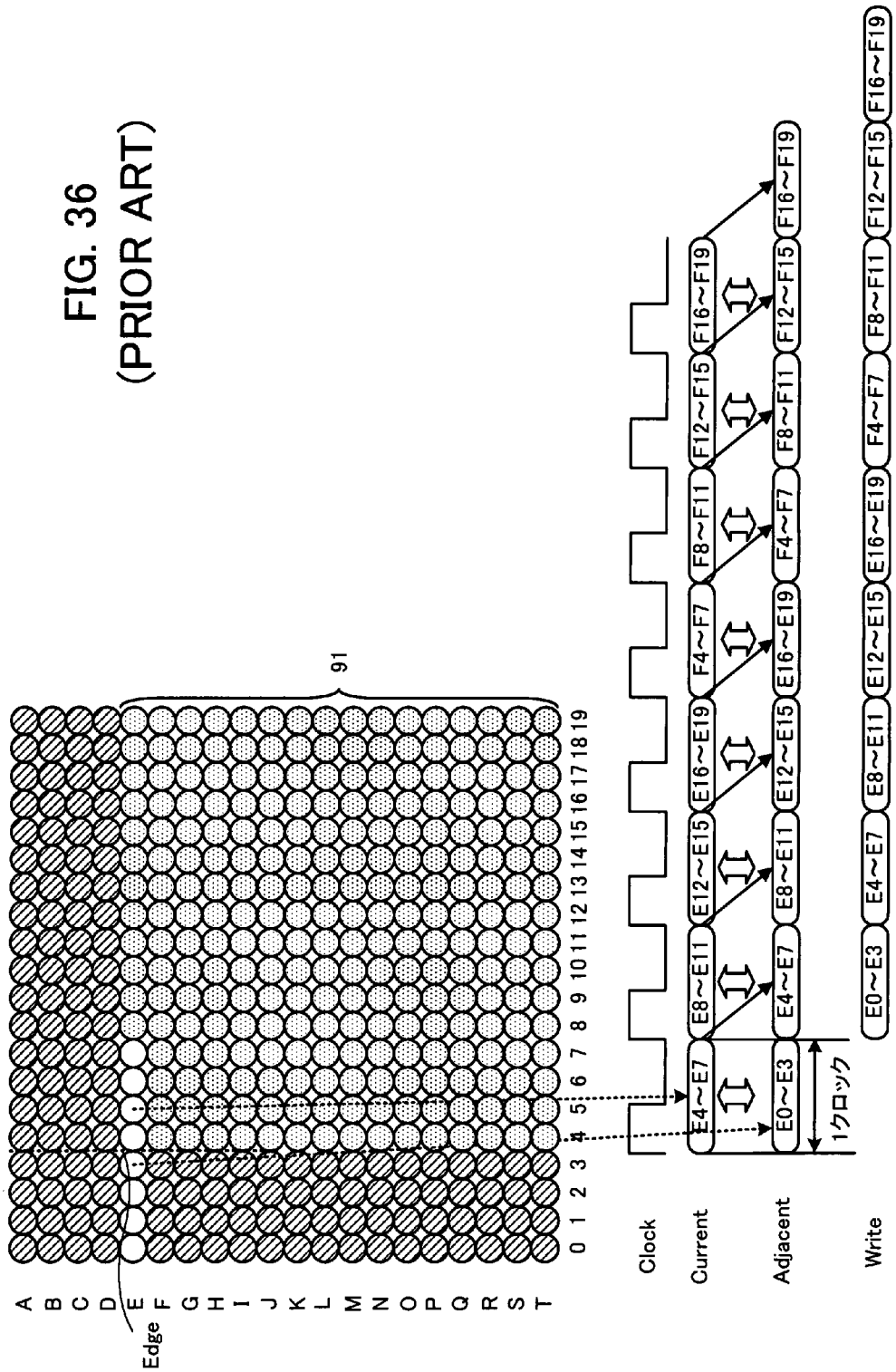
FIG. 36 is a diagram illustrating a vertical-edge-filtering operation of a conventional deblocking filter.
Figure 37:
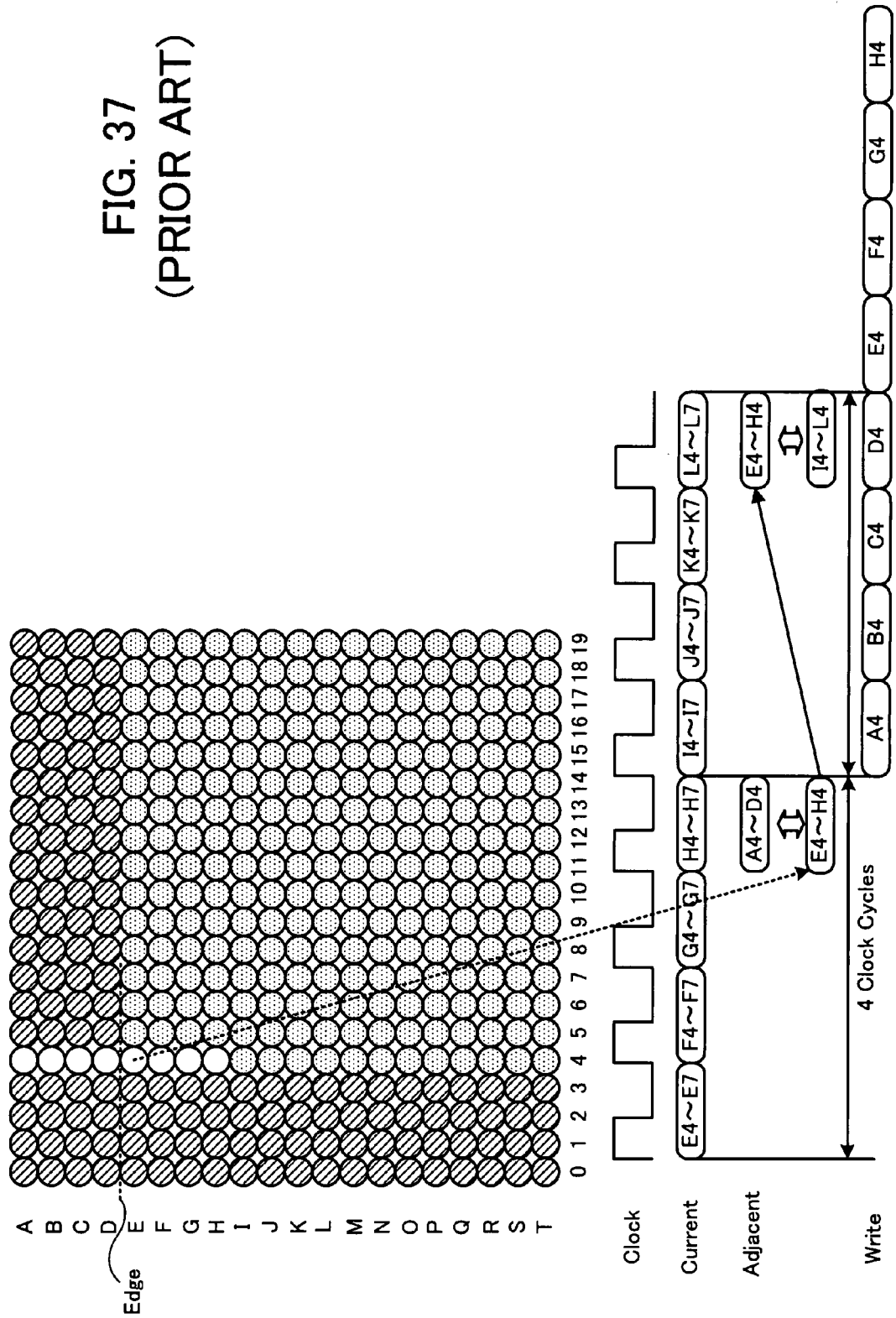
FIG. 37 is a diagram illustrating a horizontal-edge-filtering operation of the conventional deblocking filter.

FIG. 35 is a diagram indicating sharing of hardware resources. In FIG. 35, the references ap0 to ap2 and aq0 to aq2 respectively denote the pixels p0 to p2 and q0 to q2 after processed (filtered), and bs denotes the filtering strength. In addition, the expression "chromaEdgeFlag=0" indicates that the data corresponds to the luminance, and "chromaEdgeFlag=1" indicates that the data corresponds to the chrominance. Further, in the arithmetic and/or logical terms, the parameters "−tc0" and "tc0" indicate threshold parameters which are obtained on the basis of the filtering strength and held by each of the filter circuits 113k and 113m. In the function "Clip3($x, y, z$)", x and y indicate threshold values and z is an operational expression. That is, the expression "Clip3(−tc0, tc0, q2+(DIV)−(q1<<1))>>1)" means to calculate the value of the operational expression "q2+(DIV)−(q1<<1))>>1" between the threshold values −tc0 and tc0, where the expression "x>>y" means a bitwise left shift of x by y bits (multiplication of x by 2), and the expression "x<<y" means a bitwise right shift of x by y bits (division of x by 2). When the calculated value of the operational expression "q2+(DIV)−(q1<<1))>>1" reaches the value of tc0, the outputted value of the operational expression "q2+(DIV)−(q1<<1))>>1" is clipped at the value of tc0. When the calculated value of the operational expression "q2+(DIV)−(q1<<1))>>1" reaches the value of −tc0, the outputted value of the operational expression "q2+(DIV)−(q1<<1))>>1" is clipped at the value of −tc0. Otherwise, the actually calculated value of the operational expression "q2+(DIV)−(q1<<1))>>1" is outputted.

For example, in both of the calculation of the filtered pixel "ap1" and the calculation of the filtered pixel "aq1", the operation "(p0+q0+1)>>1" is required to be performed. Therefore, it is possible to use a single processing circuit (arithmetic and logical unit) for performing the operation "(p0+q0+1)>>1" in both of the calculations of the filtered pixel "ap1" and "aq1", and deliver the results of the calculations to the respectively corresponding filter circuits, so that the filter circuits sharing the above common processing circuit realize equivalent functions to the separate filter circuits 113k and 113m.

In FIG. 35, the blocks "ADD1" to "ADD7" and "DIV" indicate functions realized by the above common processing circuit. For example, the function "ADD4" is the operation p0+q0, the function "ADD7" is the operation (ADD4+1)= (p0+q0+1), and the function "DIV" is the operation (ADD7>>1)=((p0+q0+1)>>1).

Since the filter circuits 113k and 113m perform identical operations in the calculations of different pixels by using a common hardware resource as explained above, it is possible to simplify the circuitry.

3. Recording Medium Storing a Program

The processing functions of each of the deblocking filters, the image encoders, and the image decoders according to the present invention which are explained above can be realized by a computer. In this case, a program describing details of processing for realizing the functions which each of the deblocking filters, the image encoders, and the image decoders should have is provided. When the computer executes the program, the processing functions of the deblocking filter, the image encoder, and the image decoder can be realized on the computer.

The program describing the details of the processing can be stored in a recording medium which can be read by the computer. The recording medium may be a magnetic recording device, an optical disk, an optical magnetic recording medium, a semiconductor memory, or the like. The magnetic recording device may be a hard disk drive (HDD), a flexible disk (FD), a magnetic tape, or the like. The optical disk may be a DVD (Digital Versatile Disk), a DVD-RAM (Random Access Memory), a CD-ROM (Compact Disk Read Only Memory), a CD-R (Recordable)/RW (ReWritable), or the like. The optical magnetic recording medium may be an MO (Magneto-Optical Disk) or the like.

In order to put the program into the market, for example, it is possible to sell a portable recording medium such as a DVD or a CD-ROM in which the program is recorded. Alternatively, it is possible to store the program in a storage device belonging to a server computer, and transfer the program to another computer through a network.

The computer which executes the program stores the program in a storage device belonging to the computer, where the program is originally recorded in, for example, a portable recording medium, or is initially transferred from the server computer. The computer reads the program from the storage device, and performs processing in accordance with the program. Alternatively, the computer may directly read the program from the portable recording medium for performing processing in accordance with the program. Further alternatively, the computer can sequentially execute processing in accordance with each portion of the program every time the portion of the program is transferred from the server computer.

4. Additional Matter

According to the present invention, pixels arrayed in a plurality of rows are concurrently processed by the processing unit. Therefore, it is possible to speedily acquire the pixels used in row-direction-edge filtering. In addition, since the rearrangement unit rearranges groups of pixels arrayed in rows into groups of pixels in respective columns, it is also possible to speedily acquire the pixels used in column-direction-edge filtering.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

Further, it is possible to realize a deblocking filter by using an arbitrary combination of two or more of the features (structures) of the first and second embodiments of the present invention explained before.

What is claimed is:

1. A deblocking filter that performs edge filtering of moving-image data, comprising:
   a first memory configured to store a current group of pixels;
   at least one second memory configured to store an adjacent group of pixels which are located adjacent to the current group of pixels;
   at least two edge filter circuits configured to perform concurrently edge filtering on at least two groups of pixels supplied thereto;
   a delay circuit configured to produce delayed pixels of the edge-filtered pixels by delaying outputs of the edge filter circuits;
   a first pixel selection circuit, coupled to inputs of the edge filter circuits, configured to distribute the current group of pixels read out of the first memory to the edge filter circuits;
   a second pixel selection circuit, coupled to other inputs of the edge filter circuits, configured to select either the adjacent group of pixels read out of the second memory or output pixels of the delay circuit and distribute the selected pixels to the edge filter circuits; and
   a third pixel selection circuit, coupled to input of the first memory, configured to transpose the delayed pixels of the edge-filtered pixels and supply the first memory with the delayed and transposed pixels of the edge-filtered pixels.

2. An image encoder that encodes moving-image data, comprising:
   a first memory configured to store a current group of pixels;
   at least one second memory configured to store an adjacent group of pixels which are located adjacent to the current group of pixels;
   at least two edge filter circuits configured to perform concurrently edge filtering on at least two groups of pixels supplied thereto;
   a delay circuit configured to produce delayed pixels of edge-filtered pixels by delaying outputs of the edge filter circuits;
   a first pixel selection circuit, coupled to inputs of the edge filter circuits, configured to distribute the current group of pixels read out of the first memory to the edge filter circuits;
   a second pixel selection circuit, coupled to other inputs of the edge filter circuits, configured to select either the adjacent group of pixels read out of the second memory or output pixels of the delay circuit and distribute the selected pixels to the edge filter circuits; and
   a third pixel selection circuit, coupled to input of the first memory, configured to transpose the delayed pixels of the edge-filtered pixels and supply the first memory with the delayed and transposed pixels of the edge-filtered pixels.

3. An image decoder that decodes moving-image data, comprising:
   a first memory configured to store a current group of pixels;
   at least one second memory configured to store an adjacent group of pixels which are located adjacent to the current group of pixels;
   at least two edge filter circuits configured to perform concurrently edge filtering on at least two groups of pixels supplied thereto;
   a delay circuit configured to produce delayed pixels of the edge-filtered pixels by delaying outputs of the edge filter circuits;
   a first pixel selection circuit, coupled to inputs of the edge filter circuits, configured to distribute the current group of pixels read out of the first memory to the edge filter circuits;
   a second pixel selection circuit, coupled to other inputs of the edge filter circuits, configured to select either the adjacent group of pixels read out of the second memory or output pixels of the delay circuit, and distribute the selected pixels to the edge filter circuits; and
   a third pixel selection circuit, coupled to input of the first memory, configured to transpose the delayed pixels of the edge-filtered pixels and supply the first memory with the delayed and transposed pixels of the edge-filtered pixels.

4. The deblocking filter according to claim 1, wherein the edge filter circuits share a calculation circuit configured to perform an operation in accordance with a common term in calculation formulas used in the edge filter circuits.

5. The deblocking filter according to claim 1, wherein:
the adjacent group of pixels comprise interlaced data and the current group of pixels comprise non-interlaced data;
the first pixel selection circuit is further coupled to the delay circuit and comprises a circuit to store the delayed pixels of the edge-filtered pixels in transposed form; and
the first pixel selection circuit provides the edge filter circuits with the stored pixels in a predetermined period during row-direction-edge filtering.

* * * * *